US012513276B2

(12) United States Patent
Aoki et al.

(10) Patent No.: US 12,513,276 B2
(45) Date of Patent: Dec. 30, 2025

(54) INFORMATION PROCESSING APPARATUS, INFORMATION PROCESSING METHOD, AND PROGRAM

(71) Applicant: FUJIFILM Corporation, Tokyo (JP)

(72) Inventors: Takashi Aoki, Saitama (JP); Kazunori Tamura, Saitama (JP); Fuminori Irie, Saitama (JP); Masahiko Miyata, Saitama (JP); Yasunori Murakami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 708 days.

(21) Appl. No.: 17/863,402

(22) Filed: Jul. 13, 2022

(65) Prior Publication Data

US 2022/0345680 A1    Oct. 27, 2022

Related U.S. Application Data

(63) Continuation of application No. PCT/JP2020/042101, filed on Nov. 11, 2020.

(30) Foreign Application Priority Data

Jan. 30, 2020   (JP) ................................. 2020-013717

(51) Int. Cl.
*H04N 13/156* (2018.01)
*G06T 7/70* (2017.01)
(Continued)

(52) U.S. Cl.
CPC ............ *H04N 13/156* (2018.05); *G06T 7/70* (2017.01); *H04N 13/117* (2018.05); *H04N 23/69* (2023.01)

(58) Field of Classification Search
CPC ......... G06T 7/70; G06T 15/20; H04N 13/117; H04N 23/90; H04N 23/695
See application file for complete search history.

(56) References Cited

U.S. PATENT DOCUMENTS 11,343,425 B2*   5/2022   Uno ..................... H04N 23/675
11,558,598 B2*   1/2023   Yano ....................... G06T 15/20
(Continued)

FOREIGN PATENT DOCUMENTS

JP    2011172169    9/2011
JP    2017212593    11/2017
(Continued)

OTHER PUBLICATIONS

"International Search Report (Form PCT/ISA/210) of PCT/JP2020/042101," mailed on Feb. 9, 2021, with English translation thereof, pp. 1-5.
"Written Opinion of the International Searching Authority (Form PCT/ISA/237)" of PCT/JP2020/042101, mailed on Feb. 9, 2021, with English translation thereof, pp. 1-10.
(Continued)

*Primary Examiner* — Boubacar Abdou Tchoussou
(74) *Attorney, Agent, or Firm* — JCIPRNET

(57) ABSTRACT

Provided is an information processing apparatus including a processor; and a memory that is connected to or incorporated in the processor, in which the processor acquires imaging device position information regarding positions of a plurality of imaging devices and imaging direction information regarding an imaging direction of each of the plurality of imaging devices, derives virtual viewpoint range specification information capable of specifying a virtual viewpoint range in which a virtual viewpoint image is capable of being generated on the basis of a plurality of captured images obtained by being captured by the plurality of imaging devices, on the basis of the imaging device position information and the imaging direction information, and outputs information regarding the virtual viewpoint range specification information.

24 Claims, 41 Drawing Sheets

(51) Int. Cl.
*H04N 13/117* (2018.01)
*H04N 23/69* (2023.01)

(56) References Cited

U.S. PATENT DOCUMENTS

| | | |
|---|---|---|
| 2018/0182114 A1 | 6/2018 | Hanamoto |
| 2018/0197324 A1 | 7/2018 | Hanamoto |
| 2019/0158802 A1 | 5/2019 | Higuchi |
| 2019/0191146 A1 | 6/2019 | Koyama et al. |
| 2019/0349531 A1 | 11/2019 | Aizawa |
| 2020/0288119 A1 | 9/2020 | Iwakiri |
| 2020/0322591 A1 | 10/2020 | Yano et al. |
| 2022/0030215 A1 | 1/2022 | Yano et al. |
| 2023/0059798 A1 | 2/2023 | Iwakiri |

FOREIGN PATENT DOCUMENTS

| | | |
|---|---|---|
| JP | 2018107793 | 7/2018 |
| JP | 2018113683 | 7/2018 |
| JP | 2018206025 | 12/2018 |
| JP | 2019095936 | 6/2019 |
| JP | 2019102845 | 6/2019 |
| JP | 2019121945 | 7/2019 |
| JP | 2019197348 | 11/2019 |
| WO | 2018043225 | 3/2018 |

OTHER PUBLICATIONS

"Office Action of Japan Counterpart Application", issued on Jun. 20, 2023, with English translation thereof, pp. 1-11.

\* cited by examiner

INFORMATION PROCESSING APPARATUS, INFORMATION PROCESSING METHOD, AND PROGRAM

CROSS-REFERENCE TO RELATED APPLICATIONS

This application is a continuation application of International Application No. PCT/JP2020/042101, filed Nov. 11, 2020, the disclosure of which is incorporated herein by reference in its entirety. Further, this application claims priority under 35 USC 119 from Japanese Patent Application No. 2020-013717 filed Jan. 30, 2020, the disclosure of which is incorporated by reference herein.

BACKGROUND

1. Technical Field

A technique of the present disclosure relates to an information processing apparatus, an information processing method, and a program.

2. Related Art

JP2019-121945A discloses an imaging apparatus that acquires a captured image, the imaging apparatus comprising: a position information acquisition unit that acquires position information of the imaging apparatus; a distance information acquisition unit that acquires distance information of imaging; a virtual viewpoint image generation unit that generates a virtual viewpoint image viewed from a virtually set position by using the captured image, the position information, and the distance information; a next imaging position decision unit that decides a next position to be imaged on the basis of a lacking region generated in the virtual viewpoint image generated by the virtual viewpoint image generation unit; and a presentation unit that presents the next position to be imaged decided by the next imaging position decision unit.

JP2018-113683A discloses an image processing apparatus that generates a virtual viewpoint video, which is a video viewed from a virtual camera, by using a plurality of viewpoint videos, the image processing apparatus comprising: a derivation unit that derives an imaging region, which is common to a plurality of real cameras having the same angle of view, for each camera group constituted of the plurality of real cameras; and a setting unit that sets a parameter related to the virtual camera on the basis of a user input through GUI, in which the imaging region of each camera group, which is derived by the derivation unit, is recognizably displayed on the GUI.

JP2011-172169A discloses a video processing apparatus that processes a video at a designated viewpoint, the video processing apparatus comprising: a control unit that generates map information indicating a first region in which the video can be viewed at the viewpoint and a second region in which the video cannot be viewed at the viewpoint as information presented to a user and controls viewpoint movement inside the first region; and a video generation unit that generates video data at a viewpoint set inside the first region by the control unit, in which the control unit determines a boundary between the first region and the second region to generate the map information, by using at least coordinate information of a plurality of cameras that image a subject from different directions from each other.

JP2018-107793A discloses a virtual viewpoint image generation apparatus comprising: a first generation unit that generates a first virtual viewpoint image corresponding to a position and a direction of a virtual viewpoint on the basis of a plurality of captured images obtained by a plurality of first cameras that image a field from different directions from each other; a decision unit that decides whether or not a second virtual viewpoint image having higher image quality than image quality of the first virtual viewpoint image is generated on the basis of one or a plurality of captured images obtained by one or a plurality of second cameras that image at least a part of the field from different directions from each other, according to an evaluation result of the first virtual viewpoint image generated by the first generation unit; and a second generation unit that generates the second virtual viewpoint image having higher image quality than the image quality of the first virtual viewpoint image according to the decision performed by the decision unit.

JP2019-197348A discloses an information processing apparatus including: a designation unit that designates a virtual viewpoint; and a display control unit that causes a display unit to display information regarding a relationship between the virtual viewpoint designated by the designation unit and image quality of a virtual viewpoint image which is generated on the basis of captured images captured by a plurality of cameras and which corresponds to the virtual viewpoint.

SUMMARY

One embodiment of the technique of the present disclosure provides an information processing apparatus, an information processing method, and a program capable of assisting in deciding an imaging position at which a virtual viewpoint image can be generated.

A first aspect according to the technique of the present disclosure is an information processing apparatus comprising: a processor; and a memory that is connected to or incorporated in the processor, in which the processor acquires imaging device position information regarding positions of a plurality of imaging devices and imaging direction information regarding an imaging direction of each of the plurality of imaging devices, derives virtual viewpoint range specification information capable of specifying a virtual viewpoint range in which a virtual viewpoint image is capable of being generated on the basis of a plurality of captured images obtained by being captured by the plurality of imaging devices, on the basis of the imaging device position information and the imaging direction information, and outputs information regarding the virtual viewpoint range specification information.

A second aspect according to the technique of the present disclosure is the information processing apparatus according to the first aspect, in which the processor derives the virtual viewpoint range specification information each time at least one of the imaging device position information or the imaging direction information is changed or acquired.

A third aspect according to the technique of the present disclosure is the information processing apparatus according to the first or second aspect, in which the processor outputs the information regarding the virtual viewpoint range specification information to a first display or at least one imaging device out of the plurality of imaging devices.

A fourth aspect according to the technique of the present disclosure is the information processing apparatus according to the third aspect, in which the at least one imaging device has a second display, and the at least one imaging device causes the second display to display a virtual viewpoint range image showing the virtual viewpoint range, on the basis of the information regarding the virtual viewpoint range specification information.

A fifth aspect according to the technique of the present disclosure is the information processing apparatus according to any one of the first to fourth aspects, in which the processor further acquires subject position specification information for specifying a position of a first specific subject, and acquires the imaging direction information on the basis of the subject position specification information and the imaging device position information.

A sixth aspect according to the technique of the present disclosure is the information processing apparatus according to any one of the first to fifth aspects, in which the virtual viewpoint range is a range within a smaller first angle out of angles formed by the imaging directions of the plurality of imaging devices with respect to a second specific subject.

A seventh aspect according to the technique of the present disclosure is the information processing apparatus according to the sixth aspect, in which the virtual viewpoint range is a range within an angle that is within the first angle and that exceeds a first under-angle predetermined as an under-angle within the first angle.

An eighth aspect according to the technique of the present disclosure is the information processing apparatus according to the seventh aspect, in which the first under-angle is an angle that defines an imaging position range that is not suitable for generating the virtual viewpoint image on the basis of the plurality of captured images.

A ninth aspect according to the technique of the present disclosure is the information processing apparatus according to the seventh or eighth aspect, in which the processor further outputs first guide information for guiding a position of at least one imaging device out of the plurality of imaging devices to a position that exceeds the first under-angle and that falls within the first angle in a case where the angle formed by the imaging directions of the plurality of imaging devices with respect to the second specific subject is the first under-angle or less.

A tenth aspect according to the technique of the present disclosure is the information processing apparatus according to the ninth aspect, in which the first guide information is information for guiding a position of one imaging device out of the plurality of imaging devices to the position that exceeds the first under-angle and that falls within the first angle.

An eleventh aspect according to the technique of the present disclosure is the information processing apparatus according to the ninth or tenth aspect, in which the processor outputs the first guide information to the same output destination as an output destination of the information regarding the virtual viewpoint range specification information.

A twelfth aspect according to the technique of the present disclosure is the information processing apparatus according to any one of the first to eleventh aspects, in which the virtual viewpoint range is a range within a smaller second angle out of angles formed by the imaging directions of the plurality of imaging devices with respect to a third specific subject, and the processor receives viewpoint position information indicating a viewpoint position with respect to the virtual viewpoint image, and further outputs second guide information for guiding a position of at least one imaging device out of the plurality of imaging devices to a position that falls within the second angle in a case where the viewpoint position indicated by the viewpoint position information is outside the virtual viewpoint range.

A thirteenth aspect according to the technique of the present disclosure is the information processing apparatus according to the twelfth aspect, in which the virtual viewpoint range is a range within an angle that is within the second angle and that exceeds a second under-angle predetermined as an under-angle within the second angle, and the second guide information is information for guiding the position of the at least one imaging device out of the plurality of imaging devices to a position that exceeds the second under-angle and that falls within the second angle.

A fourteenth aspect according to the technique of the present disclosure is the information processing apparatus according to the thirteenth aspect, in which the second guide information is information for guiding a position of one imaging device out of the plurality of imaging devices to the position that exceeds the second under-angle and that falls within the second angle.

A fifteenth aspect according to the technique of the present disclosure is the information processing apparatus according to any one of the twelfth to fourteenth aspects, in which the processor outputs the second guide information to the same output destination as an output destination of the information regarding the virtual viewpoint range specification information.

A sixteenth aspect according to the technique of the present disclosure is the information processing apparatus according to any one of the first to fifteenth aspects, in which the processor further outputs the imaging device position information.

A seventeenth aspect according to the technique of the present disclosure is the information processing apparatus according to the sixteenth aspect, in which the processor outputs the imaging device position information to the same output destination as an output destination of the information regarding the virtual viewpoint range specification information.

An eighteenth aspect according to the technique of the present disclosure is the information processing apparatus according to any one of the first to seventeenth aspects, in which the processor further acquires angle-of-view information regarding an angle of view of each of the plurality of imaging devices, further derives imaging range information regarding an imaging range in which the virtual viewpoint image is capable of being generated on the basis of the plurality of captured images, the imaging range being overlapped by the plurality of imaging devices, on the basis of the imaging device position information, the imaging direction information, and the angle-of-view information, and further outputs the imaging range information.

A nineteenth aspect according to the technique of the present disclosure is the information processing apparatus according to the eighteenth aspect, in which the processor outputs the imaging range information to the same output destination as an output destination of the information regarding the virtual viewpoint range specification information.

A twentieth aspect according to the technique of the present disclosure is the information processing apparatus according to any one of the first to nineteenth aspects, in which the processor derives imaging device range specification information capable of specifying a range of a position of at least one imaging device out of the plurality of imaging devices where quality of the plurality of captured images falls within a default range, on the basis of at least one of a subject distance of each of the plurality of imaging devices with respect to a fourth specific subject or a zoom capability of each of the plurality of imaging devices, and further outputs the imaging device range specification information.

The twenty-first aspect according to the technique of the present disclosure is the information processing apparatus according to the twentieth aspect, in which the processor outputs the imaging device range specification information to the same output destination as an output destination of the information regarding the virtual viewpoint range specification information.

A twenty-second aspect according to the technique of the present disclosure is an information processing apparatus comprising: a processor; and a memory that is connected to or incorporated in the processor, in which the processor acquires imaging device position information regarding positions of a plurality of imaging devices, imaging direction information regarding an imaging direction of each of the plurality of imaging devices, and angle-of-view information regarding an angle of view of each of the plurality of imaging devices, derives imaging range information regarding an imaging range in which a virtual viewpoint image is capable of being generated on the basis of a plurality of captured images obtained by being captured by the plurality of imaging devices, the imaging range being overlapped by the plurality of imaging devices, on the basis of the imaging device position information, the imaging direction information, and the angle-of-view information, and outputs the imaging range information and the imaging device position information.

A twenty-third aspect according to the technique of the present disclosure is the information processing apparatus according to the twenty-second aspect, in which the processor outputs the imaging range information and the imaging device position information to at least one imaging device out of the plurality of imaging devices.

A twenty-fourth aspect according to the technique of the present disclosure is an information processing method comprising: acquiring imaging device position information regarding positions of a plurality of imaging devices and imaging direction information regarding an imaging direction of each of the plurality of imaging devices; deriving virtual viewpoint range specification information capable of specifying a virtual viewpoint range in which a virtual viewpoint image is capable of being generated on the basis of a plurality of captured images obtained by being captured by the plurality of imaging devices, on the basis of the imaging device position information and the imaging direction information; and outputting information regarding the virtual viewpoint range specification information.

A twenty-fifth aspect according to the technique of the present disclosure is an information processing method comprising: acquiring imaging device position information regarding positions of a plurality of imaging devices, imaging direction information regarding an imaging direction of each of the plurality of imaging devices, and angle-of-view information regarding an angle of view of each of the plurality of imaging devices; deriving imaging range information regarding an imaging range in which a virtual viewpoint image is capable of being generated on the basis of a plurality of captured images obtained by being captured by the plurality of imaging devices, the imaging range being overlapped by the plurality of imaging devices, on the basis of the imaging device position information, the imaging direction information, and the angle-of-view information; and outputting the imaging range information and the imaging device position information.

A twenty-sixth aspect according to the technique of the present disclosure is a program for causing a computer to execute a process comprising: acquiring imaging device position information regarding positions of a plurality of imaging devices and imaging direction information regarding an imaging direction of each of the plurality of imaging devices; deriving virtual viewpoint range specification information capable of specifying a virtual viewpoint range in which a virtual viewpoint image is capable of being generated on the basis of a plurality of captured images obtained by being captured by the plurality of imaging devices, on the basis of the imaging device position information and the imaging direction information; and outputting information regarding the virtual viewpoint range specification information.

A twenty-seventh aspect according to the technique of the present disclosure is a program for causing a computer to execute a process comprising: acquiring imaging device position information regarding positions of a plurality of imaging devices, imaging direction information regarding an imaging direction of each of the plurality of imaging devices, and angle-of-view information regarding an angle of view of each of the plurality of imaging devices; deriving imaging range information regarding an imaging range in which a virtual viewpoint image is capable of being generated on the basis of a plurality of captured images obtained by being captured by the plurality of imaging devices, the imaging range being overlapped by the plurality of imaging devices, on the basis of the imaging device position information, the imaging direction information, and the angle-of-view information; and outputting the imaging range information and the imaging device position information.

BRIEF DESCRIPTION OF THE DRAWINGS

Exemplary embodiments of the technology of the disclosure will be described in detail based on the following figures, wherein.

DETAILED DESCRIPTION

An example of embodiments according to the technique of the present disclosure will be described with reference to the accompanying drawings.

First, the wording used in the following description will be described.

CPU is an abbreviation of "central processing unit". RAM is an abbreviation of "random access memory". DRAM is an abbreviation of "dynamic random access memory". SRAM is an abbreviation of "static random access memory". ROM is an abbreviation of "read only memory". SSD is an abbreviation of "solid state drive". HDD is an abbreviation of "hard disk drive". EEPROM is an abbreviation of "electrically erasable and programmable read only memory". I/F is an abbreviation of "interface". IC is an abbreviation of "integrated circuit". ASIC is an abbreviation of "application specific integrated circuit". PLD is an abbreviation of "programmable logic device". FPGA is an abbreviation of "field-programmable gate array". SoC is an abbreviation of "system-on-a-chip". CMOS is an abbreviation of "complementary metal oxide semiconductor". CCD is an abbreviation of "charge coupled device". EL is an abbreviation of "electro-luminescence". GPU is an abbreviation of "graphics processing unit". 3D is an abbreviation of "3 dimension". USB is an abbreviation of "Universal Serial Bus". GPS is an abbreviation of "Global Positioning System". In addition, GNSS is an abbreviation of "global navigation satellite system". Further, in the following description, in a case where the term "image" other than an "image" displayed on a display is used, the "image" also includes the meaning of "data indicating the image".

First Embodiment

Figure 1:
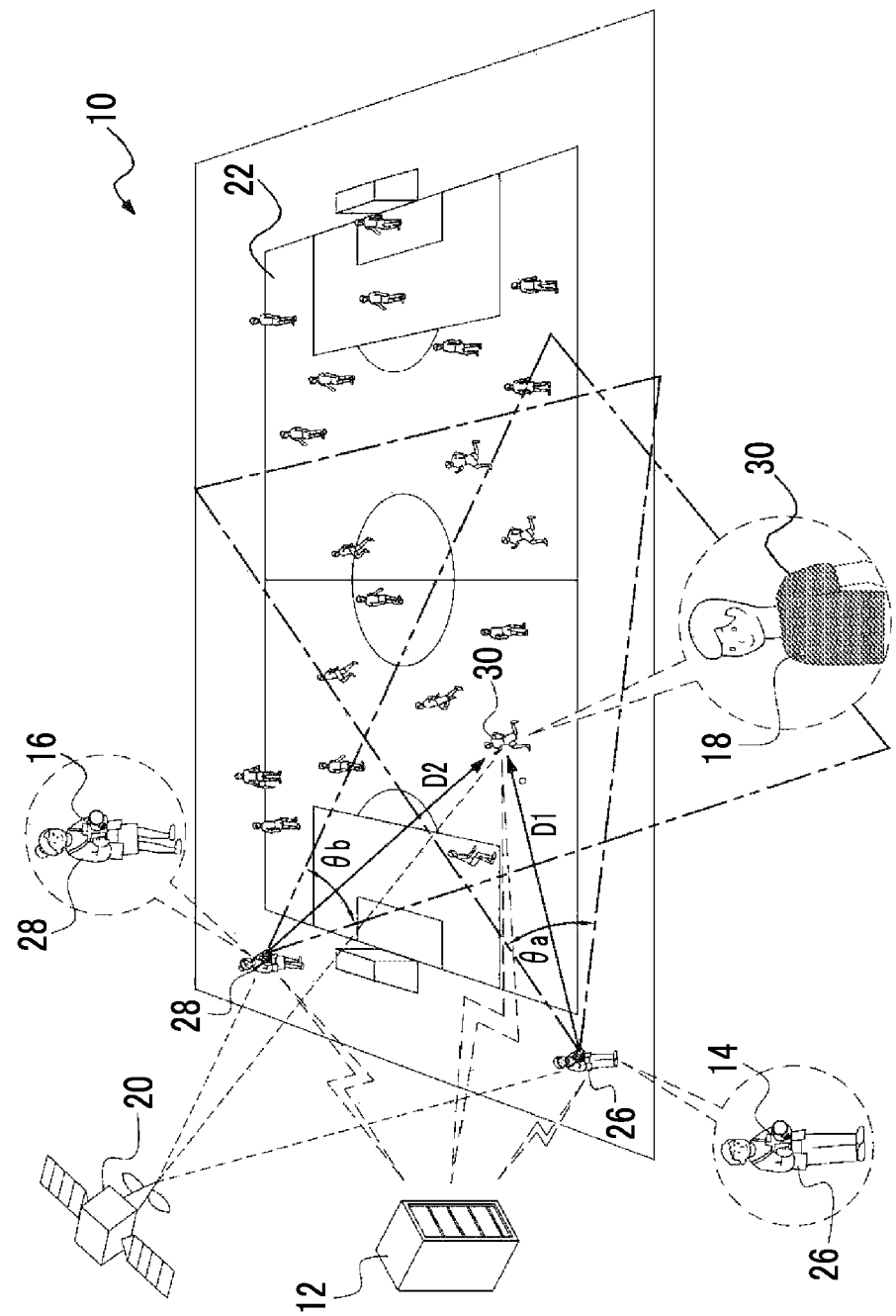
FIG. 1 is a conceptual diagram showing an example of a relationship between an information processing apparatus, a terminal device, and a specific subject.

As shown in FIG. 1 as an example, an information processing system 10 comprises an information processing apparatus 12, a first imaging device 14, a second imaging device 16, and a GPS terminal 18. Here, the information processing apparatus 12 is an example of the "information processing apparatus" according to the technique of the present disclosure, and the first imaging device 14 and the second imaging device 16 are an example of the "plurality of imaging devices" according to the technique of the present disclosure. Further, the first imaging device 14 is an example of the "output destination of the information regarding the virtual viewpoint range specification information" according to the technique of the present disclosure.

The information processing apparatus 12 is a device corresponding to a server, and the first imaging device 14, the second imaging device 16, and the GPS terminal 18 each are a device corresponding to a client terminal with respect to the information processing apparatus 12. Hereinafter, in a case where it is not necessary to distinguish between the first imaging device 14, the second imaging device 16, and the GPS terminal 18 in the description, the first imaging device 14, the second imaging device 16, and the GPS terminal 18 will be referred to as a "terminal device" without reference numerals. Further, hereinafter, in a case where it is not necessary to distinguish between the first imaging device 14 and the second imaging device 16 in the description, the first imaging device 14 and the second imaging device 16 will be referred to as an "imaging device" without reference numerals.

The GPS terminal 18 is attached to the clothes of a specific subject 30. Here, an aspect in which the GPS terminal 18 is attached to the clothes of the specific subject 30 is described as an example, but the aspect is merely an example. The GPS terminal 18 may be worn in the form of a band on the wrist of the specific subject 30 or may be incorporated in the shoes of the specific subject 30, and need only be carried by the specific subject 30. The specific subject 30 is an example of the "first specific subject", the "second specific subject", and the "third specific subject" according to the technique of the present disclosure.

The GPS terminal 18 has a GPS function, and activates the GPS function to acquire subject position specification information indicating latitude, longitude, and altitude for specifying the current position of the specific subject 30. The subject position specification information is, for example, information indicating latitude, longitude, and altitude derived in a case where the GPS terminal 18 receives radio waves from a plurality of GPS satellites (not shown) including a GPS satellite 20. In addition, the imaging device is also equipped with a GPS function as in the GPS terminal 18. The first imaging device 14 activates the GPS function to acquire first imaging device position information indicating the latitude, the longitude, and the altitude of the current position of the first imaging device 14. The second imaging device 16 activates the GPS function to acquire second imaging device position information indicating the latitude, the longitude, and the altitude of the current position of the second imaging device 16. Note that GPS is an example of GNSS, and other satellite positioning systems can also be used.

Here, the subject position specification information is an example of the "subject position specification information" according to the technique of the present disclosure, and the first imaging device position information and the second imaging device position information are an example of the "imaging device position information" according to the technique of the present disclosure.

Hereinafter, in a case where it is not necessary to distinguish between the first imaging device position information and the second imaging device position information in the description, the first imaging device position information and the second imaging device position information will be referred to as "imaging device position information". Further, hereinafter, in a case where it is not necessary to distinguish between the subject position specification information, the first imaging device position information, and the second imaging device position information, the subject position specification information, the first imaging device position information, and the second imaging device position information will be referred to as "terminal position information".

In the information processing system 10, information is exchanged between the terminal device and the information processing apparatus 12 through wireless communication, whereby the terminal position information is transmitted from the terminal device to the information processing apparatus 12. Then, the terminal position information transmitted from the terminal device is received by the information processing apparatus 12.

The information processing apparatus 12 and the terminal device perform wireless communication with each other through a wireless communication base station (not shown), whereby the terminal device requests the provision of various services of the information processing apparatus 12 and the information processing apparatus 12 provides the terminal device with a service corresponding the request from the terminal device.

In the example shown in FIG. 1, the first imaging device 14 is possessed and operated by a first person 26. Further, the second imaging device 16 is possessed and operated by a second person 28. In the example shown in FIG. 1, the first imaging device 14 images the inside of a soccer field 22 in a first imaging direction D1 at a first angle of view θa from a location where the first person 26 positioned outside the soccer field 22 is positioned, and the second imaging device 16 images the inside of the soccer field 22 in a second imaging direction D2 at a second angle of view θb from a location where the second person 28 is positioned. Here, the first angle of view θa and the second angle of view θb are the same angle of view. However, the technique of the present disclosure is not limited thereto, and the first angle of view θa and the second angle of view θb may be different angles of view from each other.

The first imaging direction D1 is, for example, a direction in which the specific subject 30 falls within the first angle of view θa. An example of the direction in which the specific subject 30 falls within the first angle of view θa includes a direction in which the specific subject 30 falls within the middle part of the first angle of view θa. Further, the second imaging direction D2 is, for example, a direction in which the specific subject 30 falls within the second angle of view θb. An example of the direction in which the specific subject 30 falls within the second angle of view θb includes a direction in which the specific subject 30 falls within the middle part of the second angle of view θb.

Further, here, a description is given using, as an example, an aspect in which the inside of the soccer field 22 is imaged from the outside of the soccer field 22, but the aspect is merely an example. The inside of the soccer field 22 may be imaged inside the soccer field 22. Alternatively, the inside of the soccer field 22 may be imaged from any place as long as the inside of the soccer field 22 can be imaged.

In the information processing system 10, the information processing apparatus 12 assists in deciding an imaging position at which a virtual viewpoint image can be generated. Here, the imaging position refers to the position of the imaging device, and the imaging position is decided by, for example, the first person 26 in the first embodiment. The virtual viewpoint image is an image generated on the basis of a first captured image obtained by being captured by the first imaging device 14 and a second captured image obtained by being captured by the second imaging device 16. For example, the virtual viewpoint image is an image showing the specific subject 30. In this case, the first captured image is, for example, an image obtained by imaging a region including the specific subject 30 with the first imaging device 14, and the second captured image is, for example, an image obtained by imaging a region including the specific subject 30 with the second imaging device 16. Hereinafter, in a case where it is not necessary to distinguish between the first captured image and the second captured image in the description, the first captured image and the second captured image will be referred to as a "captured image". Here, the first captured image and the second captured image are an example of the "plurality of captured images" according to the technique of the present disclosure, and the virtual viewpoint image is an example of the "virtual viewpoint image" according to the technique of the present disclosure.

Figure 2:
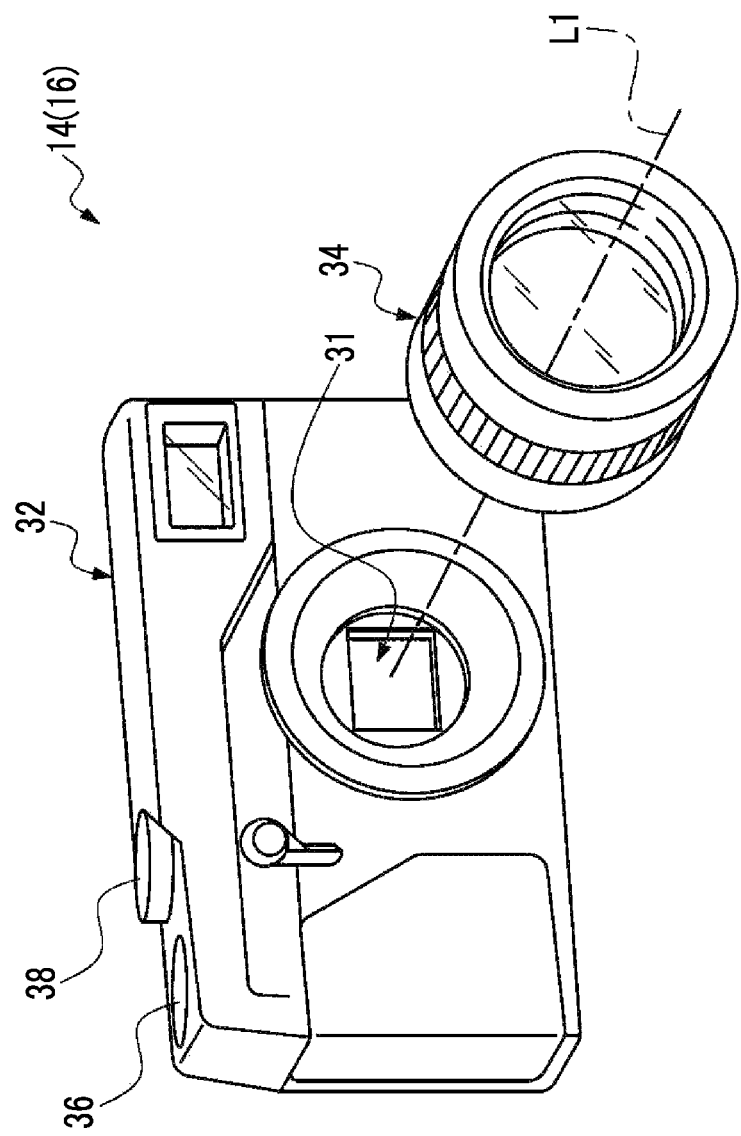
FIG. 2 is a schematic perspective view showing an example of an external configuration of an imaging device.

As shown in FIG. 2 as an example, the imaging device is a device for imaging having a CMOS image sensor 31 (see FIG. 2). The imaging device is equipped with an optical zoom function. Another type of image sensor, such as a CCD image sensor, may be adopted instead of the CMOS image sensor 31.

The imaging device is a digital camera in which an interchangeable lens is provided and a reflex mirror is not provided. The imaging device comprises an imaging device main body 32 and an interchangeable lens 34 that is interchangeably mounted on the imaging device main body 32. Here, an example of the imaging device includes the digital camera in which the interchangeable lens is provided and the reflex mirror is not provided, but the technique of the present disclosure is not limited thereto, and the imaging device may be another type of digital camera in which, for example, a fixed lens is provided.

The imaging device main body 32 is provided with a CMOS image sensor 31. In a case where the interchangeable lens 34 is mounted on the imaging device main body 32, subject light indicating the subject is transmitted through the interchangeable lens 34 along an optical axis L1, the image of the subject light is formed on the CMOS image sensor 31, and an image showing the subject is generated by the CMOS image sensor 31.

A release button 36 and a dial 38 are provided on the upper surface of the imaging device main body 32. The release button 36 is a button that is used for a user to press the button to give an imaging instruction to the imaging device main body 32. The dial 38 is operated in a case where an operation mode of an imaging system, an operation mode of a reproduction system, and the like are set, whereby an imaging mode and a reproduction mode are selectively set as the operation mode, in the imaging device.

Figure 3:
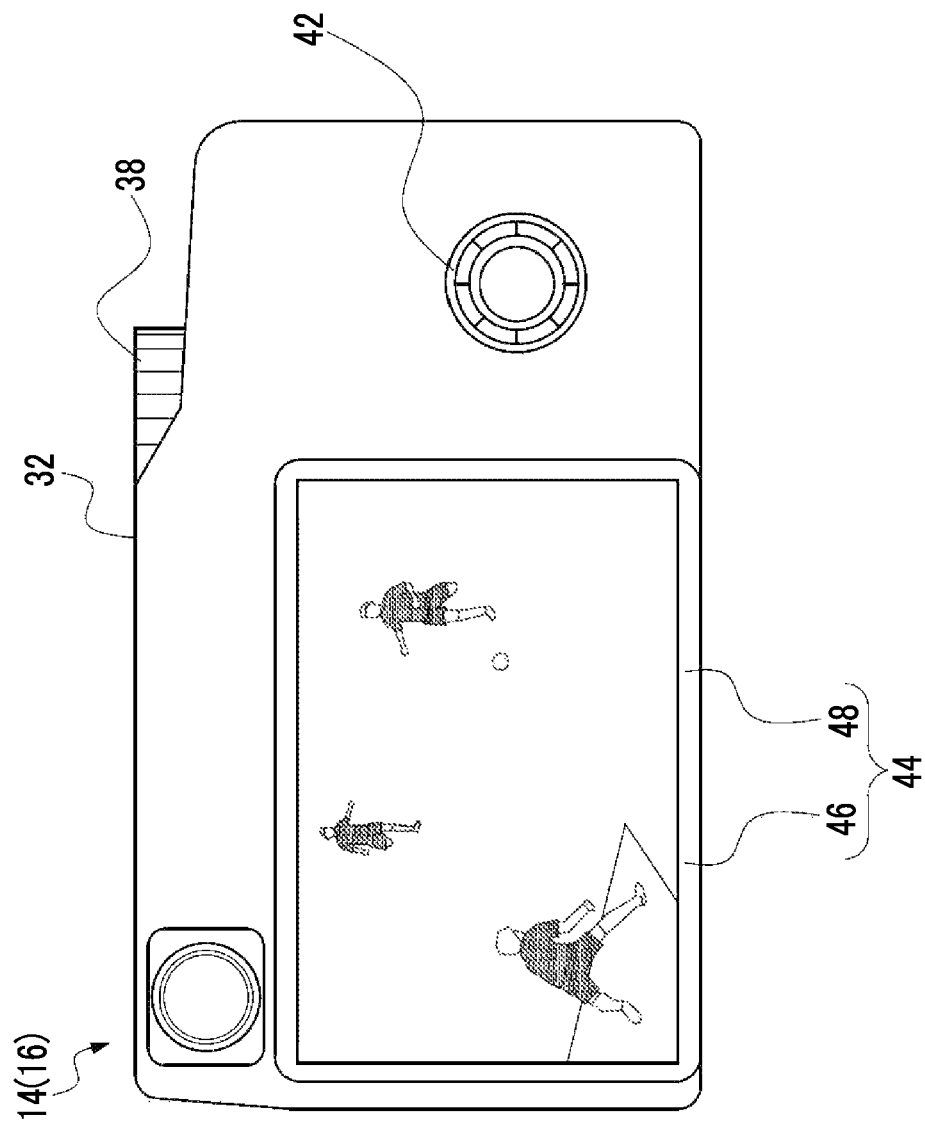
FIG. 3 is a rear view showing an example of the external configuration of the imaging device.

As shown in FIG. 3 as an example, an instruction key 42 and a touch panel/display 44 are provided on the rear surface of the imaging device main body 32.

The instruction key 42 receives various instructions. Here, the "various instructions" refer to, for example, an instruction to display a menu screen on which various menus can be selected, an instruction to select one or a plurality of menus, an instruction to settle a selected content, and an instruction to remove the selected content, and various instructions such as zoom in, zoon out, and frame-by-frame reproduction.

Figure 4:
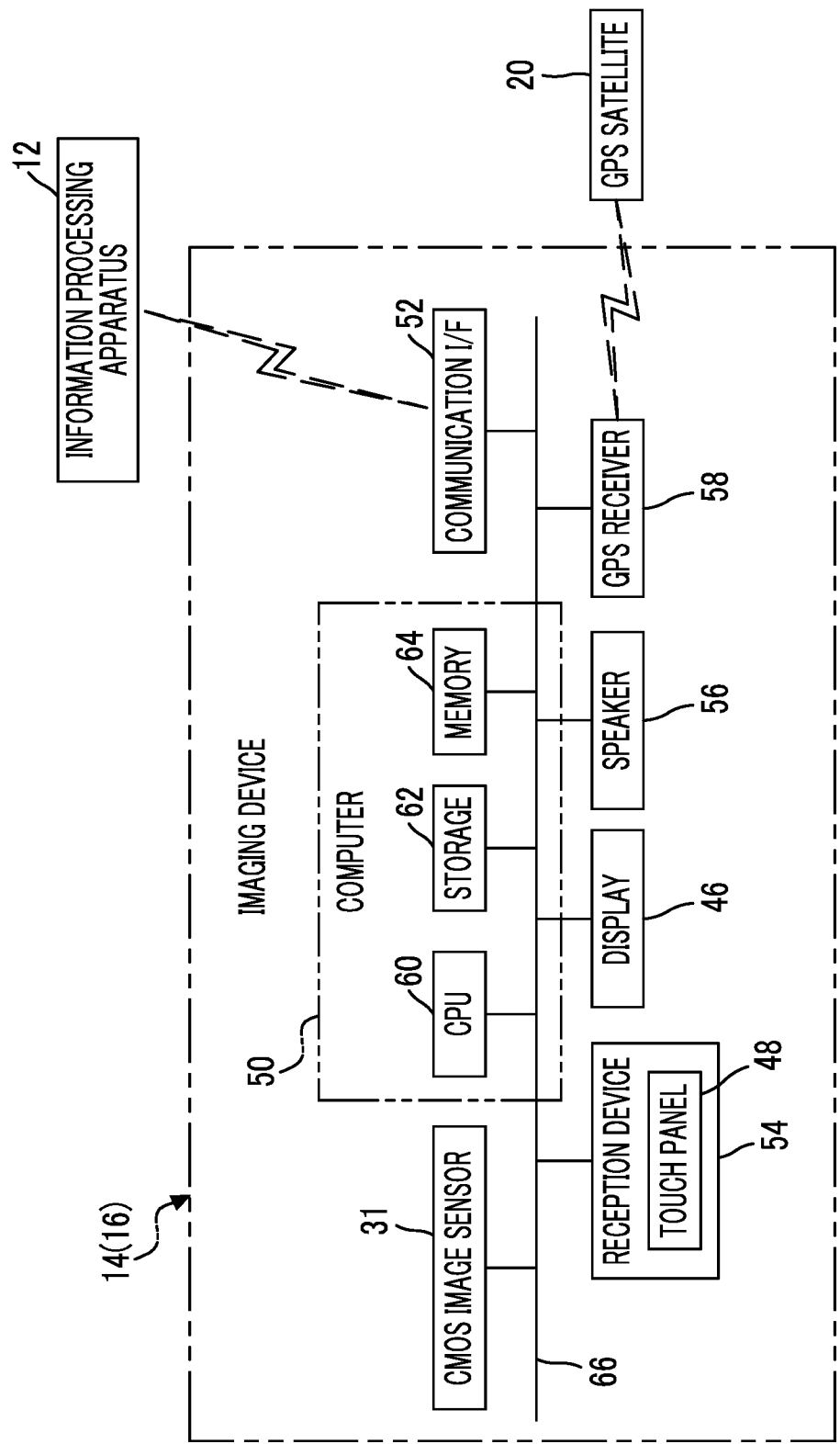
FIG. 4 is a block diagram showing an example of a hardware configuration of an electrical system of the imaging device.

The touch panel/display 44 comprises a display 46 and a touch panel 48 (see FIG. 4). An example of the display 46 includes an organic EL display. The display 46 may be another type of display, such as a liquid crystal display, instead of the organic EL display.

The display 46 displays images, text information, and the like. The display 46 is used to display a live view image obtained by consecutive imaging performed in a case where the imaging device is in the imaging mode. Further, the display 46 is used to display a still image obtained by being captured in a case where an instruction to capture the still image is given. Furthermore, the display 46 is used to display a reproduction image in a case where the imaging device is in the reproduction mode and to display a menu screen and the like. In the example shown in FIG. 3, the live view image is displayed on the display 46. Here, the display 46 is an example of the "first display" and the "second display" according to the technique of the present disclosure.

The touch panel 48 is a transmissive touch panel and is overlaid on a surface of a display region of the display 46. The touch panel 48 receives an instruction from the user by detecting contact with an instruction object such as a finger or a stylus pen.

Here, an example of the touch panel/display 44 includes an out-cell type touch panel/display in which the touch panel 48 is overlaid on the surface of the display region of the display 46, but the out-cell type touch panel/display is merely an example. For example, an on-cell type or in-cell type touch panel/display can be applied as the touch panel/display 44.

As shown in FIG. 4 as an example, the imaging device comprises the CMOS image sensor 31, the display 46, the touch panel 48, a computer 50, a communication I/F 52, a reception device 54, a speaker 56, and a GPS receiver 58. The computer 50 comprises a CPU 60, a storage 62, and a memory 64.

The CPU 60, the storage 62, and the memory 64 are connected to each other through a bus 66. In the example shown in FIG. 4, one bus is shown as the bus 66 for convenience of illustration, but the bus 66 includes a data bus, an address bus, a control bus, and the like.

The CPU 60 controls the entire imaging device. The storage 62 stores various parameters and various programs. The storage 62 is a non-volatile storage device. Here, an EEPROM is adopted as an example of the storage 62, but the technique of the present disclosure is not limited thereto, and a mask ROM, an HDD, an SSD, or the like may be adopted. The memory 64 is a volatile storage device. The memory 64 temporarily stores various kinds of information. The memory 64 is used as a work memory by the CPU 60. Here, a DRAM is adopted as an example of the memory 64, but the technique of the present disclosure is not limited thereto, and another type of volatile storage device, such as an SRAM, may be adopted.

The reception device 54 receives an instruction from the user or the like of the imaging device. The reception device 54 includes the release button 36 (see FIG. 2), the dial 38 (see FIGS. 2 and 3), and the instruction key 42, in addition to the touch panel 48. The reception device 54 is connected to the bus 66, and the instruction received by the reception device 54 is acquired by the CPU 60. The CPU 60 executes processing corresponding to the instruction received by the reception device 54.

The display 46 is connected to the bus 66 and displays various kinds of information under the control of the CPU 60. The speaker 56 is connected to the bus 66 and outputs sound under the control of the CPU 60. That is, under the control of the CPU 60, the speaker 56 receives an electrical signal indicating sound, converts the received electrical signal into sound, and outputs the sound obtained by the conversion, thereby making the user or the like perceive various kinds of information.

The GPS receiver 58 receives radio waves from the plurality of GPS satellites (not shown) including the GPS satellite 20 in response to an instruction from the CPU 60, and outputs received result information indicating the received result to the CPU 60. The CPU 60 calculates the above-mentioned imaging device position information (here, as an example, information indicating latitude, longitude, and altitude for specifying the current position of the imaging device) on the basis of the received result information received from the GPS receiver 58.

The communication I/F 52 is connected to the information processing apparatus 12 through a wireless communication base station (not shown) so as to be capable of wireless communication. The communication I/F 52 is realized, for example, by a device having an FPGA. The communication I/F 52 is connected to the bus 66 and controls the exchange of various kinds of information between the information processing apparatus 12 and the CPU 60.

Figure 5:
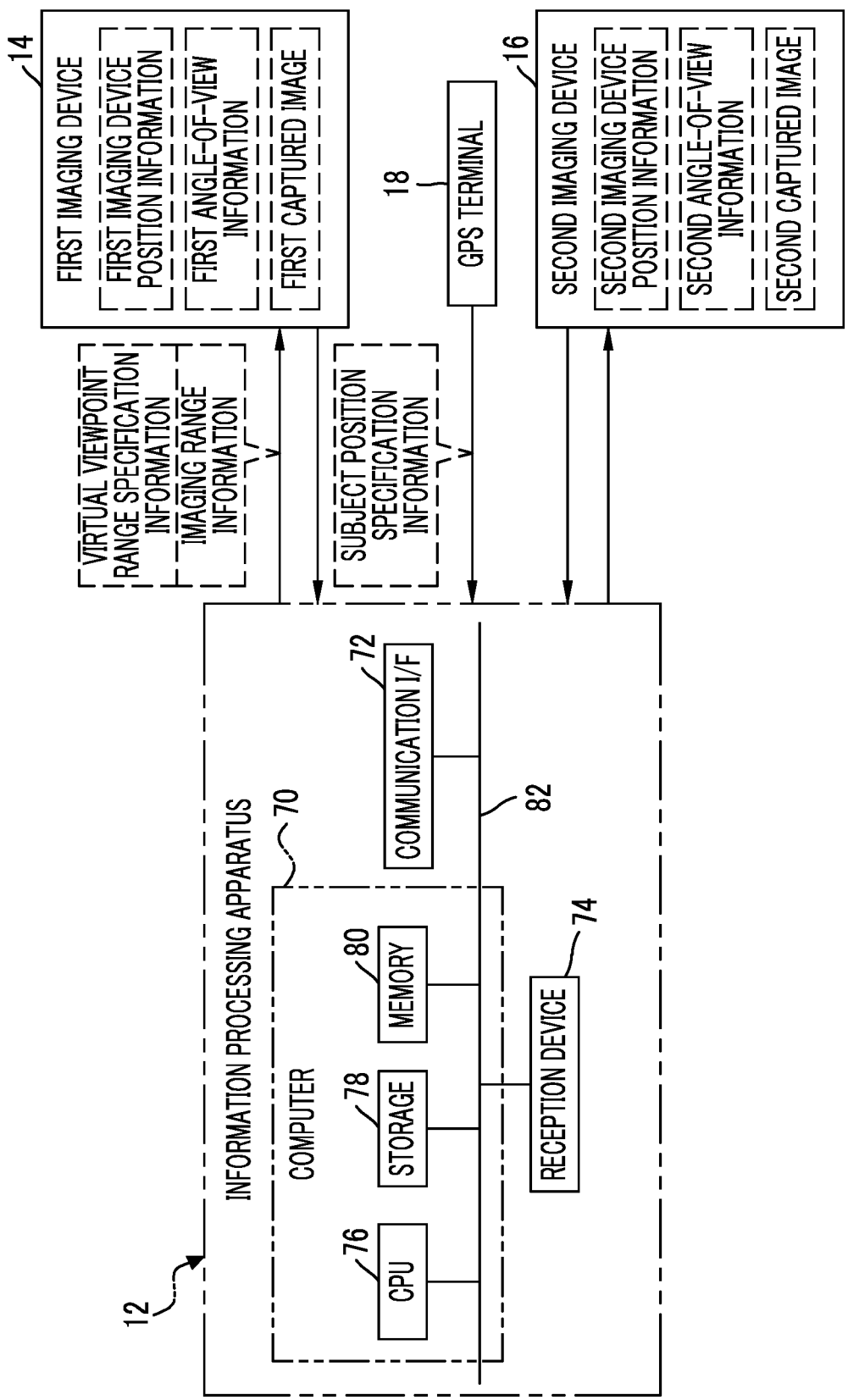
FIG. 5 is a block diagram showing an example of a hardware configuration of an electrical system of the information processing apparatus.

As shown in FIG. 5 as an example, the information processing apparatus 12 comprises a computer 70, a communication I/F 72, and a reception device 74. The computer 70 comprises a CPU 76, a storage 78, and a memory 80. Here, the CPU 76 is an example of the "processor" according to the technique of the present disclosure, and the storage 78 and the memory 80 are an example of the "memory" according to the technique of the present disclosure.

The CPU 76, the storage 78, and the memory 80 are connected to each other through a bus 82. In the example shown in FIG. 5, one bus is shown as the bus 82 for convenience of illustration, but the bus 82 includes a data bus, an address bus, a control bus, and the like.

The CPU 76 controls the entire information processing apparatus 12. The storage 78 stores various parameters and various programs. The storage 78 is a non-volatile storage device. Here, an EEPROM is adopted as an example of the storage 78, but the technique of the present disclosure is not limited thereto, and a mask ROM, an HDD, an SSD, or the like may be adopted. The memory 80 is a volatile storage device. The memory 80 temporarily stores various kinds of information. The memory 80 is used as a work memory by the CPU 76. Here, a DRAM is adopted as an example of the memory 80, but the technique of the present disclosure is not limited thereto, and another type of volatile storage device, such as an SRAM, may be adopted.

The communication I/F 72 is connected to the terminal device through the wireless communication base station (not shown) so as to be capable of wireless communication. The communication I/F 72 is realized, for example, by a device having an FPGA. The communication I/F 72 is connected to the bus 82 and takes charge of the exchange of various kinds of information between the terminal device and the CPU 76.

The reception device 74 receives an instruction from the user or the like of the information processing apparatus 12. An example of the reception device 74 includes a touch panel, a hard key, and a mouse. The reception device 74 is connected to the bus 82, and the instruction received by the reception device 74 is acquired by the CPU 76. The CPU 76 executes processing corresponding to the instruction received by the reception device 74.

The information processing apparatus 12 performs wireless communication with the first imaging device 14 to acquire the above-mentioned first imaging device position information, first angle-of-view information, and the above-mentioned first captured image, from the first imaging device 14. The first angle-of-view information is information indicating the above-mentioned first angle of view θa. Further, the information processing apparatus 12 performs wireless communication with the second imaging device 16 to acquire the above-mentioned second imaging device position information, second angle-of-view information, and the above-mentioned second captured image, from the second imaging device 16. The second angle-of-view information is information indicating the above-mentioned second angle of view θb. Further, the information processing apparatus 12 performs wireless communication with the GPS terminal 18 to acquire the above-mentioned subject position specification information from the GPS terminal 18. Hereinafter, in a case where it is not necessary to distinguish between the first angle-of-view information and the second angle-of-view information in the description, the first angle-of-view information and the second angle-of-view information will be referred to as "angle-of-view information". Here, the first angle-of-view information and the second angle-of-view information are an example of the "angle-of-view information" according to the technique of the present disclosure.

Although details will be described later, the CPU 76 of the information processing apparatus 12 generates virtual viewpoint range specification information and imaging range information on the basis of various kinds of information acquired from the terminal device, and transmits the generated virtual viewpoint range specification information and the generated imaging range information to the first imaging device 14. Here, the virtual viewpoint range specification information is an example of the "virtual viewpoint range specification information" according to the technique of the present disclosure, and the imaging range information is an example of the "imaging range information" according to the technique of the present disclosure.

Figure 6:
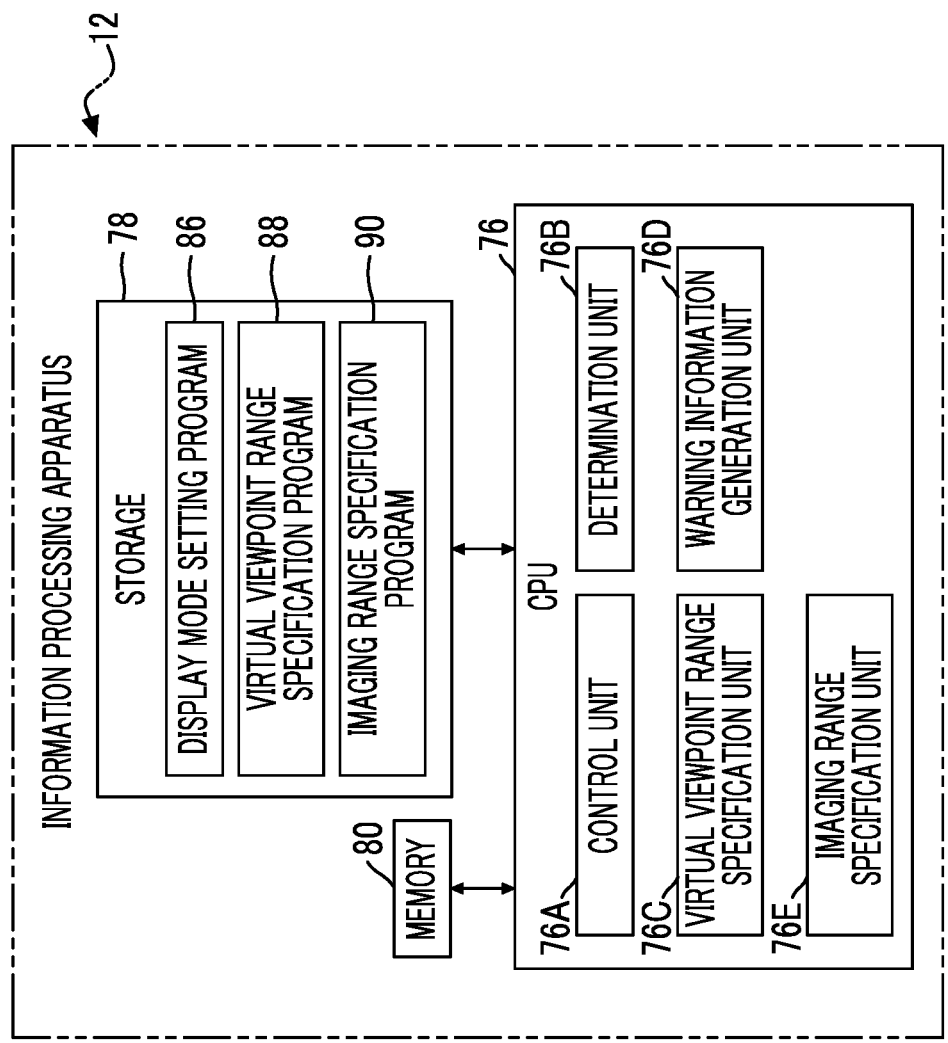
FIG. 6 is a block diagram showing an example of functions of main units of the information processing apparatus according to a first embodiment.

As shown in FIG. 6 as an example, the storage 78 of the information processing apparatus 12 stores a display mode setting program 86, a virtual viewpoint range specification program 88, and an imaging range specification program 90. Hereinafter, in a case where it is not necessary to distinguish between the display mode setting program 86, the virtual viewpoint range specification program 88, and the imaging range specification program 90 in the description, the display mode setting program 86, the virtual viewpoint range specification program 88, and the imaging range specification program 90 will be referred to as an "information processing apparatus program" without reference numerals.

The CPU 76 reads out the display mode setting program 86 from the storage 78 and executes the read-out display mode setting program 86 on the memory 80 to operate as a control unit 76A. In addition, the CPU 76 reads out the virtual viewpoint range specification program 88 from the storage 78 and executes the read-out virtual viewpoint range specification program 88 on the memory 80 to operate as the control unit 76A, a determination unit 76B, a virtual viewpoint range specification unit 76C, and a warning information generation unit 76D. Further, the CPU 76 reads out the imaging range specification program 90 from the storage 78 and executes the read-out imaging range specification program 90 on the memory 80 to operate as the control unit 76A and an imaging range specification unit 76E.

Figure 7:
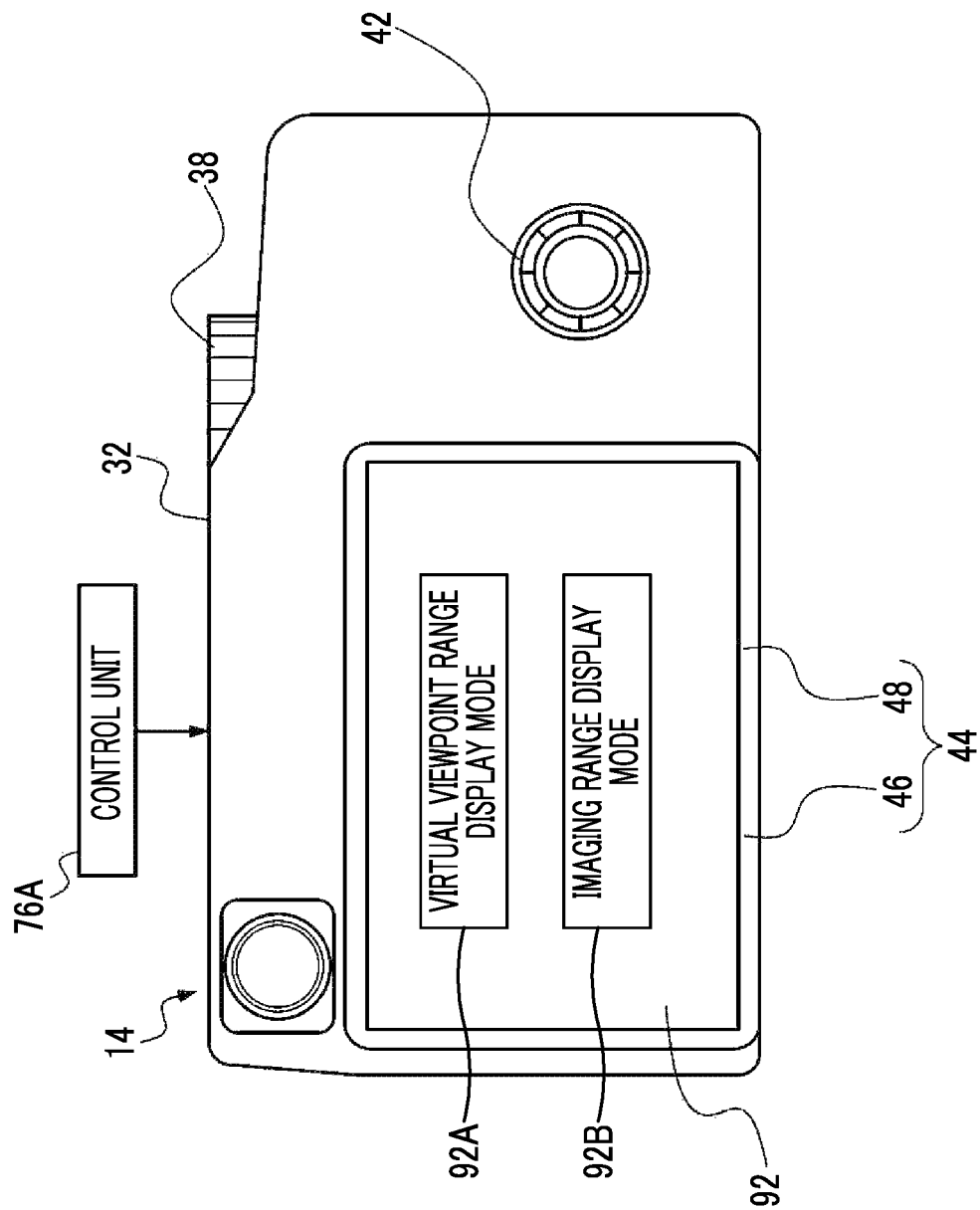
FIG. 7 is a rear view showing an example of an external configuration of a first imaging device in a case where an operation mode selection screen is displayed on a touch panel/display of the first imaging device.

As shown in FIG. 7 as an example, the control unit 76A performs wireless communication with the first imaging device 14 to cause the display 46 of the first imaging device 14 to display an operation mode selection screen 92. A first soft key 92A and a second soft key 92B are displayed on the operation mode selection screen 92. In a case where the first soft key 92A is turned on by the user (for example, the first person 26) through the touch panel 48, the operation mode of the information processing apparatus 12 and the first imaging device 14 becomes a virtual viewpoint range display mode. Further, in a case where the second soft key 92B is turned on by the user (for example, the first person 26) through the touch panel 48, the operation mode of the information processing apparatus 12 and the first imaging device 14 becomes an imaging range display mode.

In a case where the virtual viewpoint range display mode is set for the information processing apparatus 12, the CPU 76 executes the virtual viewpoint range specification program 88 in the information processing apparatus 12. Further, in a case where the imaging range display mode is set for the information processing apparatus 12, the CPU 76 executes the imaging range specification program 90 in the information processing apparatus 12.

Figure 8:
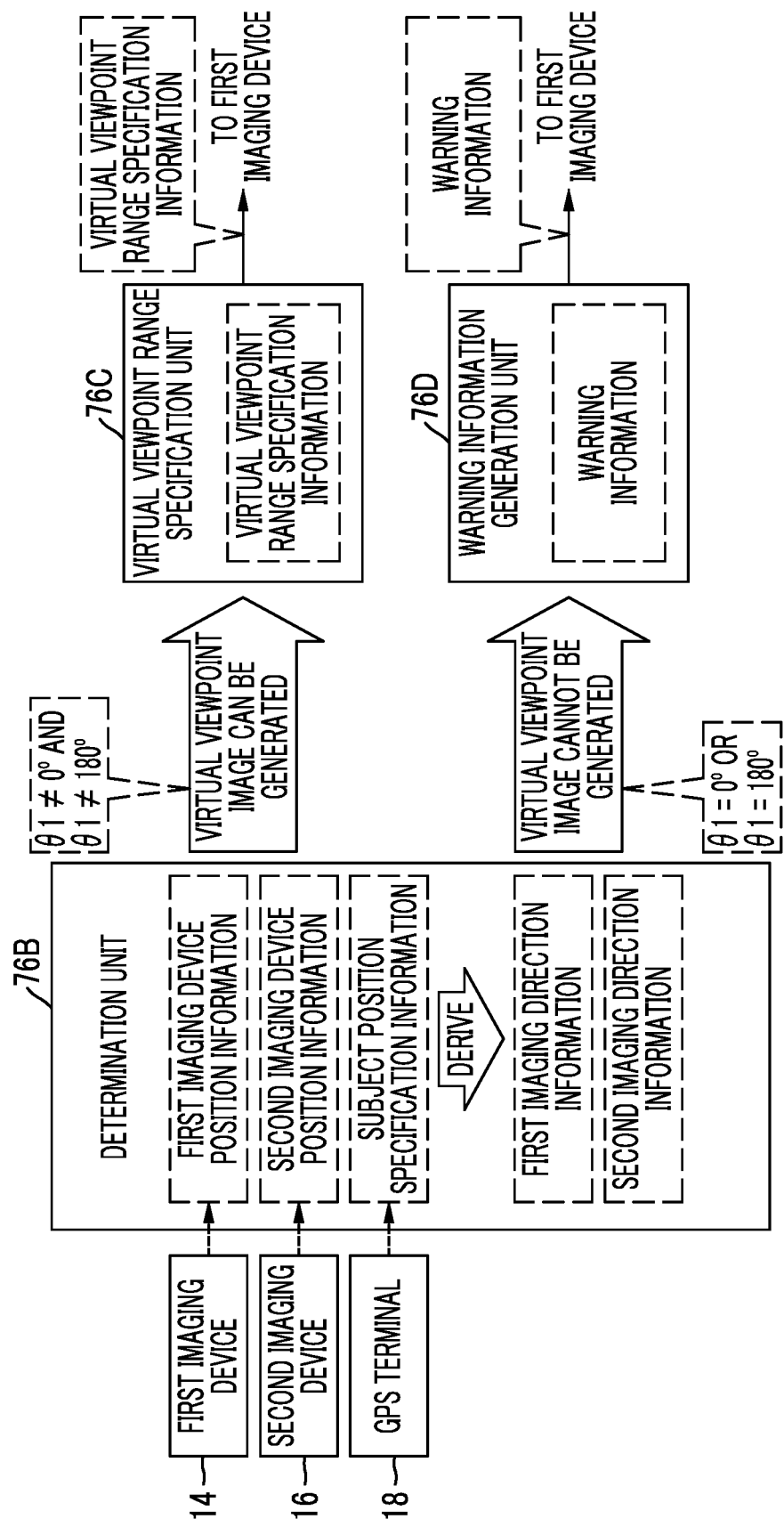
FIG. 8 is a conceptual diagram provided for illustrating an example of a content of virtual viewpoint range specification processing according to the first embodiment.

In the virtual viewpoint range display mode, as shown in FIG. 8 as an example, the determination unit 76B acquires the first imaging device position information from the first imaging device 14, acquires the second imaging device position information from the second imaging device 16, and acquires the subject position specification information from the GPS terminal 18. Then, the determination unit 76B acquires first imaging direction information indicating the above-mentioned first imaging direction D1 and second imaging direction information indicating the above-mentioned second imaging direction D2 on the basis of the first imaging device position information, the second imaging device position information, and the subject position specification information. Specifically, the determination unit 76B derives the first imaging direction information indicating the above-mentioned first imaging direction D1, on the basis of the first imaging device position information and the subject position specification information. Further, the determination unit 76B derives the second imaging direction information indicating the above-mentioned second imaging direction D2, on the basis of the second imaging device position information and the subject position specification information.

Hereinafter, in a case where it is not necessary to distinguish between the first imaging direction information and the second imaging direction information in the description, the first imaging direction information and the second imaging direction information will be referred to as "imaging direction information". Further, hereinafter, in a case where it is not necessary to distinguish between the first imaging direction D1 and the second imaging direction D2 in the description, the first imaging direction D1 and the second imaging direction D2 will be referred to as an "imaging direction". Here, the first imaging direction information and the second imaging direction information are an example of the "imaging direction information" according to the technique of the present disclosure, and the first imaging direction D1 and the second imaging direction D2 are an example of the "imaging direction" according to the technique of the present disclosure.

The determination unit 76B determines whether or not a range within the smaller angle θ1, out of angles θ1 and θ2 formed by the first imaging direction D1 and the second imaging direction D2 with respect to the specific subject 30 (see FIG. 1), is a virtual viewpoint range in which the virtual viewpoint image can be generated. That is, the determination unit 76B determines that the range within the angle θ1 is the virtual viewpoint range in which the virtual viewpoint image can be generated, in a case where the angle θ1 is not equal to 0 degrees and the angle θ1 is not equal to 180 degrees, and the determination unit 76B determines that the range within the angle θ1 is not the virtual viewpoint range in which the virtual viewpoint image can be generated, in a case where the angle θ1 is equal to 0 degrees and the angle θ1 is equal to 180 degrees. Hereinafter, for convenience of description, the virtual viewpoint range in which the virtual viewpoint image can be generated will be also simply referred to as a "virtual viewpoint range". Here, the virtual viewpoint range is an example of the "virtual viewpoint range" according to the technique of the present disclosure.

The virtual viewpoint range specification unit 76C specifies the virtual viewpoint range. Specifically, in a case where the determination unit 76B determines that the range within the angle θ1 is the virtual viewpoint range, the virtual viewpoint range specification unit 76C acquires the first imaging device position information, the second imaging device position information, the first imaging direction information, and the second imaging direction information. Next, the virtual viewpoint range specification unit 76C derives the virtual viewpoint range specification information capable of specifying the virtual viewpoint range, on the basis of the first imaging device position information, the second imaging device position information, the first imaging direction information, and the second imaging direction information. Then, the virtual viewpoint range specification unit 76C outputs the derived virtual viewpoint range specification information to the first imaging device 14.

On the other hand, in a case where the determination unit 76B determines that the range within the angle θ1 is not the virtual viewpoint range in which the virtual viewpoint image can be generated, the warning information generation unit 76D generates warning information and outputs the generated warning information to the first imaging device 14. The warning information refers to information for alerting the user (for example, the first person 26) that the range within the angle θ1 is not the virtual viewpoint range. The warning information is information including the first imaging device position information, the second imaging device position information, the first imaging direction information, and the second imaging direction information.

Figure 9:
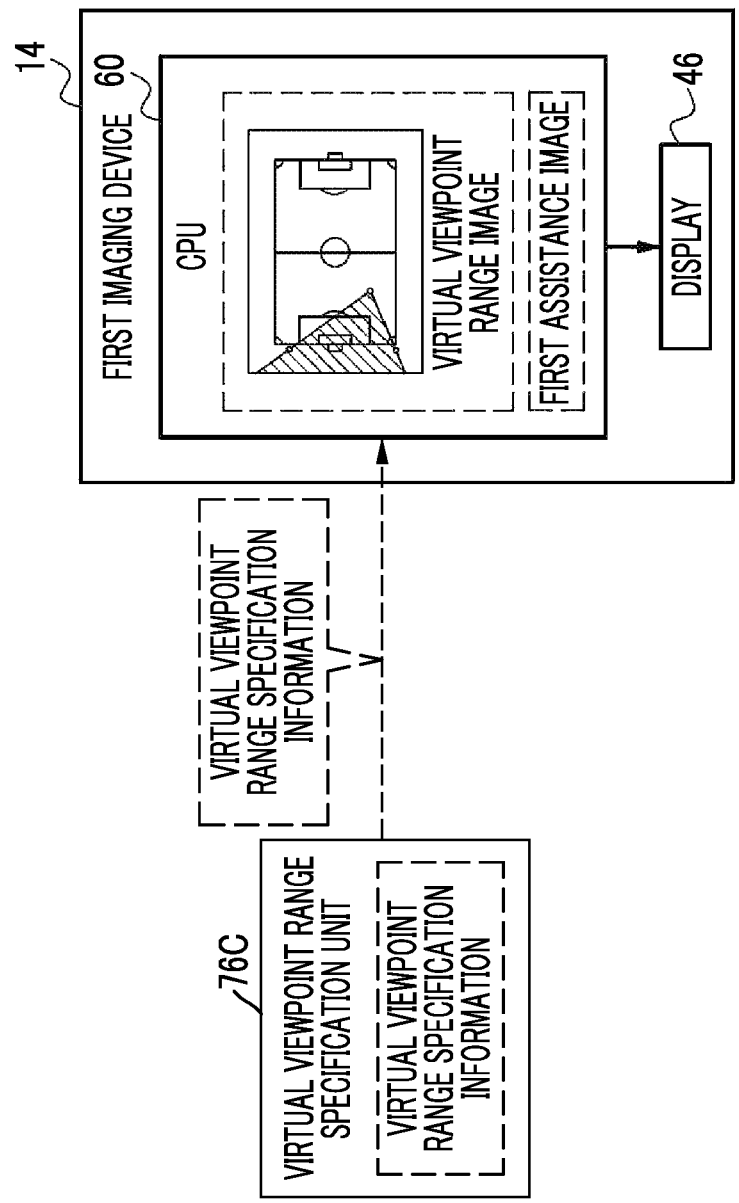
FIG. 9 is a conceptual diagram provided for illustrating an example of the content of the virtual viewpoint range specification processing according to the first embodiment.

As shown in FIG. 9 as an example, the CPU 60 of the first imaging device 14 generates a virtual viewpoint range image and a first assistance message on the basis of the virtual viewpoint range specification information received from the virtual viewpoint range specification unit 76C. The virtual viewpoint range image is an image in which the virtual viewpoint range can be specified. In the example shown in FIG. 9, a hatched region in which diagonal lines are hatched with respect to the plan view image of the soccer field 22 (hereinafter, also referred to as a "soccer field plan view image") is shown in the virtual viewpoint range image, as the virtual viewpoint range. The first assistance message is a message for making the user (for example, the first person 26) perceive that the inside of the hatched region is a range in which a virtual viewpoint (for example, a virtual camera) can be installed. The CPU 60 causes the display 46 to display the virtual viewpoint range image and the first assistance message. Here, the virtual viewpoint range image is an example of the "virtual viewpoint range image" according to the technique of the present disclosure.

Figure 10:
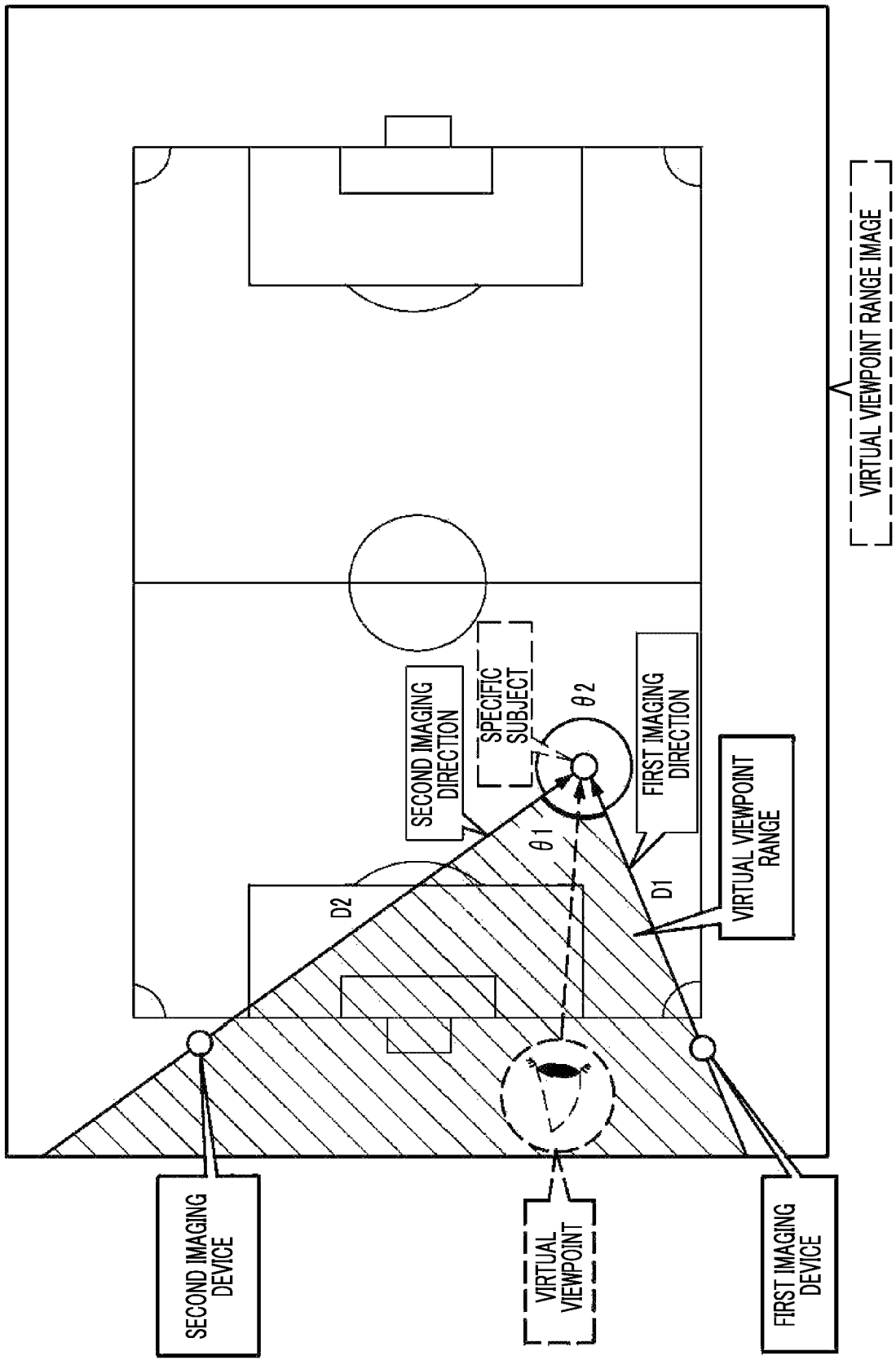
FIG. 10 is a conceptual diagram provided for illustrating an example of a virtual viewpoint range image generated by the virtual viewpoint range specification processing according to the first embodiment.

As shown in FIG. 10 as an example, the soccer field plan view image, the virtual viewpoint range defined by the angle θ1, the current position of the first imaging device 14, and the current position of the second imaging device 16 are displayed on the virtual viewpoint range image. Specifically, the virtual viewpoint range image is an image in which the virtual viewpoint range, a mark indicating the current position of the first imaging device 14, and a mark indicating the current position of the second imaging device 16 are superimposed and displayed on the soccer field plan view image.

The virtual viewpoint range is a range specified by the virtual viewpoint range specification information derived by the virtual viewpoint range specification unit 76C, and the hatched region within the smaller angle θ1 out of the angles θ1 and θ2 is shown as the virtual viewpoint range in the example shown in FIG. 10. Further, in the example shown in FIG. 10, an image showing a human eye is shown as an image showing the virtual viewpoint, but the image is merely an example, and an image showing a virtual camera may be used. Further, the image showing the virtual viewpoint may or may not be displayed.

The current position of the first imaging device 14 is a position indicated by the first imaging device position information. The current position of the second imaging device 16 is a position indicated by the second imaging device position information. In the example shown in FIG. 10, each of the current position of the first imaging device 14 and the current position of the second imaging device 16 is indicated by a circular mark. The circular mark is merely an example, and any image may be used as long as an image in which each of the current position of the first imaging device 14 and the current position of the second imaging device 16 can be visually specified is used.

In the first embodiment, the first imaging device position information and the second imaging device position information are included in the virtual viewpoint range specification information. Therefore, the CPU 60 of the first imaging device 14 displays the current position of the first imaging device 14 on the virtual viewpoint range image on the basis of the first imaging device position information included in the virtual viewpoint range specification information. Further, the CPU 60 of the first imaging device 14 displays the current position of the second imaging device 16 on the virtual viewpoint range image on the basis of the second imaging device position information included in the virtual viewpoint range specification information.

Figure 11:
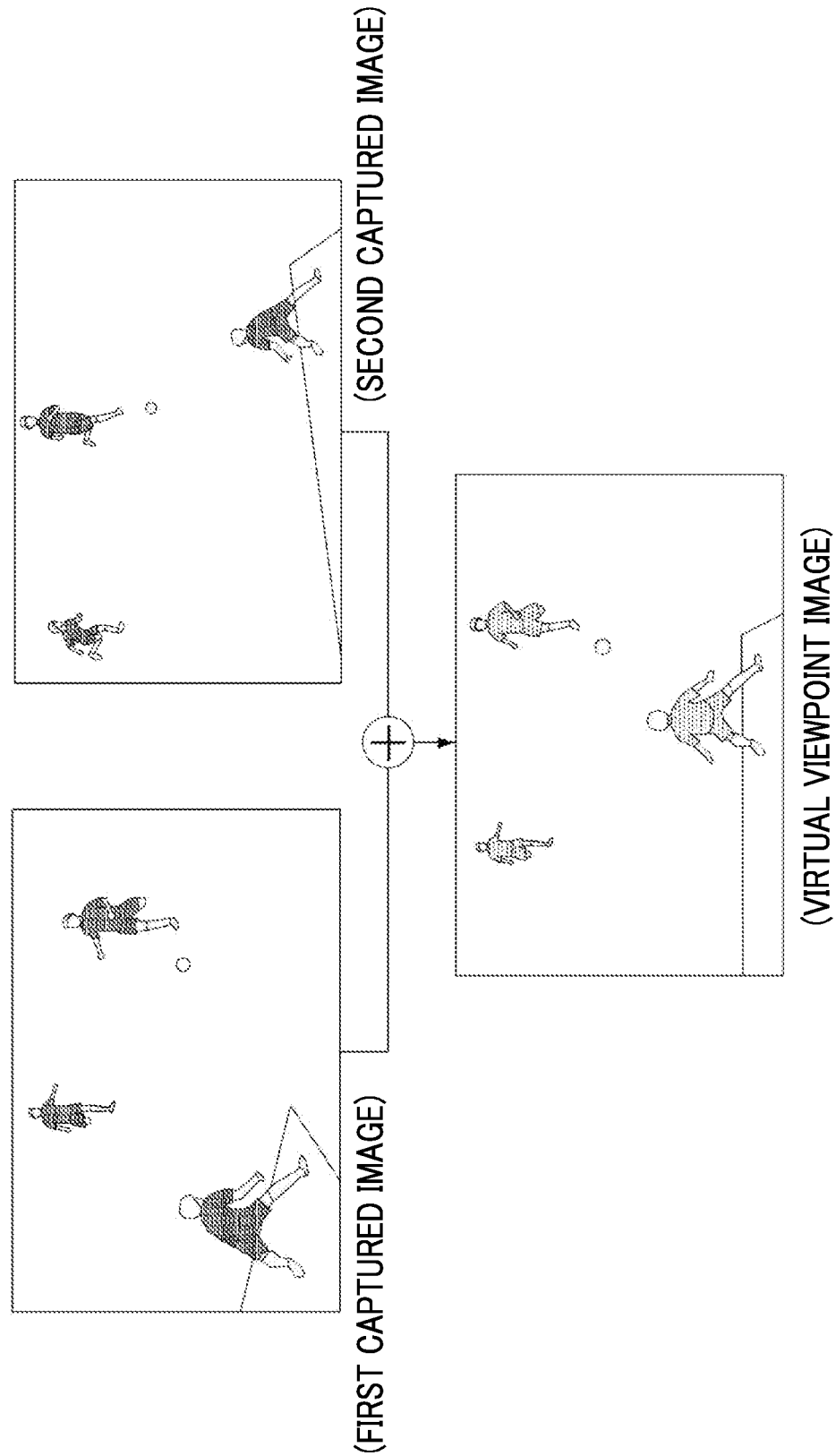
FIG. 11 is a conceptual diagram used to illustrate an example of the virtual viewpoint image generated from a first captured image and a second captured image.

For example, the virtual viewpoint image in a case where the region including the specific subject 30 in the soccer field 22 is viewed from the virtual viewpoint shown in FIG. 10 is a virtual image, and is generated as 3D polygons by a specific device (not shown) on the basis of the first captured image and the second captured image as shown in FIG. 11 as an example. Here, examples of the specific device include the information processing apparatus 12, the first imaging device 14, a server, and/or a personal computer.

Figure 12:
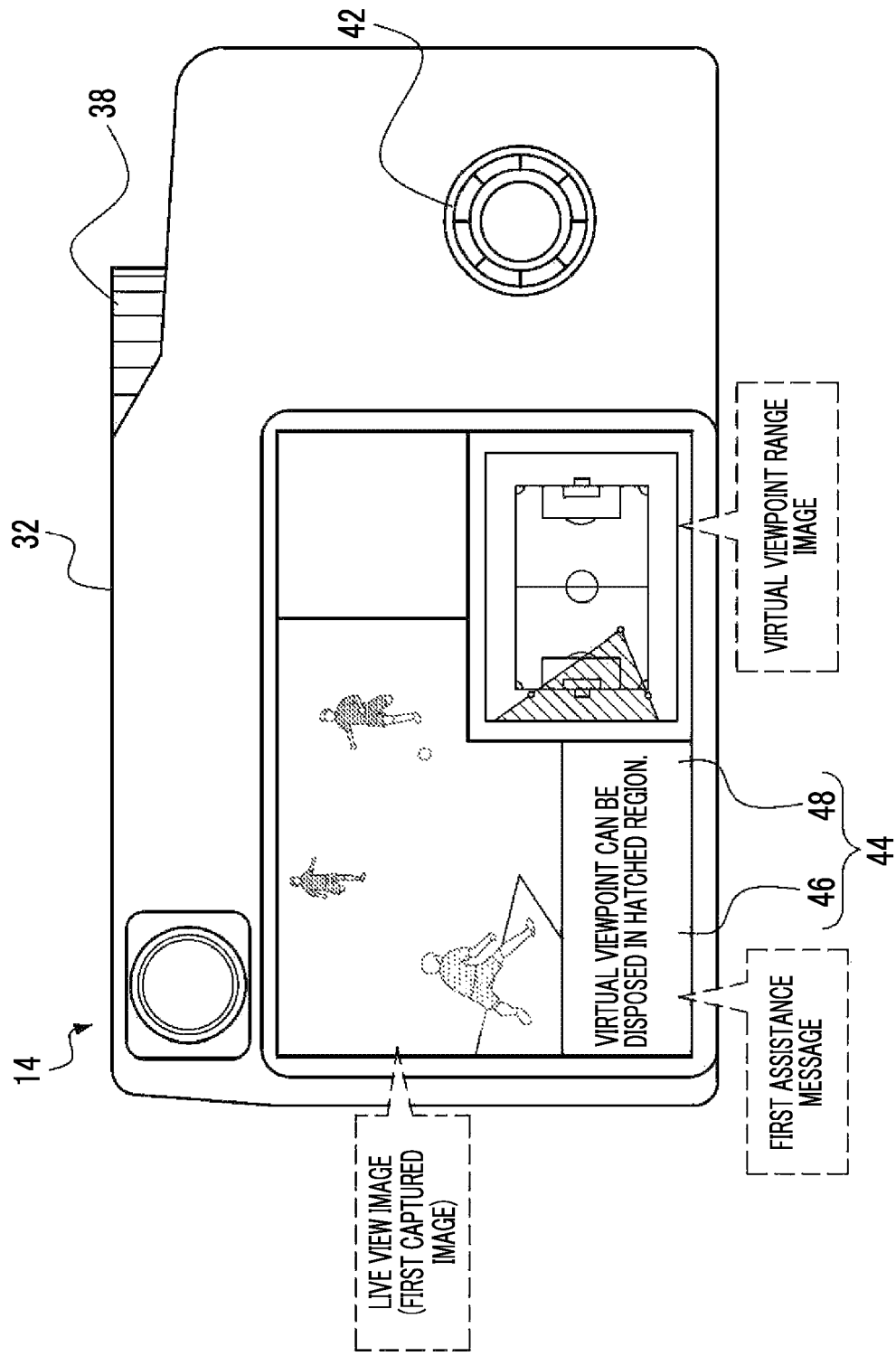
FIG. 12 is a rear view showing an example of the external configuration of the first imaging device in a case where a live view image, the virtual viewpoint range image, and a first assistance message are displayed on the touch panel/display of the first imaging device.

In a case where the first imaging device 14 and the second imaging device 16 perform imaging from imaging positions and imaging directions in which the virtual viewpoint image can be generated on the basis of the first captured image and the second captured image, the display 46 of the first imaging device 14 displays the first captured image as the live view image, and displays the first assistance message and the virtual viewpoint range image. In the example shown in FIG. 12, the same image as the virtual viewpoint range image shown in FIG. 10 is displayed as the virtual viewpoint range image, and a message "The virtual viewpoint can be disposed in the hatched region" is displayed as the first assistance message.

Figure 13:
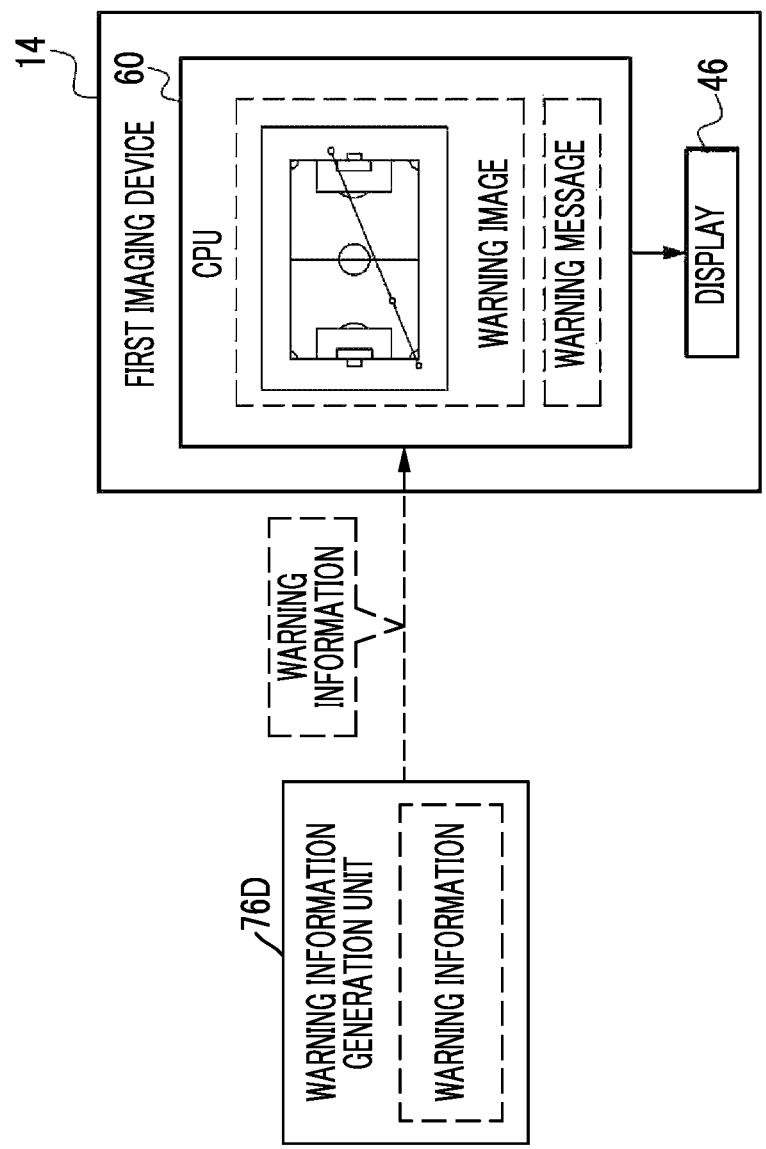
FIG. 13 is a conceptual diagram used to illustrate an example of the content of the virtual viewpoint range specification processing according to the first embodiment.

On the other hand, in a case where the determination unit 76B determines that the range within the angle θ1 is not the virtual viewpoint range in which the virtual viewpoint image can be generated, the CPU 60 of the first imaging device 14 generates a warning image and a warning message on the basis of the warning information received from the warning information generation unit 76D, as shown in FIG. 13 as an example. The warning image is an image in which the virtual viewpoint range cannot be specified. The warning message is a message for making the user (for example, the first person 26) perceive that the virtual viewpoint range cannot be specified. The CPU 60 causes the display 46 to display the warning image and the warning message.

Figure 14:
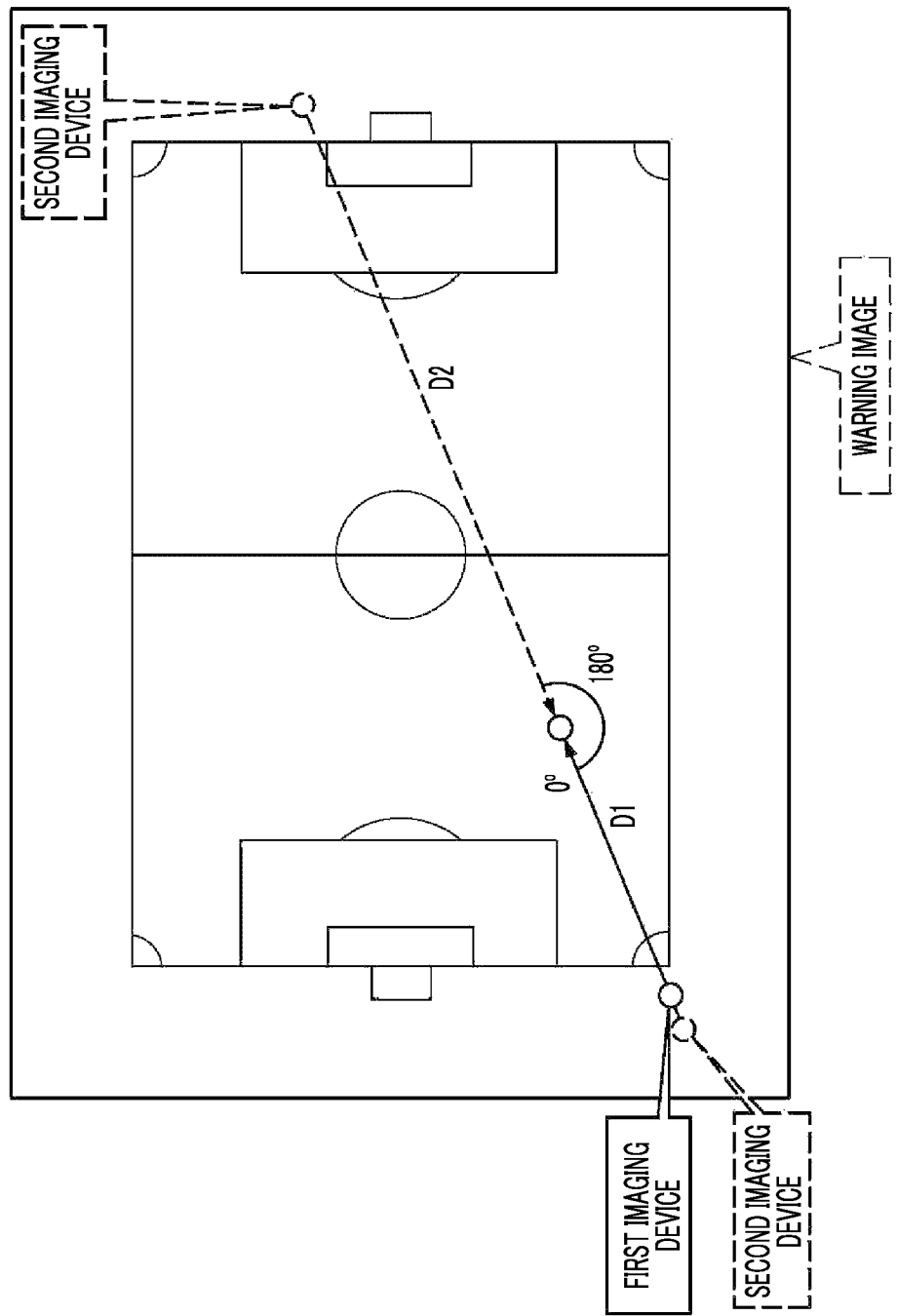
FIG. 14 is a conceptual diagram provided for illustrating an example of a warning image generated by the virtual viewpoint range specification processing according to the first embodiment.

As shown in FIG. 14 as an example, in a case where the angle formed by the first imaging direction D1 and the second imaging direction D2 with respect to the specific subject 30 (see FIG. 1) is 0 degrees, for example, in a case where the second imaging device 16 performs imaging in a state in which the second person 28 is positioned behind the first person 26, the first imaging device 14 images the specific subject 30 from the same direction as the direction of the second imaging device 16. Therefore, in the case of this disposition, it is not possible to generate the virtual viewpoint image on the basis of the first captured image and the second captured image. Further, in a case where the angle formed by the first imaging direction D1 and the second imaging direction D2 with respect to the specific subject 30 (see FIG. 1) is 180 degrees, for example, in a case where the second imaging device 16 performs imaging in a state in which the second person 28 faces the first person 26 straight in front of the first person 26, it is also not possible to generate the virtual viewpoint image on the basis of the first captured image and the second captured image. This is because the first imaging device 14 images the specific subject 30 from a direction completely opposite to the direction of the second imaging device 16.

In this case, the soccer field plan view image, the current position of the first imaging device 14, and the current position of the second imaging device 16 are displayed on the warning image. Specifically, the warning image is an image in which the mark indicating the current position of the first imaging device 14 and the mark indicating the current position of the second imaging device 16 are superimposed and displayed on the soccer field plan view image.

The current position of the first imaging device 14 is the position indicated by the first imaging device position information. The current position of the second imaging device 16 is the position indicated by the second imaging device position information. In the example shown in FIG. 14, each of the current position of the first imaging device 14 and the current position of the second imaging device 16 is indicated by a circular mark. The circular mark is merely an example, and any image may be used as long as an image in which each of the current position of the first imaging device 14 and the current position of the second imaging device 16 can be visually specified is used.

In the first embodiment, the first imaging device position information and the second imaging device position information are included in the warning information. Therefore, the CPU 60 of the first imaging device 14 displays the mark indicating the current position of the first imaging device 14 on the warning image on the basis of the first imaging device position information included in the warning information. Further, the CPU 60 of the first imaging device 14 displays the mark indicating the current position of the second imaging device 16 on the warning image on the basis of the second imaging device position information included in the warning information.

Figure 15:
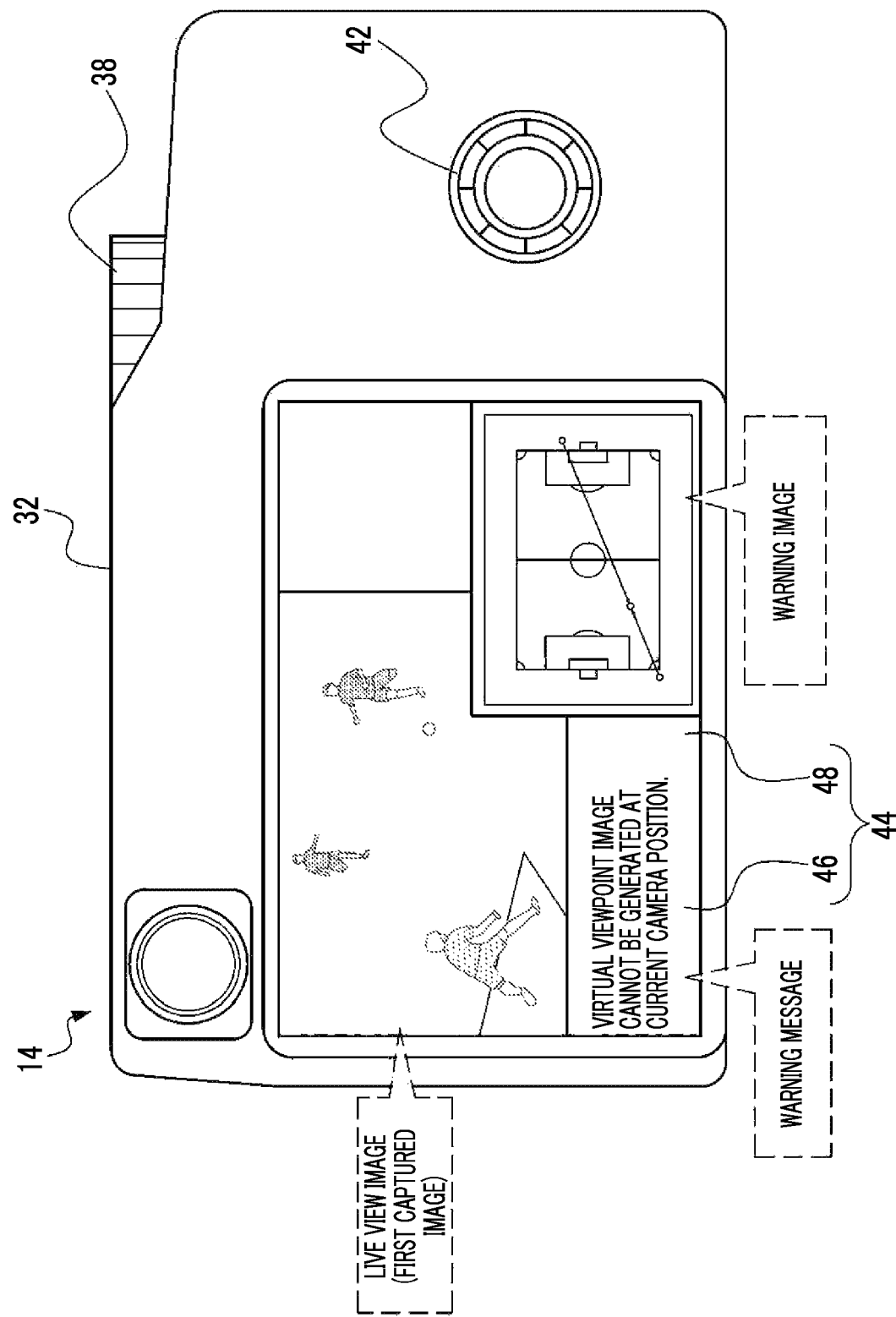
FIG. 15 is a rear view showing an example of the external configuration of the first imaging device in a case where the live view image, the warning image, and a warning message are displayed on the touch panel/display of the first imaging device.

In a case where the first imaging device 14 and the second imaging device 16 perform imaging from imaging positions and imaging directions in which the virtual viewpoint image cannot be generated, the display 46 of the first imaging device 14 displays the first captured image as the live view image, and displays the warning message and the warning image. In the example shown in FIG. 15, the same image as the warning image shown in FIG. 14 is displayed as the warning image, and a message "The virtual viewpoint image cannot be generated at the current camera position" is displayed as the warning message.

Figure 16:
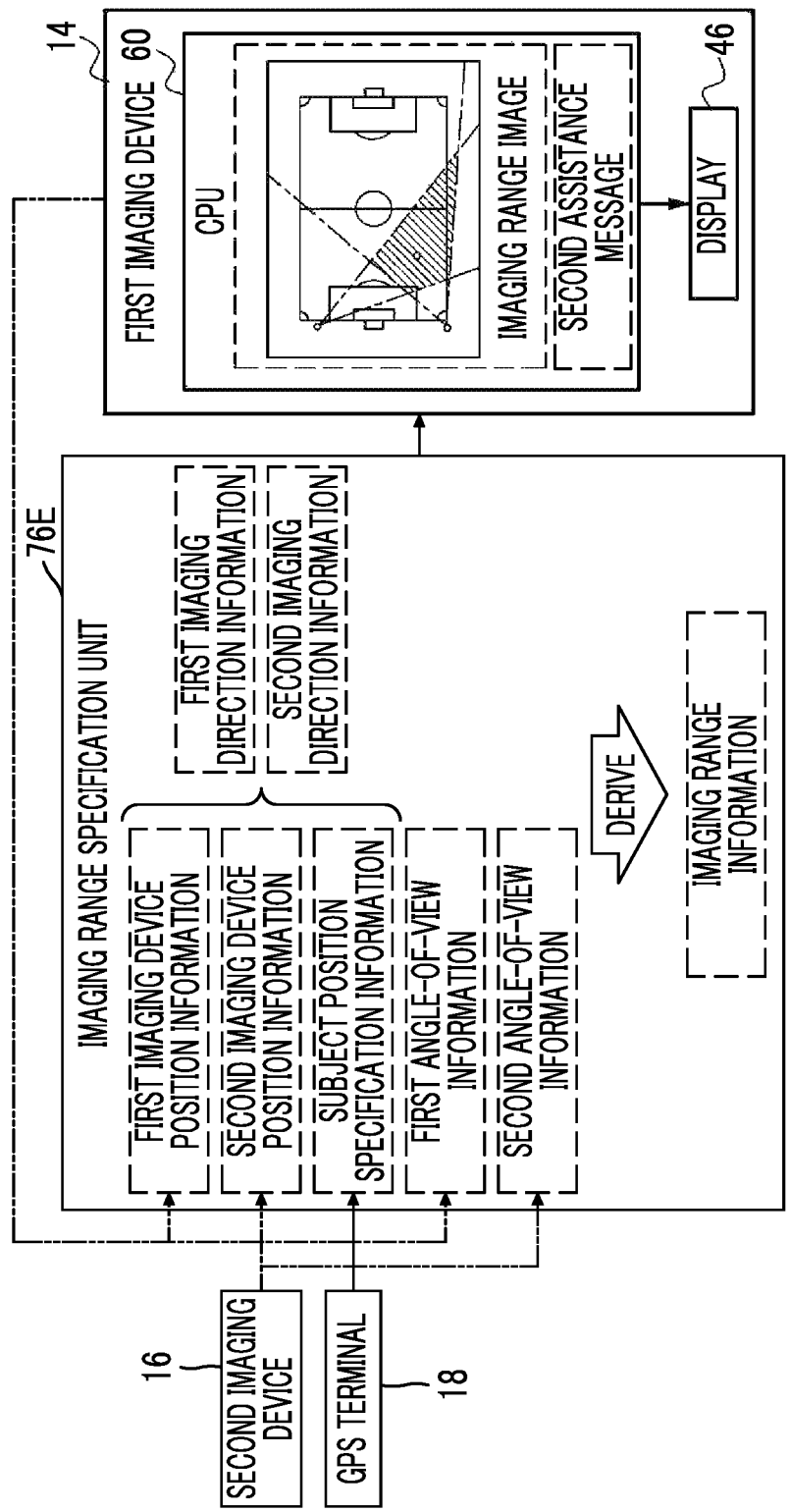
FIG. 16 is a conceptual diagram used to illustrate an example of a content of imaging range specification processing according to the first embodiment.

In a case where the second soft key 92B is turned on through the operation mode selection screen 92 (see FIG. 7) and the imaging range display mode is set for the information processing apparatus 12, the imaging range specification unit 76E acquires the first imaging device position information and the first angle-of-view information from the first imaging device 14, acquires the second imaging device position information and the second angle-of-view information from the second imaging device 16, and acquires the subject position specification information from the GPS terminal 18, as shown in FIG. 16 as an example. Then, the imaging range specification unit 76E acquires the first imaging direction information indicating the above-mentioned first imaging direction D1 and the second imaging direction information indicating the above-mentioned second imaging direction D2 on the basis of the first imaging device position information, the second imaging device position information, the subject position specification information. Specifically, the imaging range specification unit 76E derives the first imaging direction information indicating the above-mentioned first imaging direction D1, on the basis of the first imaging device position information and the subject position specification information. Further, the imaging range specification unit 76E derives the second imaging direction information indicating the above-mentioned second imaging direction D2, on the basis of the second imaging device position information and the subject position specification information.

The imaging range specification unit 76E derives the imaging range information on the basis of the first imaging device position information, the second imaging device position information, the first imaging direction information, the second imaging direction information, the first angle-of-view information, and the second angle-of-view information. The imaging range information refers to information regarding an imaging range overlapped by the first imaging device 14 and the second imaging device 16, in which the virtual viewpoint image can be generated on the basis of the first captured image and the second captured image. The imaging range specification unit 76E outputs the derived imaging range information to the first imaging device 14. Hereinafter, for convenience of description, the imaging range overlapped by the first imaging device 14 and the second imaging device 16, in which the virtual viewpoint image can be generated on the basis of the first captured image and the second captured image, will be also simply referred to as an "imaging range".

The CPU 60 of the first imaging device 14 generates an imaging range image and a second assistance message on the basis of the imaging range information received from the imaging range specification unit 76E. The imaging range image is an image in which the imaging range can be specified. In the example shown in FIG. 16, in the imaging range image, a cross hatched region is shown as the imaging range with respect to the soccer field plan view image. The second assistance message is a message for making the user (for example, the first person 26) perceive that the virtual viewpoint image of a subject existing in the hatched region can be generated. The CPU 60 causes the display 46 to display the imaging range image and the second assistance message.

Figure 17:
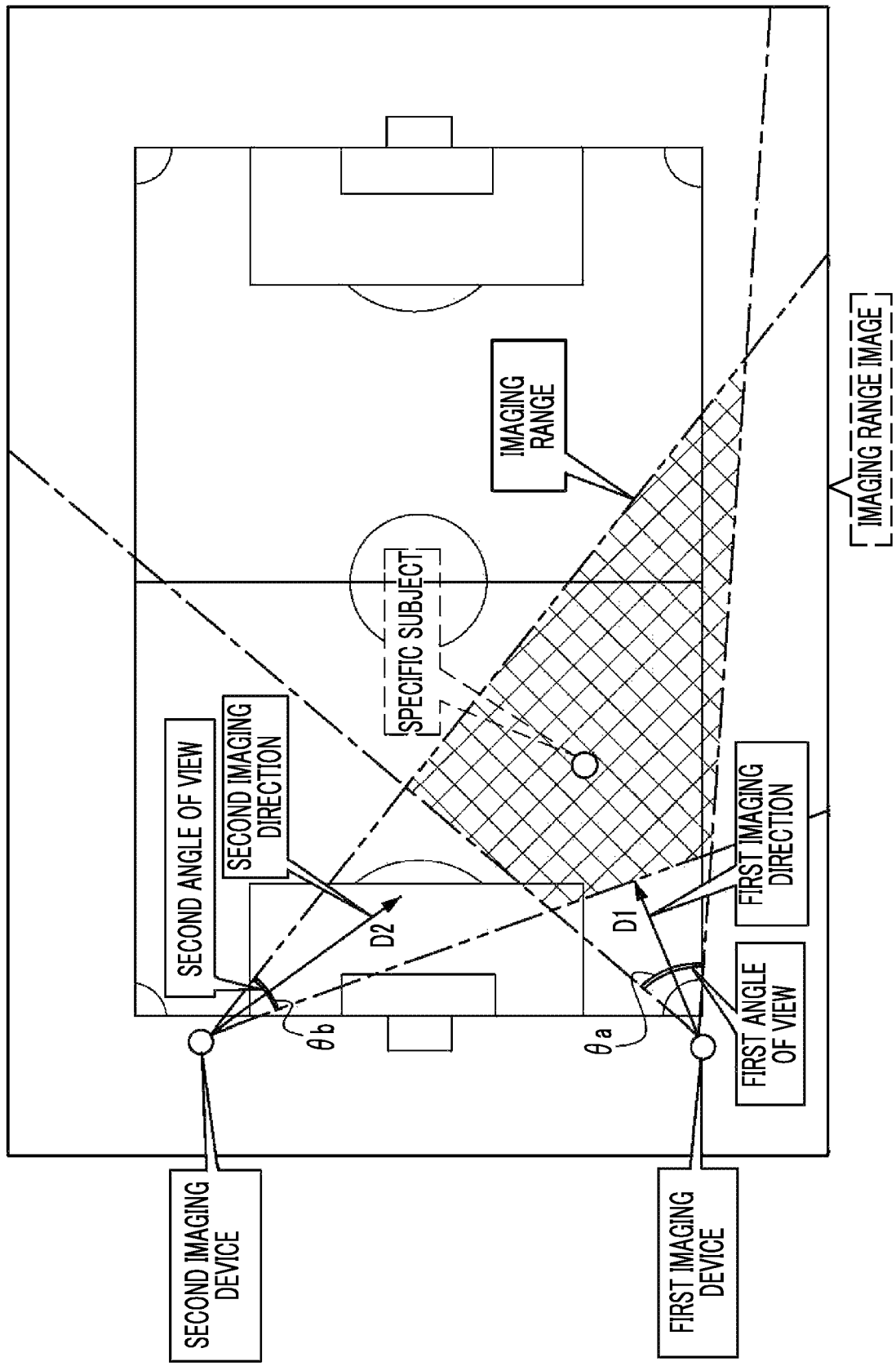
FIG. 17 is a conceptual diagram used to illustrate an example of an imaging range image generated by the imaging range specification processing according to the first embodiment.

As shown in FIG. 17 as an example, the soccer field plan view image, the imaging range shown by the cross hatched region, the current position of the first imaging device 14, and the current position of the second imaging device 16 are displayed on the imaging range image. Specifically, the imaging range image is an image in which the imaging range, the mark indicating the current position of the first imaging device 14, and the mark indicating the current position of the second imaging device 16 are superimposed and displayed on the soccer field plan view image.

Specifically, the imaging range specification unit 76E specifies the visual field of the first imaging device 14 on the basis of the first imaging device position information, the first imaging direction information, and the first angle-of-view information, and the visual field of the second imaging device 16 on the basis of the second imaging device position information, the second imaging direction information, and the second angle-of-view information. The imaging range specification unit 76E specifies an overlapped region between the visual field of the first imaging device 14 and the visual field of the second imaging device 16 as the imaging range. The above-mentioned specific device can generate the virtual viewpoint image showing the subject existing in the imaging range, on the basis of the first captured image and the second captured image.

The current position of the first imaging device 14 is the position indicated by the first imaging device position information. The current position of the second imaging device 16 is the position indicated by the second imaging device position information. In the example shown in FIG. 17, each of the current position of the first imaging device 14 and the current position of the second imaging device 16 is indicated by a circular mark. The circular mark is merely an example, and any image may be used as long as an image in which each of the current position of the first imaging device 14 and the current position of the second imaging device 16 can be visually specified is used.

In the first embodiment, the first imaging device position information and the second imaging device position information are included in the imaging range information. Therefore, the CPU 60 of the first imaging device 14 displays the mark indicating the current position of the first imaging device 14 on the imaging range image, on the basis of the first imaging device position information included in the imaging range information. Further, the CPU 60 of the first imaging device 14 displays the mark indicating the current position of the second imaging device 16 on the imaging range image, on the basis of the second imaging device position information included in the imaging range information.

Figure 18:
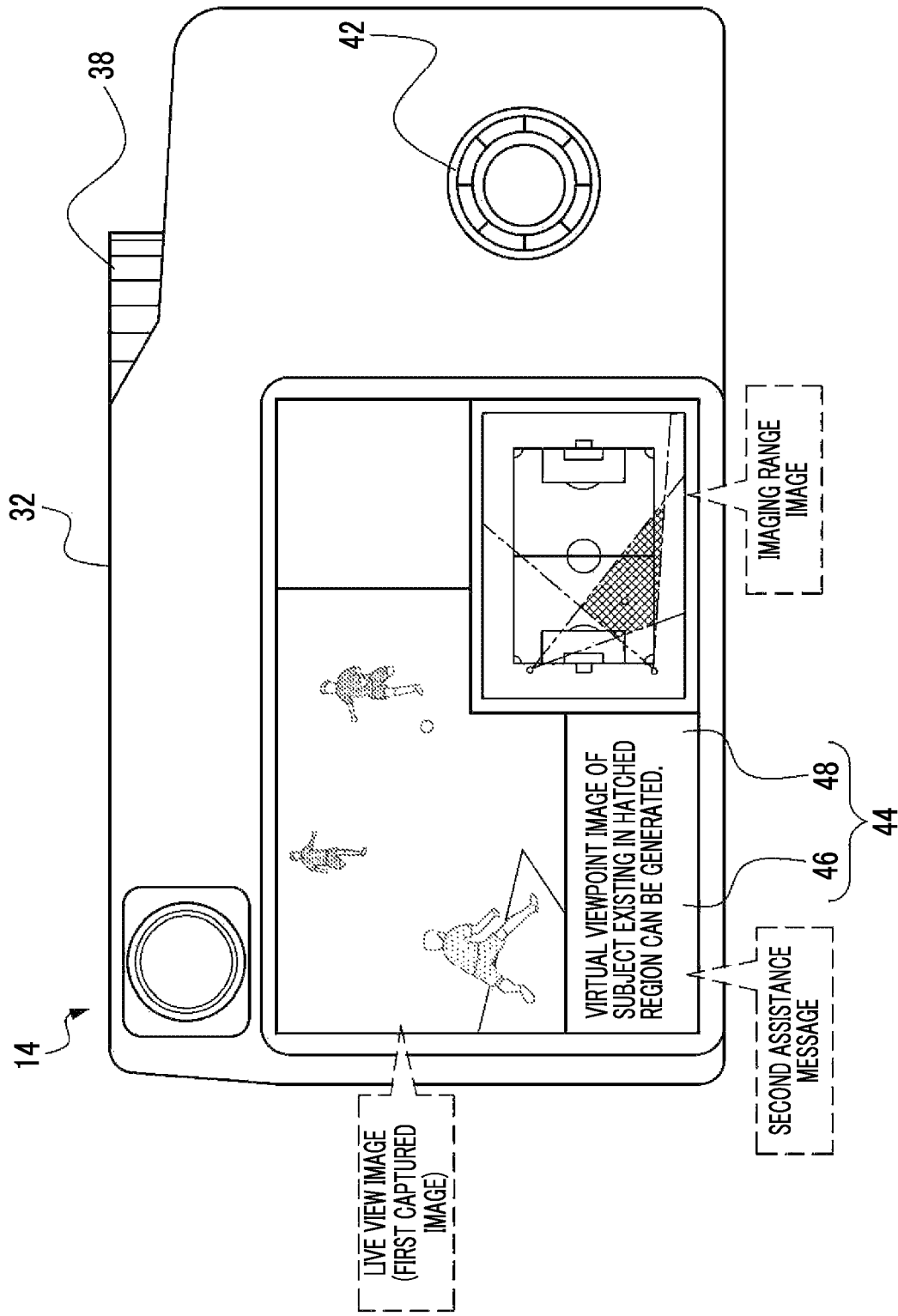
FIG. 18 is a rear view showing an example of the external configuration of the first imaging device in a case where the live view image, the imaging range image, and a second assistance message are displayed on the touch panel/display of the first imaging device.

In a case where the imaging range display mode is set for the information processing apparatus 12, the display 46 of the first imaging device 14 displays the first captured image as the live view image, and displays the second assistance message and the imaging range image. In the example shown in FIG. 18, the same image as the imaging range image shown in FIG. 17 is displayed as the imaging range image, and a message "The virtual viewpoint image of the subject existing in the hatched region can be generated" is displayed as the second assistance message.

Next, an example of flows of the display mode setting processing, the virtual viewpoint range specification processing, and the imaging range specification processing performed by the information processing apparatus 12 will be described with reference to FIGS. 19 to 21. Hereinafter, in a case where it is not necessary to distinguish between the display mode setting processing, the virtual viewpoint range specification processing, and the imaging range specification processing in the description, the display mode setting processing, the virtual viewpoint range specification processing, and the imaging range specification processing will be referred to as "information processing apparatus-side processing".

Figure 19:
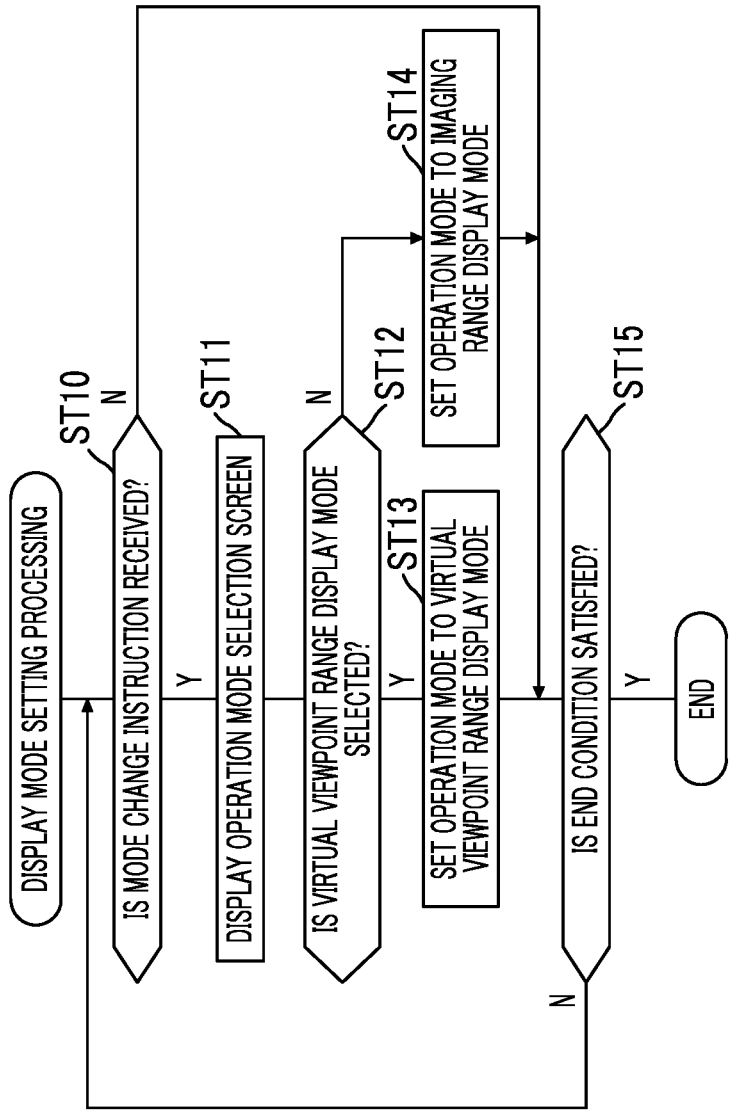
FIG. 19 is a flowchart showing an example of a flow of display mode setting processing.

The display mode setting processing shown in FIG. 19 as an example is executed by the CPU 76 in accordance with the display mode setting program 86 in a case where an instruction to execute the display mode setting processing is received by the reception device 54 or 74.

In the display mode setting processing shown in FIG. 19, first, in step ST10, the control unit 76A determines whether or not a mode change instruction is received. An example of the mode change instruction includes an instruction given to the reception device 54 of the imaging device (for example, the first imaging device 14) by the user (for example, the first person 26). The mode change instruction received by the first imaging device 14 is converted into a mode change signal in the first imaging device 14 and is output to the control unit 76A through wireless communication. In step ST10, in a case where the mode change signal is input to the control unit 76A, an affirmative determination is made, and the display mode setting processing proceeds to step ST11. In step ST10, in a case where the mode change signal is not input to the control unit 76A, a negative determination is made, and the display mode setting processing proceeds to step ST15.

In step ST11, the control unit 76A performs wireless communication with the first imaging device 14 to cause the display 46 of the first imaging device 14 to display the operation mode selection screen 92 (see FIG. 7). The operation mode selection screen 92 displays the first soft key 92A for selecting the virtual viewpoint range display mode and the second soft key 92B for selecting the imaging range display mode. After that, the display mode setting processing proceeds to step ST12.

In step ST12, the control unit 76A determines whether or not the virtual viewpoint range display mode is selected. Specifically, the control unit 76A determines whether or not the first soft key 92A for selecting the virtual viewpoint range display mode is turned on by the user (for example, the first person 26). In a case where the first soft key 92A is turned on, the CPU 60 outputs a virtual viewpoint range display mode selection signal to the control unit 76A through wireless communication.

In step ST12, in a case where the virtual viewpoint range display mode selection signal is input to the control unit 76A, an affirmative determination is made, and the display mode setting processing proceeds to step ST13. On the other hand, in a case where the second soft key 92B is turned on by the user (for example, the first person 26), the CPU 60 outputs an imaging range display mode selection signal to the control unit 76A through wireless communication. In step ST12, in a case where the virtual viewpoint range display mode selection signal is not input to the control unit 76A, that is, in a case where the imaging range display mode selection signal is input to the control unit 76A, a negative determination is made, and the display mode setting processing proceeds to step ST14.

In step ST13, the control unit 76A sets the operation mode of the information processing apparatus 12 and the first imaging device 14 to the virtual viewpoint range display mode. Specifically, the control unit 76A reads out the virtual viewpoint range specification program 88 from the storage 78 and executes the read-out virtual viewpoint range specification program 88 on the memory 80, to execute the virtual viewpoint range specification processing, which will be described later (see FIG. 20). After that, the display mode setting processing proceeds to step ST15.

On the other hand, in step ST14, the control unit 76A sets the operation mode of the information processing apparatus 12 and the first imaging device 14 to the imaging range display mode. Specifically, the control unit 76A reads out the imaging range specification program 90 from the storage 78 and executes the read-out imaging range specification program 90 on the memory 80, to execute the imaging range specification processing, which will be described later (see FIG. 21). After that, the display mode setting processing proceeds to step ST15.

In step ST15, the control unit 76A determines whether or not a condition of ending the display mode setting processing (hereinafter, referred to as a "display mode setting processing end condition") is satisfied. An example of the display mode setting processing end condition includes a condition that an instruction to end the imaging mode is received by the reception device 74 (see FIG. 5). In step ST15, in a case where the display mode setting processing end condition is not satisfied, a negative determination is made, and the display mode setting processing proceeds to step ST10. In step ST15, in a case where the display mode setting processing end condition is satisfied, an affirmative determination is made, and the display mode setting processing ends.

Figure 20:
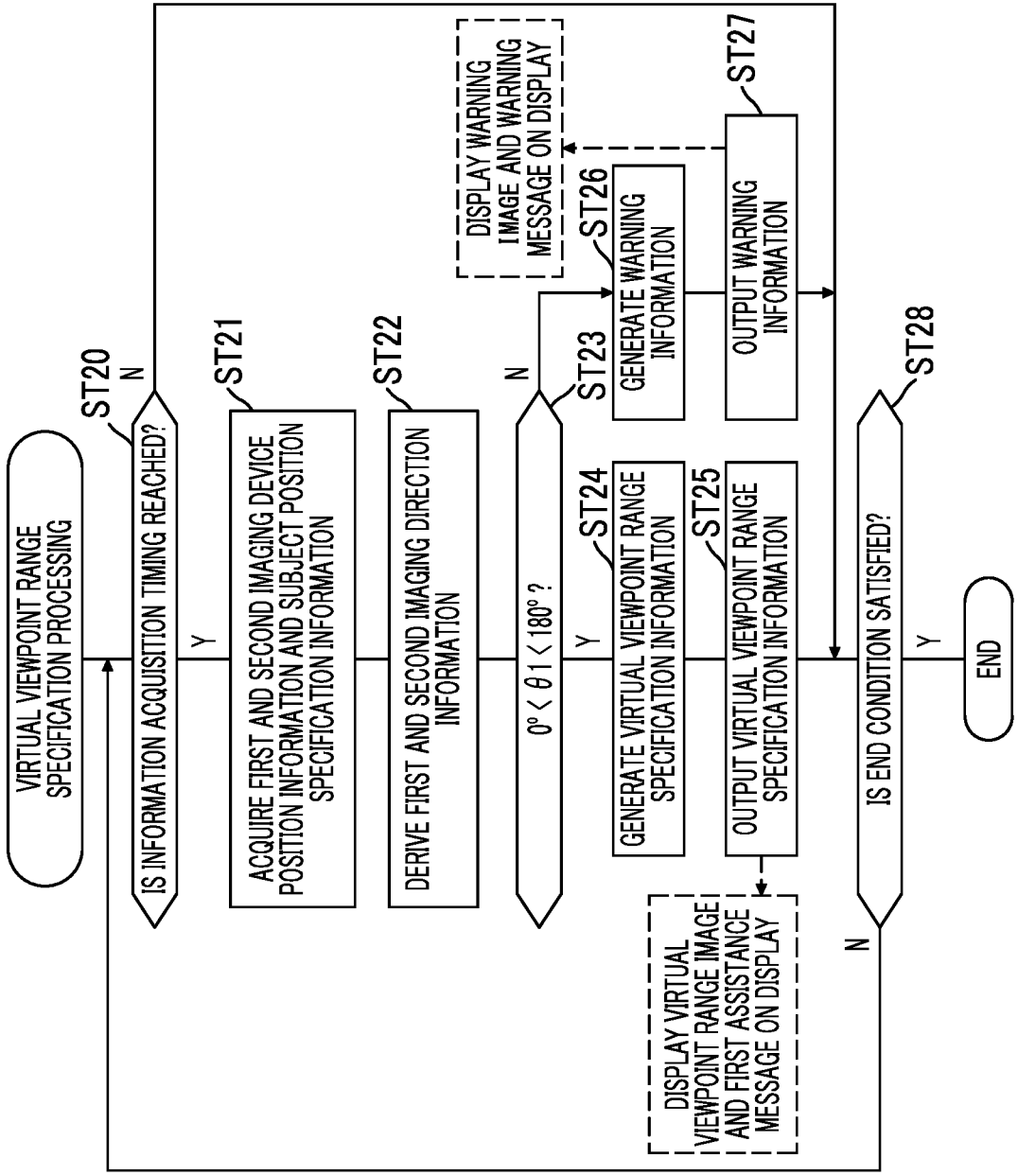
FIG. 20 is a flowchart showing an example of a flow of the virtual viewpoint range specification processing according to the first embodiment.

The virtual viewpoint range specification processing shown in FIG. 20 as an example is executed by the CPU 76 in accordance with the virtual viewpoint range specification program 88 in a case where an instruction to execute the virtual viewpoint range specification processing is received by the reception device 54 or 74, that is, in a case where the virtual viewpoint range display mode is set in step ST13 of the display mode setting processing.

In the virtual viewpoint range specification processing shown in FIG. 20, first, in step ST20, the control unit 76A determines whether or not the information acquisition timing is reached. An example of the information acquisition timing includes timing divided by a time interval defined by an output frame rate. In step ST20, in a case where the information acquisition timing is reached, an affirmative determination is made, and the virtual viewpoint range specification processing proceeds to step ST21. In step ST20, in a case where the information acquisition timing is not reached, a negative determination is made, and the virtual viewpoint range specification processing proceeds to step ST28.

In step ST21, the determination unit 76B acquires the first imaging device position information from the first imaging device 14, acquires the second imaging device position information from the second imaging device 16, and acquires the subject position specification information from the GPS terminal 18. After that, the virtual viewpoint range specification processing proceeds to step ST22.

In step ST22, the determination unit 76B derives the first imaging direction information indicating the first imaging direction D1, on the basis of the first imaging device position information and the subject position specification information acquired in step ST21. Further, the determination unit 76B derives the second imaging direction information indicating the second imaging direction D2, on the basis of the second imaging device position information and the subject position specification information acquired in step ST21. After that, the virtual viewpoint range specification processing proceeds to step ST23.

In step ST23, the determination unit 76B determines whether or not the smaller angle $\theta 1$, out of the angles $\theta 1$ and $\theta 2$ formed by the first imaging direction D1 indicated by the first imaging direction information derived in step ST22 and the second imaging direction D2 indicated by the second imaging direction information derived in step ST22, is larger than 0 degrees and smaller than 180 degrees. In a case where 0 degrees<$\theta 1$<180 degrees is satisfied, an affirmative determination is made, and the virtual viewpoint range specification processing proceeds to step ST24. In a case where 0 degrees<$\theta 1$<180 degrees is not satisfied, that is, in a case where $\theta 1=0$ degrees or $\theta 1=180$ degrees is satisfied, a negative determination is made, and the virtual viewpoint range specification processing proceeds to step ST26.

In step ST24, the virtual viewpoint range specification unit 76C generates the virtual viewpoint range specification information. The virtual viewpoint range specification information is information for specifying the range within the angle $\theta 1$ as the virtual viewpoint range in which the virtual viewpoint image can be generated on the basis of the first captured image and the second captured image. The virtual viewpoint range specification unit 76C derives the virtual viewpoint range specification information on the basis of the first imaging device position information, the second imaging device position information, the first imaging direction information, and the second imaging direction information. After that, the virtual viewpoint range specification processing proceeds to step ST25.

In step ST25, the virtual viewpoint range specification unit 76C outputs the virtual viewpoint range specification information derived in step ST24 to the first imaging device 14. The CPU 60 of the first imaging device 14 generates the virtual viewpoint range image and the first assistance message on the basis of the virtual viewpoint range specification information received from the virtual viewpoint range specification unit 76C. The virtual viewpoint range image is an image showing the specified virtual viewpoint range. The CPU 60 causes the display 46 to display the generated virtual viewpoint range image and the generated first assistance message. After that, the virtual viewpoint range specification processing proceeds to step ST28.

On the other hand, in step ST26, the warning information generation unit 76D generates the warning information. The warning information is information for alerting the user (for example, the first person 26) that the range within the angle $\theta 1$ is not the virtual viewpoint range. After that, the virtual viewpoint range specification processing proceeds to step ST27.

In step ST27, the warning information generation unit 76D outputs the warning information generated in step ST26 to the first imaging device 14. The CPU 60 of the first imaging device 14 generates the warning image and the warning message on the basis of the warning information received from the warning information generation unit 76D, and causes the display 46 to display the generated warning image and the generated warning message. The warning image and the warning message are an image and a message for notifying the user (for example, the first person 26) that the virtual viewpoint range cannot be specified. After that, the virtual viewpoint range specification processing proceeds to step ST28.

In step ST28, the control unit 76A determines whether or not a condition of ending the virtual viewpoint range specification processing (hereinafter, referred to as a "virtual viewpoint range specification processing end condition") is satisfied. An example of the virtual viewpoint range specification processing end condition includes a condition that the mode change instruction is received by the reception device 54 or 74. In step ST28, in a case where the virtual viewpoint range specification processing end condition is not satisfied, a negative determination is made, and the virtual viewpoint range specification processing proceeds to step ST20. In step ST28, in a case where the virtual viewpoint range specification processing end condition is satisfied, an affirmative determination is made, and the virtual viewpoint range specification processing ends.

Figure 21:
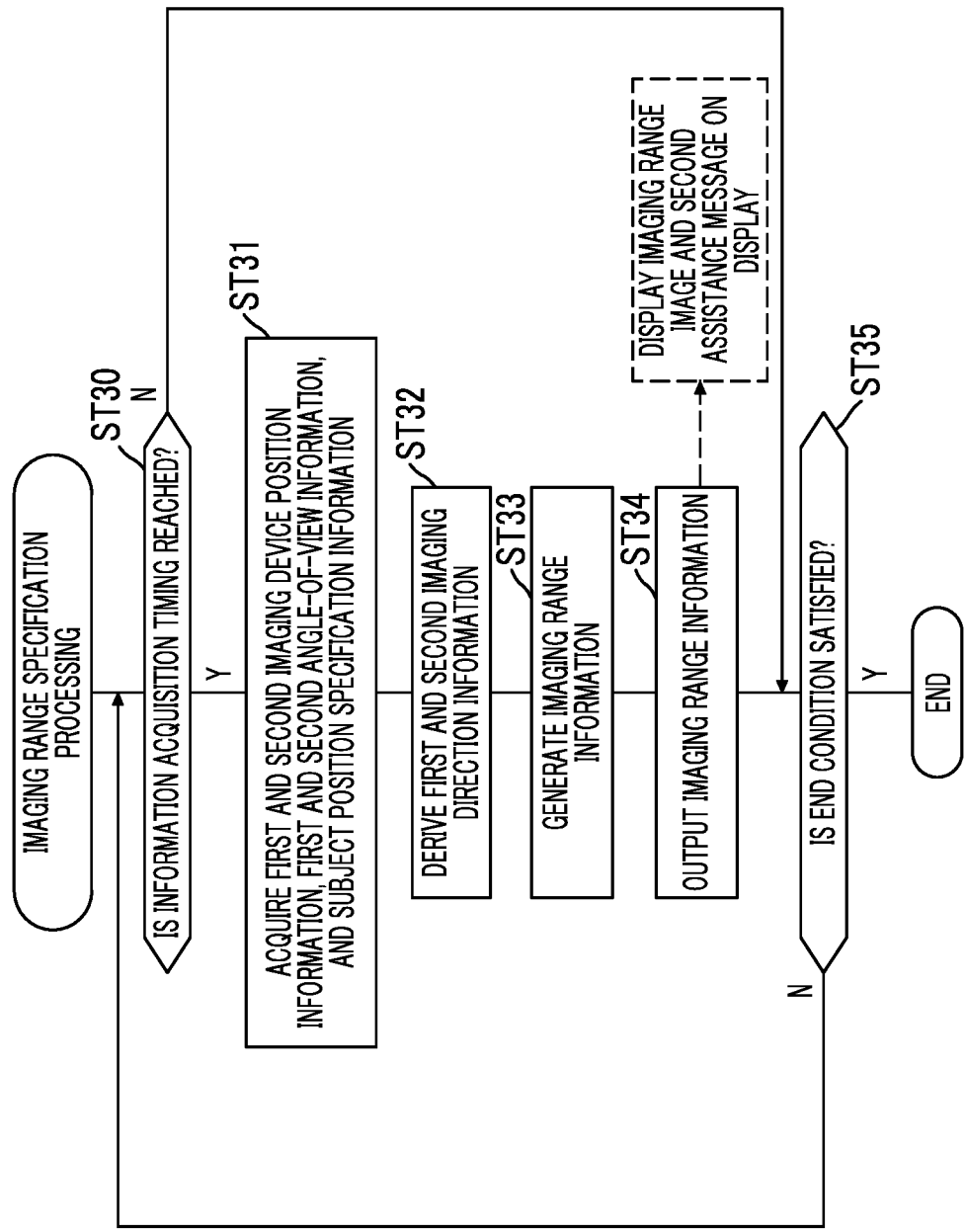
FIG. 21 is a flowchart showing an example of a flow of the imaging range specification processing.

The imaging range specification processing shown in FIG. 21 as an example is executed by the CPU 76 in accordance with the imaging range specification program 90 in a case where an instruction to execute the imaging range specification processing is received by the reception device 54 or 74, that is, in a case where the imaging range display mode is set in step ST14 of the display mode setting processing.

In the imaging range specification processing shown in FIG. 21, first, in step ST30, the control unit 76A determines whether or not the information acquisition timing is reached. An example of the information acquisition timing includes timing divided by a time interval defined by an output frame rate. In step ST30, in a case where the information acquisition timing is reached, an affirmative determination is made, and the imaging range specification processing proceeds to step ST31. In step ST30, in a case where the information acquisition timing is not reached, a negative determination is made, and the imaging range specification processing proceeds to step ST35.

In step ST31, the imaging range specification unit 76E acquires the first imaging device position information and the first angle-of-view information from the first imaging device 14, acquires the second imaging device position information and the second angle-of-view information from the second imaging device 16, and acquires the subject position specification information from the GPS terminal 18. After that, the imaging range specification processing proceeds to step ST32.

In step ST32, the imaging range specification unit 76E derives the first imaging direction information indicating the first imaging direction D1, on the basis of the first imaging device position information and the subject position specification information acquired in step ST31. Further, the imaging range specification unit 76E derives the second imaging direction information indicating the second imaging direction D2, on the basis of the second imaging device position information and the subject position specification information acquired in step ST31. After that, the imaging range specification processing proceeds to step ST33.

In step ST33, the imaging range specification unit 76E generates the imaging range information on the basis of the first imaging device position information, the second imaging device position information, the first angle-of-view information, and the second angle-of-view information acquired in step ST31, and the first imaging direction information and the second imaging direction information derived in step ST32. The imaging range information is information regarding an imaging range overlapped by the first imaging device 14 and the second imaging device 16, in which the virtual viewpoint image can be generated on the basis of the first captured image and the second captured image. After that, the imaging range specification processing proceeds to step ST34.

In step ST34, the imaging range specification unit 76E outputs the imaging range information generated in step ST33 to the first imaging device 14. The CPU 60 of the first imaging device 14 generates the imaging range image and the second assistance message on the basis of the imaging range information received from the imaging range specification unit 76E. The imaging range image is an image showing the imaging range in which the virtual viewpoint image can be generated on the basis of the first captured image and the second captured image, and an image showing the imaging range overlapped by the first imaging device 14 and the second imaging device 16. The second assistance message is a message for making the user (for example, the first person 26) perceive that the virtual viewpoint image showing the subject existing in the imaging range can be generated. The CPU 60 causes the display 46 to display the imaging range image and the second assistance message. After that, the imaging range specification processing proceeds to step ST35.

In step ST35, the control unit 76A determines whether or not a condition of ending the imaging range specification processing (hereinafter, referred to as an "imaging range specification processing end condition") is satisfied. An example of the imaging range specification processing end condition includes a condition that the mode change instruction is received by the reception device 54 or 74 (see FIG. 5). In step ST35, in a case where the imaging range specification processing end condition is not satisfied, a negative determination is made, and the imaging range specification processing proceeds to step ST30. In step ST35, in a case where the imaging range specification processing end condition is satisfied, an affirmative determination is made, and the imaging range specification processing ends.

In the first embodiment, the virtual viewpoint range is specified in a range of 0 degrees<$\theta 1$<180 degrees, but the technique of the present disclosure is not limited thereto. The numerical values of 0 degrees and 180 degrees are an example, and the virtual viewpoint range is appropriately set to a range in which the virtual viewpoint image can be generated.

As described above, according to the first embodiment, the information processing apparatus 12 acquires the imaging device position information and the imaging direction information. The information processing apparatus 12 generates the virtual viewpoint range specification information capable of specifying the range within the smaller angle $\theta 1$, out of the angles $\theta 1$ and $\theta 2$ formed by the first imaging direction D1 and the second imaging direction D2, as the virtual viewpoint range, and outputs the generated virtual viewpoint range specification information to the first imaging device 14. Therefore, with the information processing apparatus 12 and the first imaging device 14 according to the first embodiment, it is possible to assist in deciding the viewpoint position at which the virtual viewpoint image can be generated.

Further, in the first embodiment, in the virtual viewpoint range specification processing shown in FIG. 20, each time the information acquisition timing is reached in step ST20, the terminal position information is acquired in step ST21, and the imaging direction information is derived in step ST22. Each time the terminal position information and the imaging direction information are acquired in step ST21 and step ST22, respectively, a determination as to whether or not 0 degrees<$\theta 1$<180 degrees is satisfied is made in step ST23. The virtual viewpoint range specification information is generated in step ST24 or the warning information is generated in step ST26 depending on the determination result in step ST23. Therefore, the virtual viewpoint range specification information corresponding to the current situation can be derived with high accuracy as compared with a case where the virtual viewpoint range specification information is always fixed.

Further, in the first embodiment, the information processing apparatus 12 outputs the generated virtual viewpoint range specification information to the first imaging device 14. The first imaging device 14 outputs the virtual viewpoint range image indicating the virtual viewpoint range to the display 46, on the basis of the virtual viewpoint range specification information received from the information processing apparatus 12. Therefore, it is possible to make the user visually perceive the virtual viewpoint range as compared with a case where the virtual viewpoint range image is not output to the display 46.

Further, in the first embodiment, the determination unit 76B acquires the subject position specification information for specifying the position of the specific subject 30, in addition to the imaging device position information, and acquires the imaging direction information on the basis of the imaging device position information and the acquired subject position specification information. Therefore, the imaging direction with respect to the specific subject 30 can be obtained with high accuracy as compared with a case where imaging direction information is determined on the basis of information regarding the position unrelated to the position of the specific subject 30.

Further, in the first embodiment, the virtual viewpoint range is the range within the smaller angle $\theta 1$ out of the angles $\theta 1$ and $\theta 2$ formed by the first imaging device 14 and the second imaging device 16 with respect to the specific subject 30. Therefore, it is possible to restrain the occurrence of the situation where the virtual viewpoint image is not generated as compared with a case where the virtual viewpoint range is a range within the larger angle $\theta 2$ out of the angles θ1 and θ2 formed by the first imaging device 14 and the second imaging device 16 with respect to the specific subject 30.

Further, in the first embodiment, the information processing apparatus 12 outputs the imaging device position information. Therefore, it is possible to make the user grasp the positional relationship between the plurality of imaging devices as compared with a case where the imaging device position information is not output.

Further, in the first embodiment, the information processing apparatus 12 outputs the imaging device position information to the first imaging device 14 that is the same output destination as the output destination of the virtual viewpoint range specification information. Therefore, it is possible to make the user visually perceive the positional relationship between the plurality of imaging devices together with the virtual viewpoint range.

Further, in the first embodiment, the information processing apparatus 12 acquires the imaging device position information, the imaging direction information, and the angle-of-view information of the plurality of imaging devices, and derives the imaging range information on the basis of the acquired imaging device position information, imaging direction information, and angle-of-view information. Further, the information processing apparatus 12 outputs the derived imaging range information and the imaging device position information. The imaging range information is information regarding the imaging range overlapped by the plurality of imaging devices, in which the virtual viewpoint image can be generated on the basis of the captured images captured by the plurality of imaging devices. Therefore, it is possible to make the user grasp the imaging range in which the virtual viewpoint image can be generated as compared with a case where the imaging range information is not output.

Further, in the first embodiment, the information processing apparatus 12 outputs the imaging range information to the first imaging device 14 which is also the output destination of the virtual viewpoint range specification information. Therefore, it is possible to make the user visually perceive the imaging range in which the virtual viewpoint image can be generated, together with the virtual viewpoint range, as compared with a case where the output destination of the imaging range information is different from the output destination of the virtual viewpoint range specification information.

Further, in the first embodiment, the information processing apparatus 12 outputs the imaging range information and the imaging device position information to the first imaging device 14. Therefore, it is possible to make the user perceive the imaging range and the position of the imaging device as compared with a case where the imaging range information and the imaging device position information are not output to the first imaging device 14.

In the above first embodiment, the virtual viewpoint range image is displayed on the display 46 in a case where the information processing apparatus 12 and the first imaging device 14 are set to the virtual viewpoint range display mode, and the imaging range image is displayed in a case where the information processing apparatus 12 and the first imaging device 14 are set to the imaging range display mode, but the technique of the present disclosure is not limited thereto.

Figure 22:
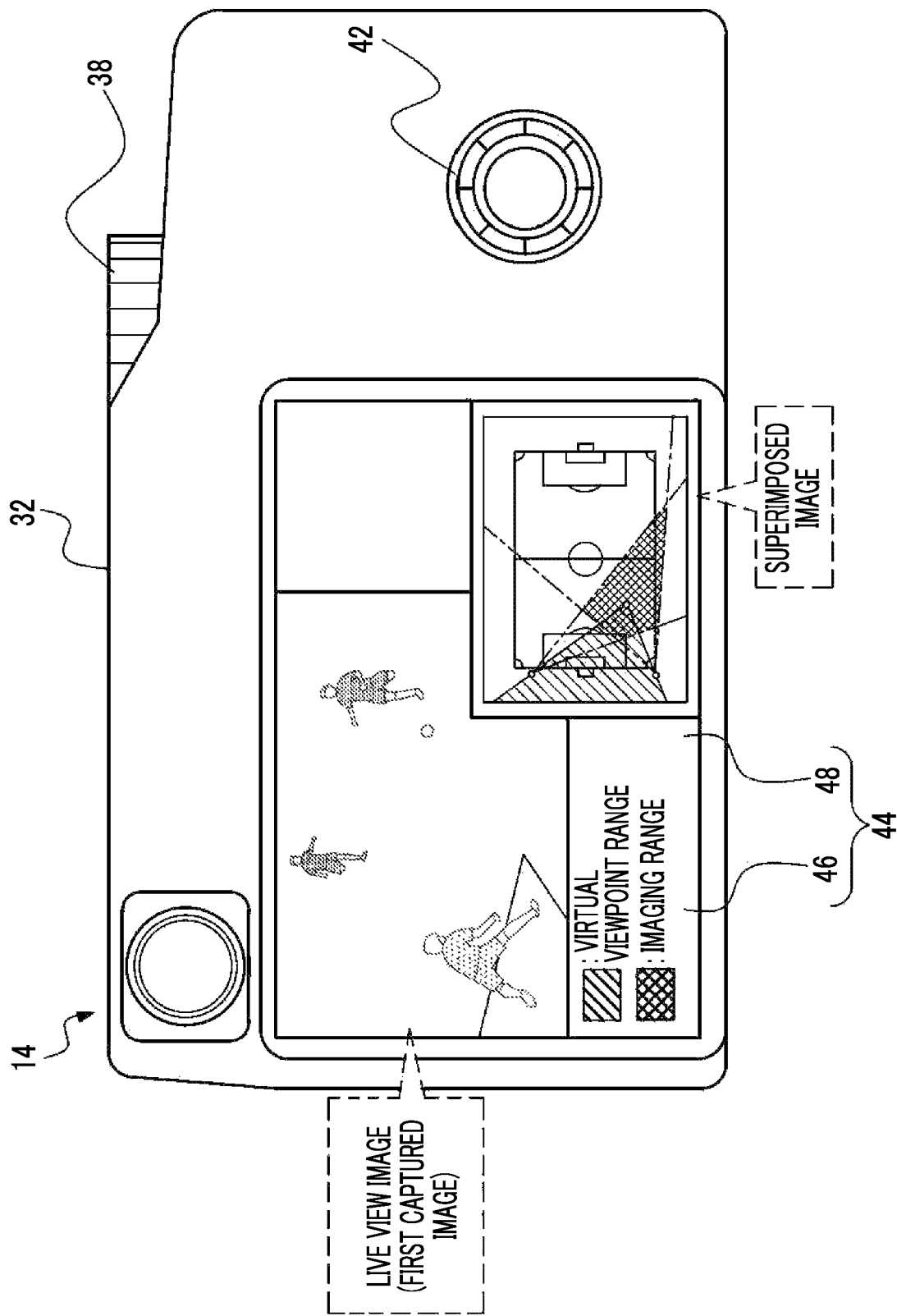
FIG. 22 is a rear view showing an example of the external configuration of the first imaging device in a case where the live view image and a superimposed image in which the virtual viewpoint range image and the imaging range image are superimposed are displayed on the touch panel/display of the first imaging device.

As shown in FIG. 22 as an example, the display 46 may display a superimposed image in which the virtual viewpoint range image and the imaging range image are superimposed. In FIG. 22, the diagonally hatched region indicates the virtual viewpoint range, and the cross hatched region indicates the imaging range. In this case, since it is not necessary to switch between the virtual viewpoint range display mode and the imaging range display mode shown in FIG. 7, the display mode setting processing shown in FIG. 19 is not executed. The CPU 76 of the information processing apparatus 12 executes the virtual viewpoint range specification program 88 and the imaging range specification program 90 in parallel on the memory 80 to perform the virtual viewpoint range specification processing shown in FIG. 20 and the imaging range specification processing shown in FIG. 21 in parallel.

Further, in the above first embodiment, in the virtual viewpoint range specification processing shown in FIG. 20, each time the terminal position information is acquired in step ST21 and the imaging direction information is acquired in step ST22, a determination as to whether 0 degrees<θ1<180 degrees is satisfied is made in step ST23. The virtual viewpoint range specification information is generated in step ST24 or the warning information is generated in step ST26 depending on the determination result in step ST23, but the technique of the present disclosure is not limited thereto.

For example, after acquiring the terminal position information in step ST21 and deriving the imaging direction information in step ST22, the determination unit 76B may determine whether or not at least one of the imaging device position information or the imaging direction information is changed from the information acquired at the previous information acquisition timing. In a case where the at least one is changed, the determination unit 76B makes the determination of step ST23, and the virtual viewpoint range specification information is generated in step ST24 or the warning information is generated in step ST26 depending on the determination result in step ST23. In a case where the at least one is not changed, the virtual viewpoint range specification processing does not perform steps after step ST23, and proceeds to step ST20.

Further, in the above first embodiment, the information processing apparatus 12 outputs the generated virtual viewpoint range specification information to the first imaging device 14, but the technique of the present disclosure is not limited thereto, and the information processing apparatus 12 may output the virtual viewpoint range specification information to the second imaging device 16, in addition to the first imaging device 14.

Figure 23:
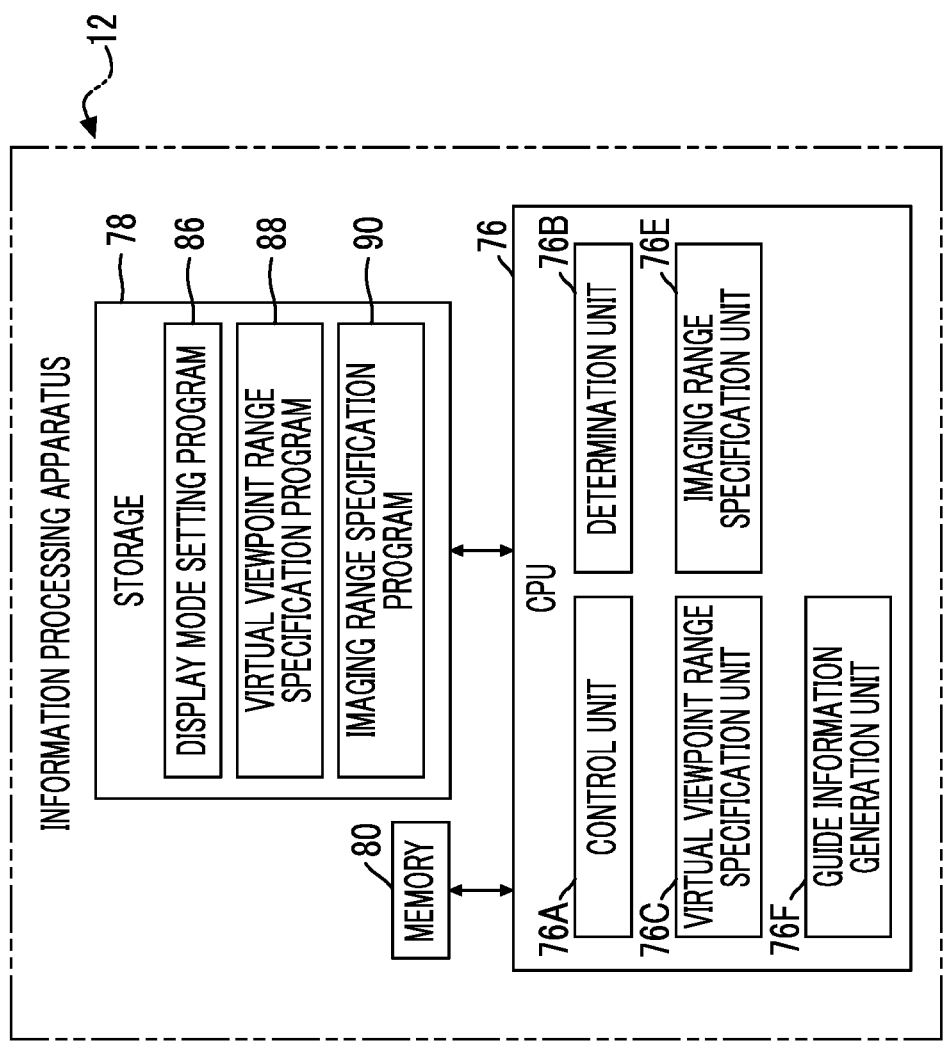
FIG. 23 is a block diagram showing an example of functions of main units of an information processing apparatus according to a second embodiment.

Further, in the above first embodiment, the CPU 76 of the information processing apparatus 12 acquires the terminal position information and the imaging direction information, and generates the virtual viewpoint range specification information on the basis of the acquired terminal position information and imaging direction information, but the technique of the present disclosure is not limited thereto. The information processing apparatus 12 may output, as an example of the "information regarding the virtual viewpoint range specification information" according to the technique of the present disclosure, the terminal position information and the imaging direction information to the first imaging device 14, and the CPU 60 of the first imaging device 14 may acquire the terminal position information and the imaging direction information from the information processing apparatus 12 and may generate the virtual viewpoint range specification information on the basis of the acquired terminal position information and imaging direction information. In this case, the CPU 60 outputs the generated virtual viewpoint range specification information to the display 46. In this case, it is also possible to make the user visually perceive the virtual viewpoint range as in the above first embodiment.

Second Embodiment As shown in FIG. 23 as an example, in the information processing apparatus 12 according to a second embodiment, the CPU 76 according to the second embodiment is different from the CPU 76 according to the above first embodiment in that the CPU 76 according to the second embodiment comprises a guide information generation unit 76F instead of the warning information generation unit 76D. Since the other configurations of the information processing apparatus 12 according to the second embodiment are the same as those of the information processing apparatus 12 according to the above first embodiment, the same constituent elements as the constituent elements described in the above first embodiment are designated by the same reference numerals, and the description thereof will be not be repeated.

The storage 78 of the information processing apparatus 12 stores the display mode setting program 86, the virtual viewpoint range specification program 88, and the imaging range specification program 90. Since the display mode setting processing performed by executing the display mode setting program 86 and the imaging range specification processing performed by executing the imaging range specification program 90 are the same as the processing described in the above first embodiment, the description thereof will not be repeated here. The virtual viewpoint range specification processing performed by executing the virtual viewpoint range specification program 88 will be described below.

In the virtual viewpoint range display mode according to the second embodiment, the CPU 76 reads out the virtual viewpoint range specification program 88 from the storage 78 and executes the read-out virtual viewpoint range specification program 88 on the memory 80 to operate as the control unit 76A, the determination unit 76B, the virtual viewpoint range specification unit 76C, and the guide information generation unit 76F.

Figure 24:
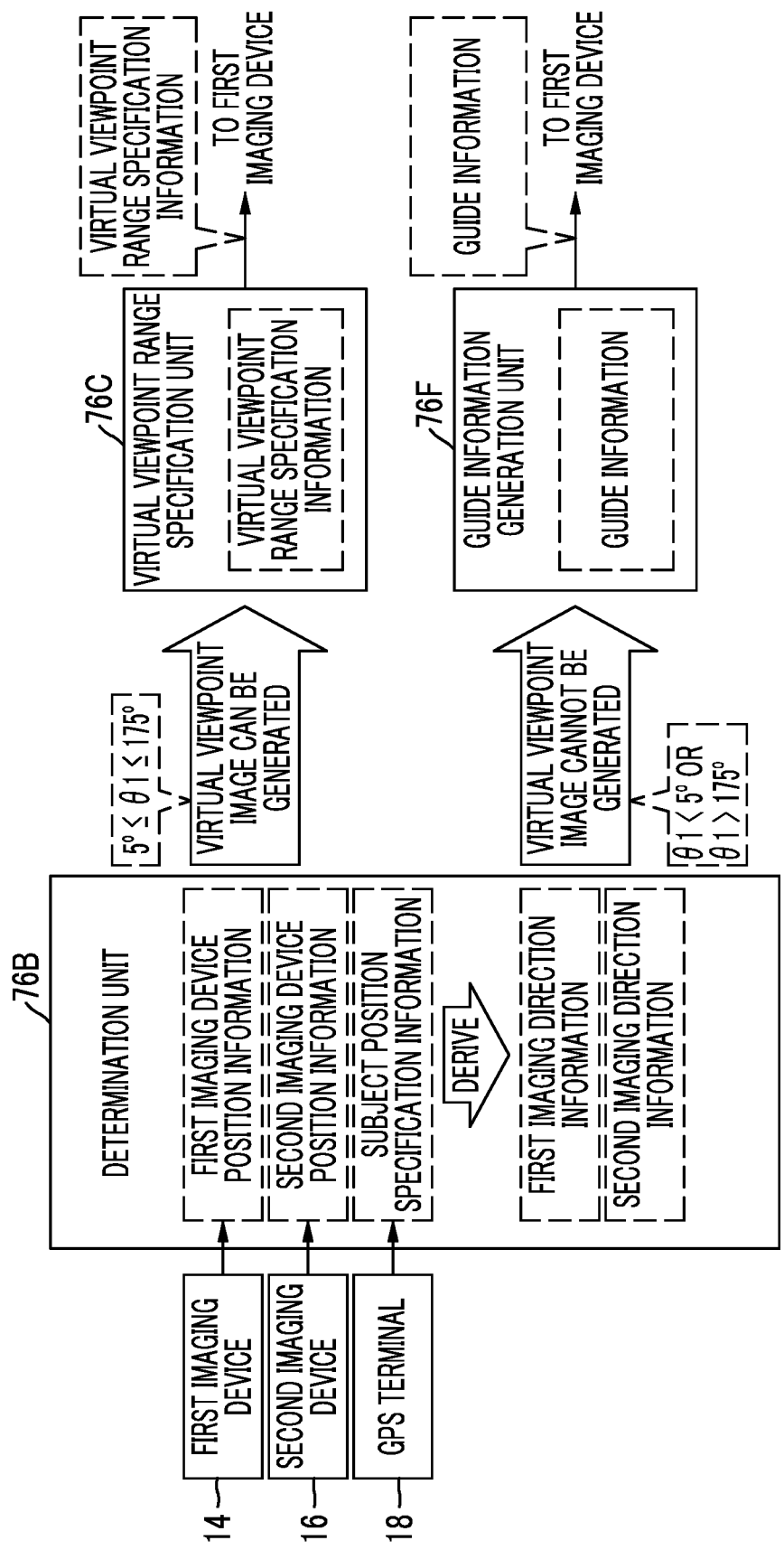
FIG. 24 is a conceptual diagram used to illustrate an example of a content of virtual viewpoint range specification processing according to a second embodiment.

As shown in FIG. 24 as an example, the determination unit 76B acquires the first imaging device position information from the first imaging device 14, acquires the second imaging device position information from the second imaging device 16, and acquires the subject position specification information from the GPS terminal 18. Then, the determination unit 76B acquires the first imaging direction information indicating the first imaging direction D1 and the second imaging direction information indicating the second imaging direction D2, on the basis of the first imaging device position information, the second imaging device position information, and the subject position specification information. Specifically, the determination unit 76B derives the first imaging direction information indicating the first imaging direction D1, on the basis of the first imaging device position information and the subject position specification information. Further, the determination unit 76B derives the second imaging direction information indicating the second imaging direction D2, on the basis of the second imaging device position information and the subject position specification information.

The determination unit 76B determines whether or not a range within the smaller angle θ1, out of angles θ1 and θ2 formed by the first imaging direction D1 and the second imaging direction D2 with respect to the specific subject 30 (see FIG. 1), is the virtual viewpoint range in which the virtual viewpoint image can be generated. That is, in a case where the angle θ1 is equal to or less than a default angle (for example, 175 degrees) and is equal to or more than an under-angle (for example, 5 degrees) predetermined as an under-angle within the default angle, the determination unit 76B determines that the range within the angle θ1 is the virtual viewpoint range in which the virtual viewpoint image can be generated.

On the other hand, in a case where the angle θ1<5 degrees or the angle θ1>175 degrees, the determination unit 76B determines that the range within the angle θ1 is not the virtual viewpoint range in which the virtual viewpoint image can be generated. The under-angle is an angle that defines a range of positions of the first imaging device 14 and the second imaging device 16, which is not suitable for generating the virtual viewpoint image based on the first captured image and the second captured image. Here, the default angle is an example of the "first angle" and the "second angle" according to the technique of the present disclosure, and the under-angle is an example of the "first under-angle" and the "second under-angle" according to the technique of the present disclosure.

The virtual viewpoint range specification unit 76C specifies the virtual viewpoint range. Specifically, in a case where the determination unit 76B determines that the range within the angle θ1 is the virtual viewpoint range, the virtual viewpoint range specification unit 76C acquires the first imaging device position information, the second imaging device position information, the first imaging direction information, and the second imaging direction information. Next, the virtual viewpoint range specification unit 76C derives the virtual viewpoint range specification information capable of specifying the virtual viewpoint range, on the basis of the first imaging device position information, the second imaging device position information, the first imaging direction information, and the second imaging direction information. Then, the virtual viewpoint range specification unit 76C outputs the derived virtual viewpoint range specification information to the first imaging device 14.

On the other hand, in a case where the determination unit 76B determines that the range within the angle θ1 is not the virtual viewpoint range in which the virtual viewpoint image can be generated, the guide information generation unit 76F generates the guide information and outputs the generated guide information to the first imaging device 14. The guide information is information for guiding in which direction the first imaging device 14 or the second imaging device 16 should be moved, in order to obtain the angle θ1 at which the virtual viewpoint image can be generated, that is, the angle θ1 satisfying 5 degrees<θ1<175 degrees. The guide information includes the first imaging device position information, the second imaging device position information, the first imaging direction information, the second imaging direction information, and movement direction information. The movement direction information is information indicating a direction in which at least one of the first imaging device 14 or the second imaging device 16 is moved. Here, the guide information is an example of the "first guide information" according to the technique of the present disclosure.

Figure 25:
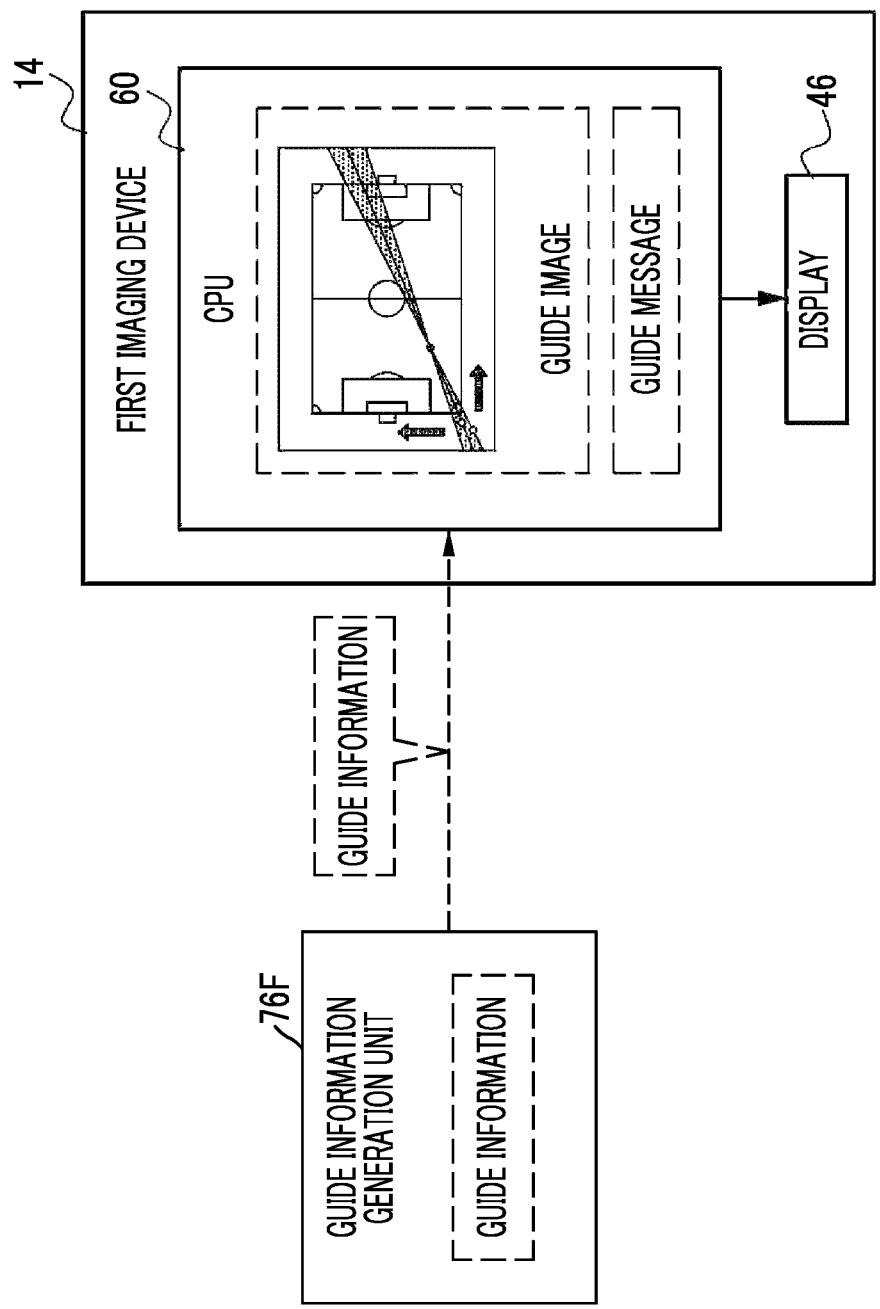
FIG. 25 is a conceptual diagram used to illustrate an example of the content of the virtual viewpoint range specification processing according to the second embodiment.

As shown in FIG. 25 as an example, the CPU 60 of the first imaging device 14 generates a guide image and a guide message on the basis of the guide information received from the guide information generation unit 76F. The guide image is an image showing the movement direction information for guiding in which direction the first imaging device 14 or the second imaging device 16 should be moved. The guide message is a message for making the user (for example, the first person 26) perceive that the virtual viewpoint range cannot be specified and for guiding in which direction the first imaging device 14 or the second imaging device 16 should be moved. The CPU 60 causes the display 46 to display the guide image and the guide message.

Figure 26:
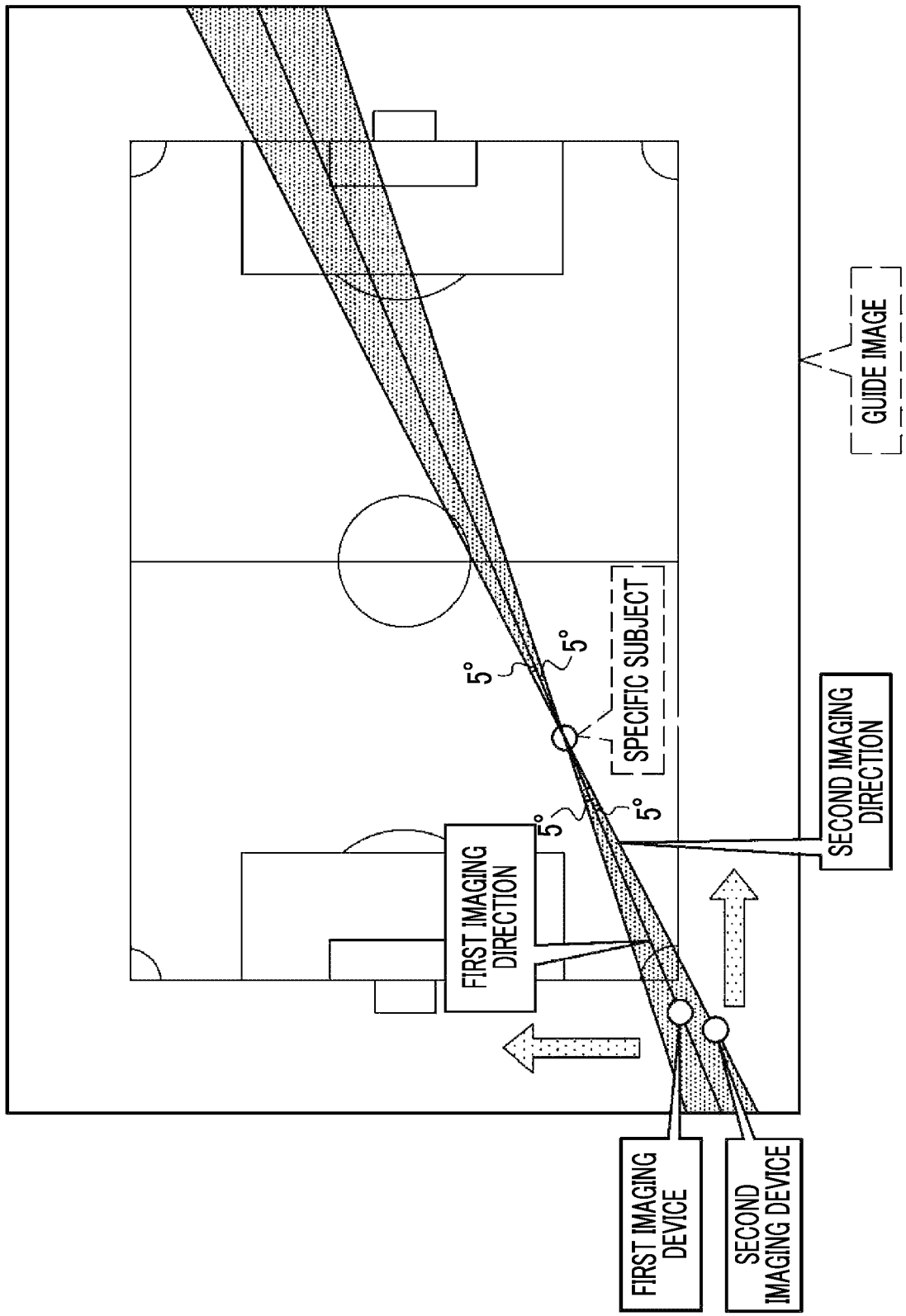
FIG. 26 is a conceptual diagram used to illustrate an example of a guide image generated by the virtual viewpoint range specification processing according to the second embodiment.

As shown in FIG. 26 as an example, it is difficult to generate the virtual viewpoint image on the basis of the first captured image and the second captured image because the first imaging direction D1 and the second imaging direction D2 are not the same but are close to each other in a case where the smaller angle θ1, out of the angles formed by the first imaging direction D1 and the second imaging direction D2 with respect to the specific subject 30 (see FIG. 1), is smaller than 5 degrees. It is also difficult to generate the virtual viewpoint image on the basis of the first captured image and the second captured image because the first imaging direction D1 and the second imaging direction D2 are close to the complete opposite even in a case where the angle θ1 is larger than 175 degrees.

In this case, the guide image displays the soccer field plan view image, the current position of the first imaging device 14, and the current position of the second imaging device 16. In addition, a range having an angle smaller than 5 degrees and a range having an angle larger than 175 degrees with respect to the first imaging direction D1 with the specific subject 30 as a reference are shown as a hatched region. Further, in order for the smaller angle θ1, out of the angles formed by the first imaging direction D1 and the second imaging direction D2, to satisfy 5 degrees<θ1<175 degrees, that is, in order to dispose the second imaging device 16 outside the hatched region, arrows for guiding in which the first imaging device 14 or the second imaging device 16 should be moved are shown as the movement direction information. Specifically, the guide image is an image in which the mark indicating the current position of the first imaging device 14, the mark indicating the current position of the second imaging device 16, the hatched region, and the arrows are superimposed and displayed on the soccer field plan view image.

The current position of the first imaging device 14 is the position indicated by the first imaging device position information. The current position of the second imaging device 16 is the position indicated by the second imaging device position information. In the example shown in FIG. 26, each of the current position of the first imaging device 14 and the current position of the second imaging device 16 is indicated by a circular mark. The circular mark is merely an example, and any image may be used as long as an image in which each of the current position of the first imaging device 14 and the current position of the second imaging device 16 can be visually specified is used.

Figure 27:
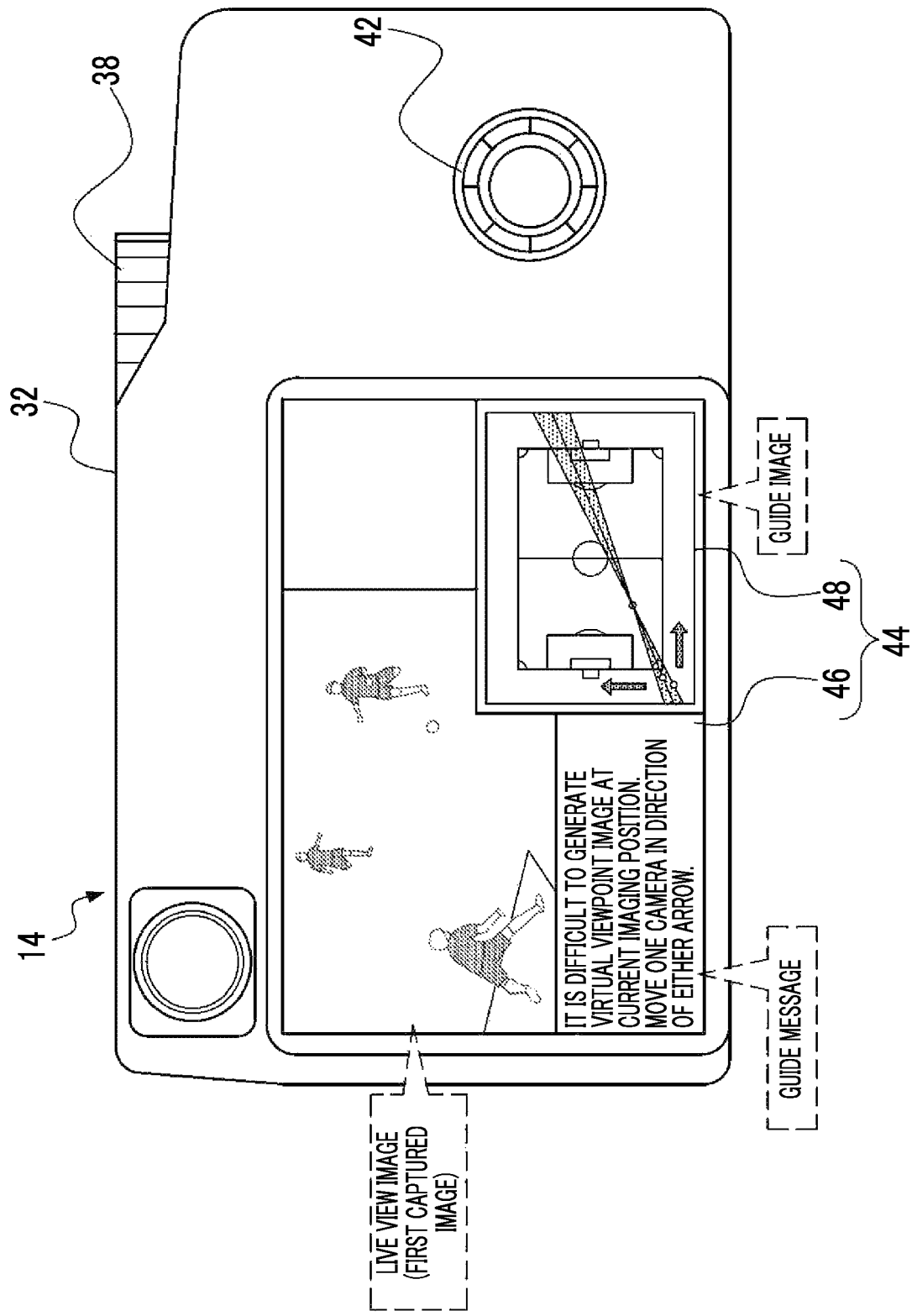
FIG. 27 is a rear view showing an example of the external configuration of the first imaging device in a case where the live view image, the guide image, and a guide message are displayed on the touch panel/display of the first imaging device.

In a case where the first imaging device 14 and the second imaging device 16 perform imaging at the respective positions shown in FIG. 26, the display 46 of the first imaging device 14 displays the first captured image as the live view image, and displays the guide message and the guide image. In the example shown in FIG. 27, the same image as the guide image shown in FIG. 26 is displayed as the guide image, and a message "It is difficult to generate the virtual viewpoint image at the current imaging position. Move one camera in the direction of either arrow" is displayed as the guide message.

Next, an example of the flow of the virtual viewpoint range specification processing performed by the information processing apparatus 12 will be described with reference to FIG. 28.

Figure 28:
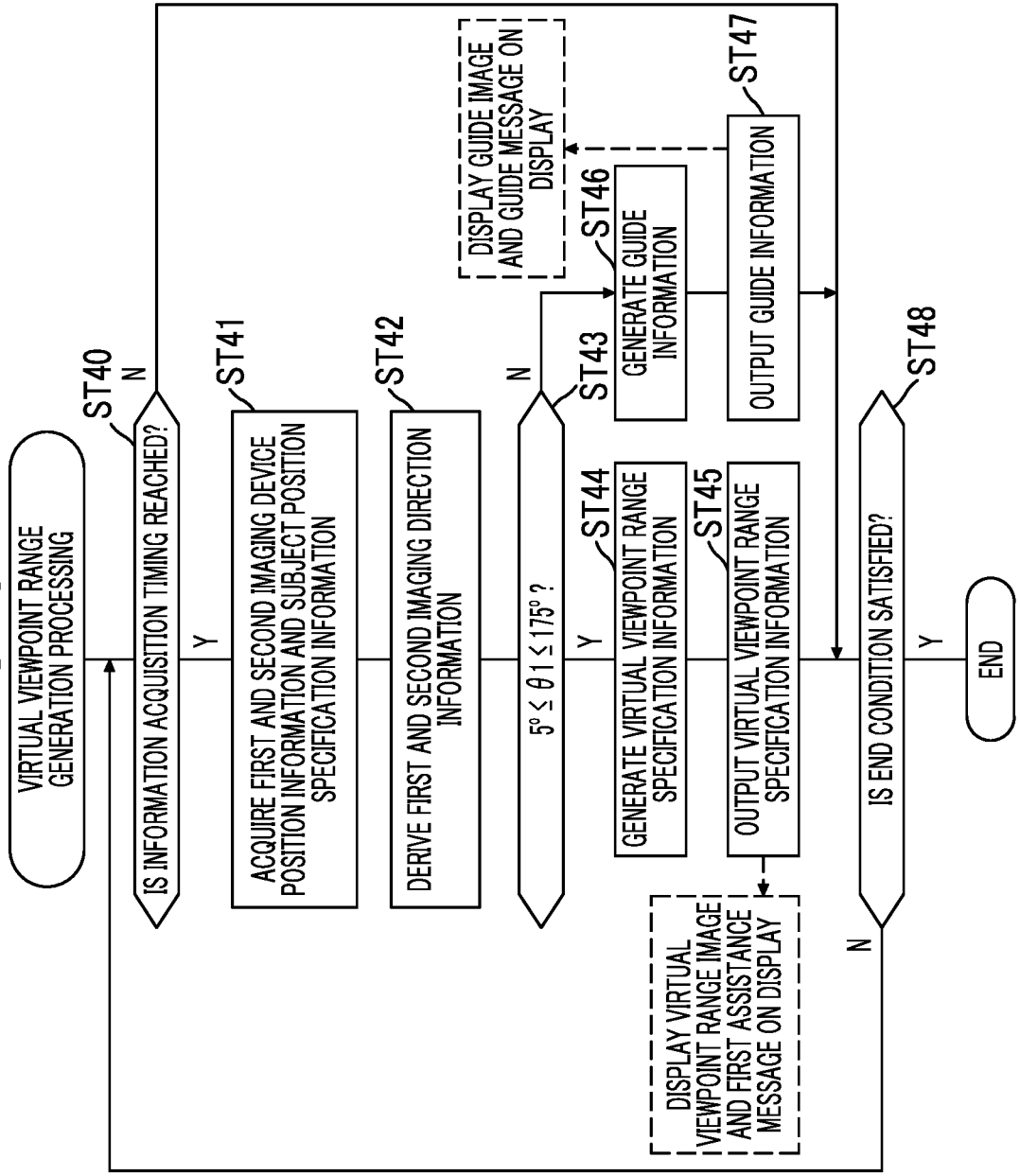
FIG. 28 is a flowchart showing an example of a flow of the virtual viewpoint range specification processing according to the second embodiment.

The virtual viewpoint range specification processing shown in FIG. 28 as an example is executed by the CPU 76 in accordance with the virtual viewpoint range specification program 88 in a case where an instruction to execute the virtual viewpoint range specification processing is received by the reception device 54 or 74, that is, in a case where the virtual viewpoint range display mode is set in step ST13 of the display mode setting processing (see FIG. 19).

In the virtual viewpoint range specification processing shown in FIG. 28, first, in step ST40, the control unit 76A determines whether or not the information acquisition timing is reached. An example of the information acquisition timing includes timing divided by a time interval defined by an output frame rate. In step ST40, in a case where the information acquisition timing is reached, an affirmative determination is made, and the virtual viewpoint range specification processing proceeds to step ST41. In step ST40, in a case where the information acquisition timing is not reached, a negative determination is made, and the virtual viewpoint range specification processing proceeds to step ST48.

In step ST41, the determination unit 76B acquires the first imaging device position information from the first imaging device 14, acquires the second imaging device position information from the second imaging device 16, and acquires the subject position specification information from the GPS terminal 18. After that, the virtual viewpoint range specification processing proceeds to step ST42.

In step ST42, the determination unit 76B derives the first imaging direction information indicating the first imaging direction D1, on the basis of the first imaging device position information and the subject position specification information acquired in step ST41. Further, the determination unit 76B derives the second imaging direction information indicating the second imaging direction D2, on the basis of the second imaging device position information and the subject position specification information acquired in step ST41. After that, the virtual viewpoint range specification processing proceeds to step ST43.

In step ST43, the determination unit 76B determines whether or not the smaller angle θ1, out of the angles formed by the first imaging direction D1 and the second imaging direction D2 derived in step ST42, is 5 degrees or more and 175 degrees or less. In a case where 5 degrees≤θ1≤175 degrees is satisfied, an affirmative determination is made, and the virtual viewpoint range specification processing proceeds to step ST44. In a case where 5 degrees≤θ1≤175 degrees is not satisfied, that is, in a case where θ1<5 degrees or θ1>175 degrees is satisfied, a negative determination is made, and the virtual viewpoint range specification processing proceeds to step ST46.

In step ST44, the virtual viewpoint range specification unit 76C generates the virtual viewpoint range specification information. The virtual viewpoint range specification information is information for specifying the range within the angle θ1 as the virtual viewpoint range. The virtual viewpoint range specification unit 76C derives the virtual viewpoint range specification information on the basis of the first imaging device position information, the second imaging device position information, the first imaging direction information, and the second imaging direction information. After that, the virtual viewpoint range specification processing proceeds to step ST45.

In step ST45, the virtual viewpoint range specification unit 76C outputs the virtual viewpoint range specification information derived in step ST44 to the first imaging device 14. The CPU 60 of the first imaging device 14 generates the virtual viewpoint range image and the first assistance message on the basis of the virtual viewpoint range specification information received from the virtual viewpoint range specification unit 76C (see FIG. 9). The virtual viewpoint range image is an image showing the specified virtual viewpoint range. The CPU 60 causes the display 46 to display the generated virtual viewpoint range image and the generated first assistance message (see FIG. 12). After that, the virtual viewpoint range specification processing proceeds to step ST48.

On the other hand, in step ST46, the guide information generation unit 76F generates the guide information. The guide information is information for guiding in which direction the first imaging device 14 or the second imaging device 16 should be moved, in order to obtain the angle θ1 satisfying 5 degrees≤θ1≤175 degrees. After that, the virtual viewpoint range specification processing proceeds to step ST47.

In step ST47, the guide information generation unit 76F outputs the guide information generated in step ST46 to the first imaging device 14. The CPU 60 of the first imaging device 14 generates the guide image and the guide message on the basis of the guide information received from the guide information generation unit 76F, and causes the display 46 to display the generated guide image and the generated guide message. The guide image and the guide message are an image and a message for making the user (for example, the first person 26) perceive that the virtual viewpoint range cannot be specified and for guiding in which direction the first imaging device 14 or the second imaging device 16 should be moved. After that, the virtual viewpoint range specification processing proceeds to step ST48.

In step ST48, the control unit 76A determines whether or not a condition of ending the virtual viewpoint range specification processing (hereinafter, referred to as a "virtual viewpoint range specification processing end condition") is satisfied. An example of the virtual viewpoint range specification processing end condition includes a condition that the mode change instruction is received by the reception device 74 (see FIG. 5). In step ST48, in a case where the virtual viewpoint range specification processing end condition is not satisfied, a negative determination is made, and the virtual viewpoint range specification processing proceeds to step ST40. In step ST48, in a case where the virtual viewpoint range specification processing end condition is satisfied, an affirmative determination is made, and the virtual viewpoint range specification processing ends.

Figure 29:
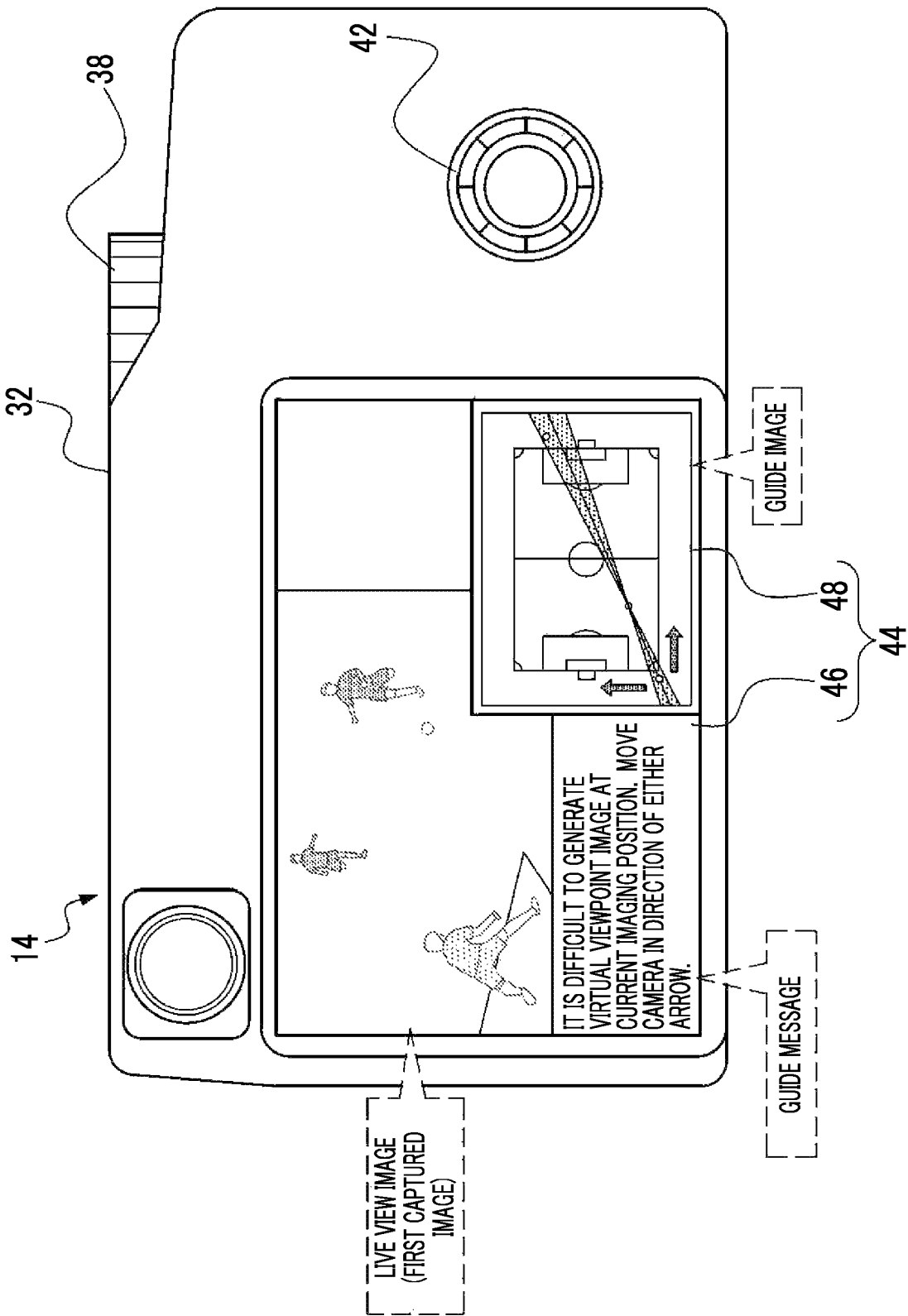
FIG. 29 is a rear view showing another example of the external configuration of the first imaging device in a case where the live view image, the guide image, and the guide message are displayed on the touch panel/display of the first imaging device.

In the second embodiment, although a case where the smaller angle θ1, out of the angles formed by the first imaging direction D1 and the second imaging direction D2 with respect to the specific subject 30 (see FIG. 1), is smaller than 5 degrees has been described as an example, as shown in FIG. 26, a case where the angle θ1 is larger than 175 degrees is also conceivable. As shown in FIG. 29 as an example, the soccer field plan view image, the mark indicating the current position of the first imaging device 14, the mark indicating the current position of the second imaging device 16 disposed at a position where the angle θ1 is larger than 175 degrees, the hatched region, and the arrows as the movement direction information are superimposed and displayed on the guide image. The arrows for guiding in which direction the first imaging device 14 should be moved is shown on the guide image shown in FIG. 29.

In the example shown in FIG. 29, the display 46 of the first imaging device 14 displays the first captured image as the live view image, and displays the guide message and the guide image. In the example shown in FIG. 29, a message "It is difficult to generate the virtual viewpoint image at the current imaging position. Move the camera in the direction of either arrow", which is for promoting the movement of the first imaging device 14, is displayed as the guide message.

Figure 30:
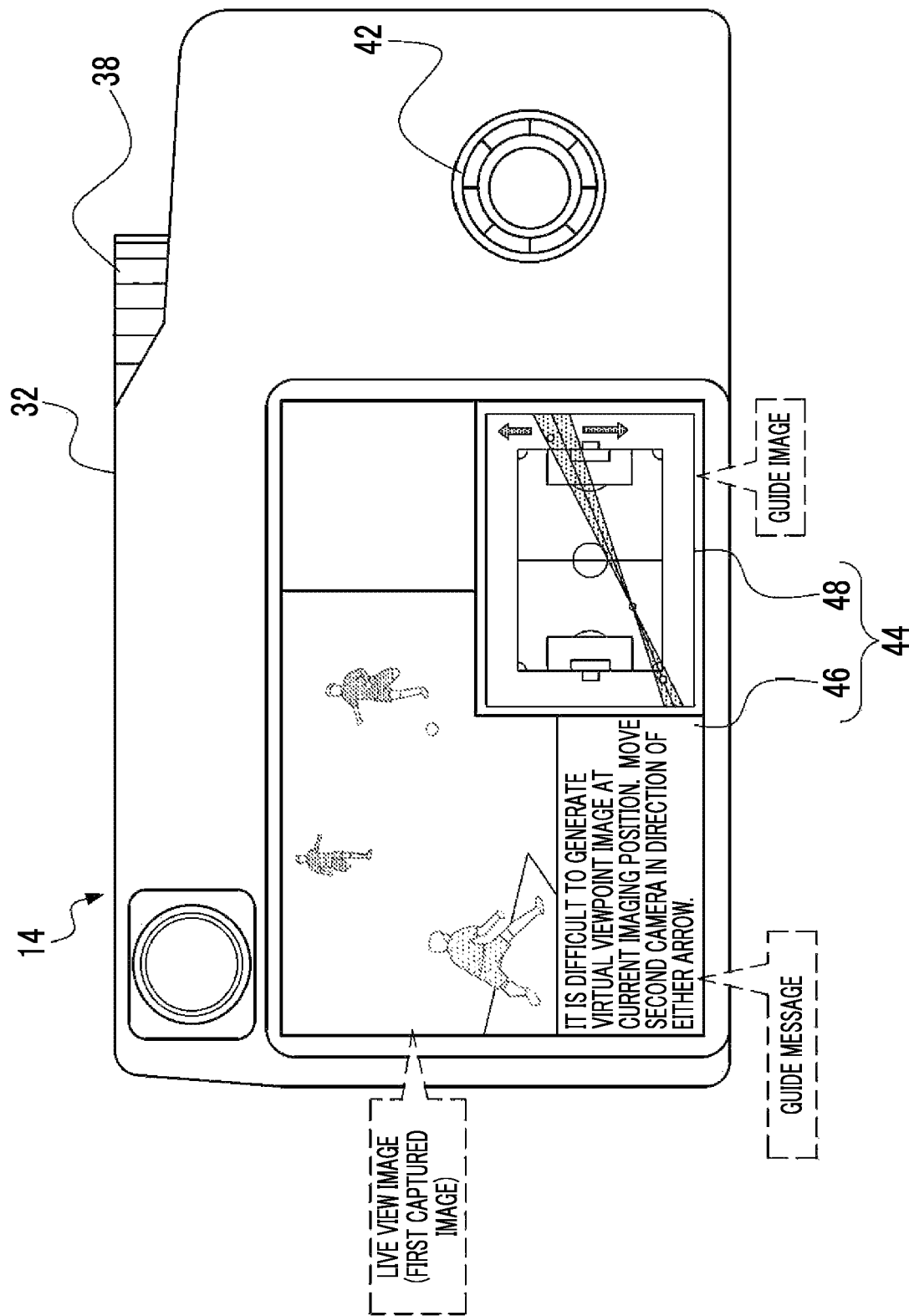
FIG. 30 is a rear view showing still another example of the external configuration of the first imaging device in a case where the live view image, the guide image, and the guide message are displayed on the touch panel/display of the first imaging device.

In the guide image shown in FIG. 29, the movement direction information and the guide message for promoting the movement of the first imaging device 14 are displayed, but the technique of the present disclosure is not limited thereto. As shown in FIG. 30 as an example, the display 46 may display the guide message and the guide image including the movement direction information for promoting the movement of the second imaging device 16. In the example shown in FIG. 30, a message "It is difficult to generate the virtual viewpoint image at the current imaging position. Move the second camera in the direction of either arrow", which is for promoting the movement of the second imaging device 16, is displayed as the guide message.

In the second embodiment, the virtual viewpoint range is specified in the range of 5 degrees≤θ1≤175 degrees, but the technique of the present disclosure is not limited thereto. The numerical values of 5 degrees and 175 degrees are an example, and the virtual viewpoint range is appropriately set to a range in which the virtual viewpoint image can be generated.

As described above, according to the second embodiment, the virtual viewpoint range is a range within an angle that is within the default angle (for example, 175 degrees) and that is equal to or more than the under-angle (for example, 5 degrees) predetermined as the under-angle within the default angle. Therefore, it is possible to restrain the occurrence of a situation where the virtual viewpoint image is not generated because the positions of the plurality of imaging devices are too close to each other, as compared with a case where the under-angle is not determined.

Further, according to the second embodiment, the under-angle is an angle that defines the range of the positions of the imaging devices, which is not suitable for generating the virtual viewpoint image on the basis of the plurality of captured images. Therefore, it is possible to restrain the occurrence of a situation where even though the positions of the plurality of imaging devices are positions where the virtual viewpoint image cannot be generated, the plurality of imaging devices perform imaging without changing the positions, as compared with a case where the under-angle is not the angle that defines the range of the positions of the imaging devices, which is not suitable for generating the virtual viewpoint image.

Further, according to the second embodiment, the information processing apparatus 12 outputs the guide information for guiding the position of at least one imaging device out of the plurality of imaging devices to a position where the angle θ1 falls within a range of 5 degrees or more and 175 degrees or less, in a case where the smaller angle θ1, out of the angles θ1 and θ2 formed by the imaging directions of the plurality of imaging devices with respect to the specific subject 30, is smaller than 5 degrees. Therefore, the imaging device can be appropriately disposed at a position where the plurality of captured images capable of generating the virtual viewpoint image can be obtained, as compared with a case where the position of the imaging device is not guided.

Further, according to the second embodiment, the guide information is information for guiding the first imaging device 14 or the second imaging device 16 to a position where the angle θ1 falls within a range of 5 degrees or more and 175 degrees or less. Therefore, it is possible to reduce the time and effort required for adjusting the position of the imaging device as compared with a case of guiding both the first imaging device 14 and the second imaging device 16 in order to obtain the plurality of captured images capable of generating the virtual viewpoint image.

Further, according to the second embodiment, the information processing apparatus 12 outputs the guide information to the same output destination as the output destination of the virtual viewpoint range specification information, that is, to the first imaging device 14. Therefore, it is possible to make the user visually perceive the position of the imaging device that is used to obtain the plurality of captured images capable of generating the virtual viewpoint image, together with the virtual viewpoint range.

Third Embodiment

Figure 31:
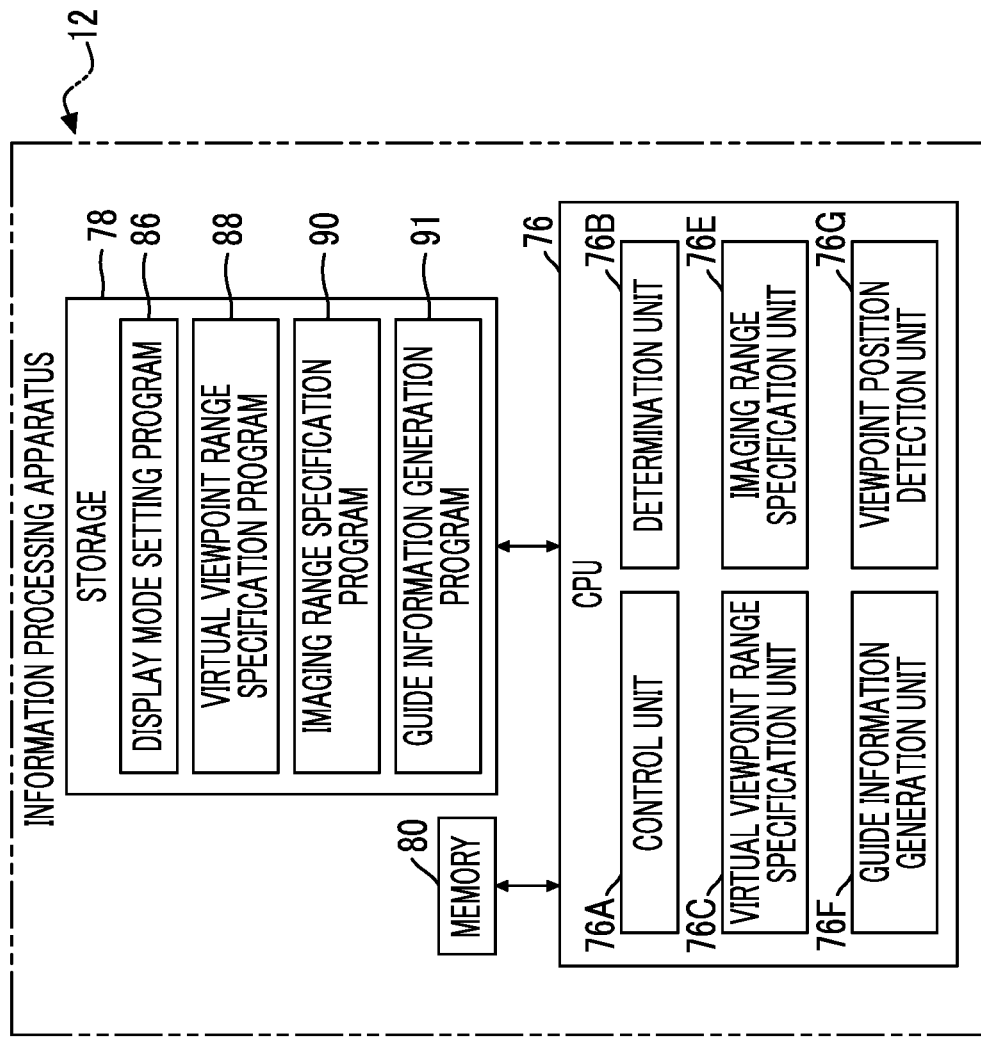
FIG. 31 is a block diagram showing an example of functions of main units of an information processing apparatus according to a third embodiment.

As shown in FIG. 31 as an example, the information processing apparatus 12 according to a third embodiment is different from the information processing apparatus 12 according to the above second embodiment in that a guide information generation program 91 is stored in the storage 78 and the CPU 76 comprises a viewpoint position detection unit 76G. Since the other configurations of the information processing apparatus 12 according to the third embodiment are the same as those of the information processing apparatus 12 according to the above second embodiment, the same constituent elements as the constituent elements described in the above embodiments are designated by the same reference numerals, and the description thereof will be not be repeated.

The storage 78 of the information processing apparatus 12 stores the display mode setting program 86, the virtual viewpoint range specification program 88, the imaging range specification program 90, and the guide information generation program 91. Hereinafter, in a case where it is not necessary to distinguish the guide information generation program 91 from the display mode setting program 86, the virtual viewpoint range specification program 88, and the imaging range specification program 90 in the description, the guide information generation program 91 will be also referred to as the "information processing apparatus program" without a reference numeral.

Since the display mode setting processing performed by executing the display mode setting program 86 and the imaging range specification processing performed by executing the imaging range specification program 90 are the same as the processing described in the above first embodiment, the description thereof will not be repeated here. Since the virtual viewpoint range specification processing performed by executing the virtual viewpoint range specification program 88 is the same as the processing described in the above second embodiment, the description thereof will not be repeated here. The guide information generation processing performed by executing the guide information generation program 91 will be described below.

The CPU 76 reads out the guide information generation program 91 from the storage 78 and executes the read-out guide information generation program 91 on the memory 80 to operate as the control unit 76A, the determination unit 76B, the guide information generation unit 76F, and the viewpoint position detection unit 76G.

Figure 32:
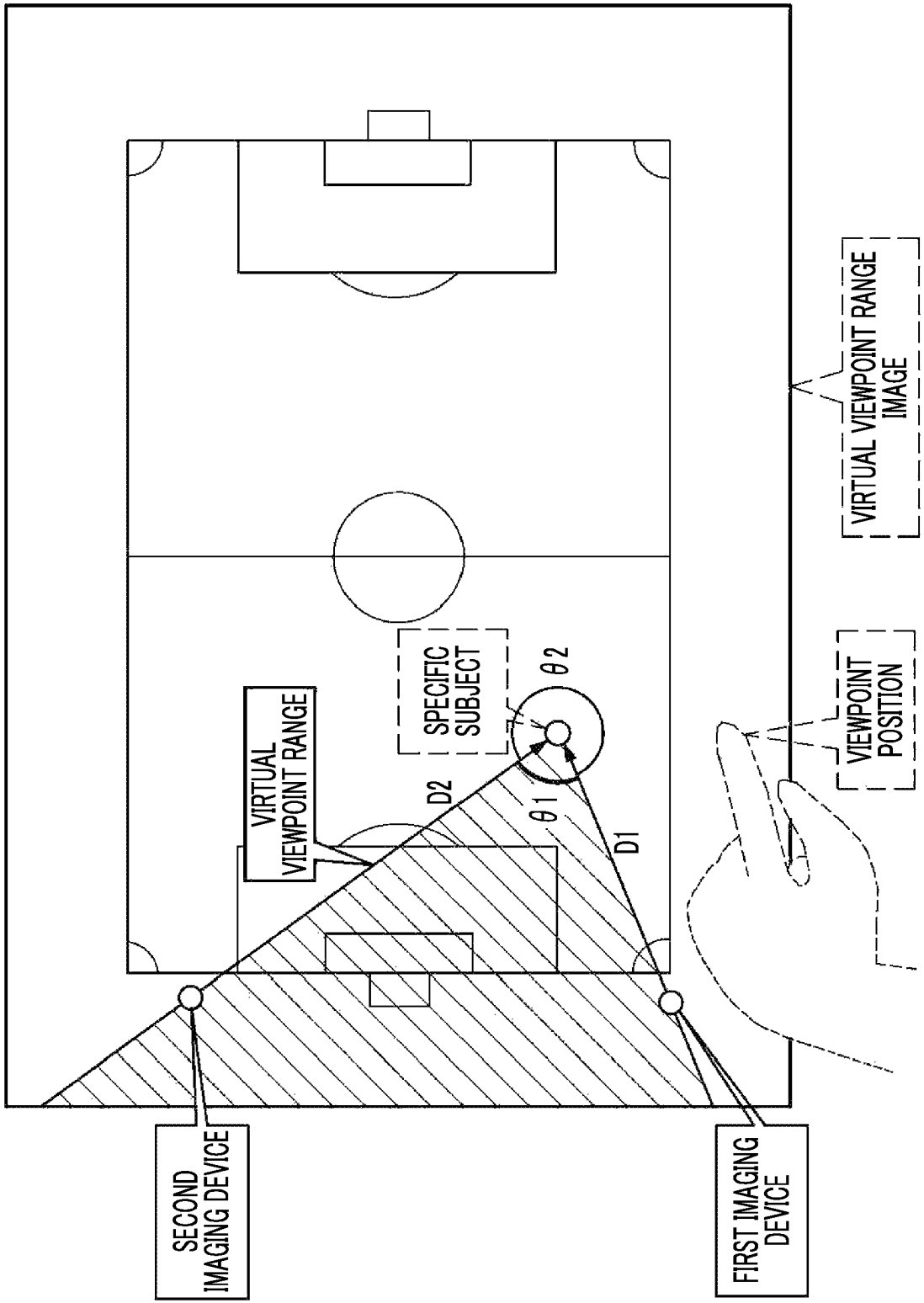
FIG. 32 is a conceptual diagram provided for illustrating an example of a content of guide information generation processing according to the third embodiment.

As shown in FIG. 32 as an example, in the virtual viewpoint range display mode according to the third embodiment, the same virtual viewpoint range image as in the virtual viewpoint range display mode according to the above first embodiment is generated. FIG. 32 shows the virtual viewpoint range image displayed on the display 46 of the first imaging device 14. In the virtual viewpoint range image, the hatched region within the smaller angle θ1, out of the angles θ1 and θ2 formed by the first imaging direction D1 and the second imaging direction D2, is shown as the virtual viewpoint range. As in the above second embodiment, the virtual viewpoint range is defined on a condition that the angle θ1 is equal to or less than the default angle (for example, 175 degrees) and is equal to or more than the under-angle (for example, 5 degrees) predetermined as the under-angle within the default angle.

In a case where the user touches the virtual viewpoint image on the touch panel/display 44 by using, for example, an instruction object such as a finger or a stylus pen, the viewpoint position detection unit 76G detects the contact position as a viewpoint position. The viewpoint position is the position of the virtual viewpoint for generating the virtual viewpoint image, and is designated by the user. In the example shown in FIG. 32, the position on the soccer field 22 corresponding to the contact position on the touch panel/display 44 is shown as the viewpoint position.

Figure 33:
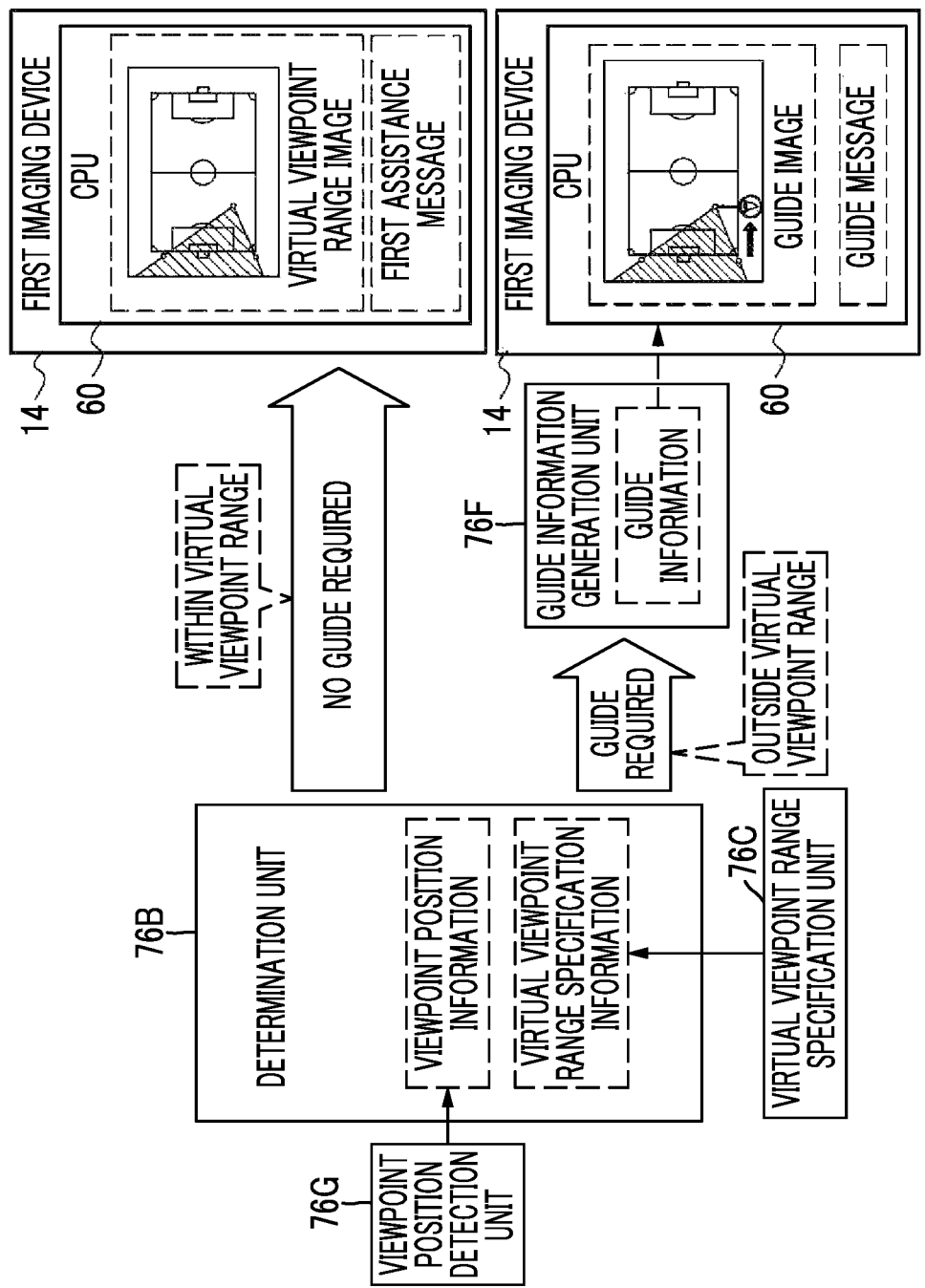
FIG. 33 is a conceptual diagram provided for illustrating an example of the content of the guide information generation processing according to the third embodiment.

In the virtual viewpoint range display mode according to the third embodiment, as shown in FIG. 33 as an example, the determination unit 76B acquires the virtual viewpoint range specification information indicating the virtual viewpoint range from the virtual viewpoint range specification unit 76C, and acquires the viewpoint position information indicating the viewpoint position from the viewpoint position detection unit 76G. Here, the viewpoint position is an example of the "viewpoint position" according to the technique of the present disclosure, and the viewpoint position information is an example of the "viewpoint position information" according to the technique of the present disclosure.

The determination unit 76B determines whether or not the viewpoint position designated by the user is within the virtual viewpoint range. In a case where the viewpoint position is within the virtual viewpoint range, the determination unit 76B determines that it is unnecessary to generate the guide information through the guide information generation unit 76F, and outputs the virtual viewpoint range specification information to the first imaging device 14. On the other hand, in a case where the viewpoint position is outside the virtual viewpoint range, the determination unit 76B determines that it is necessary to generate the guide information through the guide information generation unit 76F.

The guide information generation unit 76F generates the guide information and outputs the generated guide information to the first imaging device 14. The guide information is information for guiding the first imaging device 14 or the second imaging device 16 to a position satisfying 5 degrees≤angle θ1≤175 degrees, in order to obtain the plurality of captured images necessary for generating the virtual viewpoint image of the specific subject 30 viewed from the viewpoint position designated by the user. The guide information includes the first imaging device position information, the second imaging device position information, the first imaging direction information, the second imaging direction information, and the movement direction information. The movement direction information is information indicating a direction in which at least one of the first imaging device 14 or the second imaging device 16 is moved. Here, the guide information is an example of the "second guide information" according to the technique of the present disclosure.

The CPU 60 of the first imaging device 14 generates a guide image and a guide message on the basis of the guide information received from the guide information generation unit 76F. The guide image is an image showing the movement direction information for guiding in which direction the first imaging device 14 or the second imaging device 16 should be moved. The guide message is a message for making the user perceive that the virtual viewpoint image desired by the user (for example, the first person 26) cannot be generated from the captured image obtained by being captured at the current position of the imaging device and for guiding in which direction the first imaging device 14 or the second imaging device 16 should be moved. The CPU 60 causes the display 46 to display the guide image and the guide message.

Figure 34:
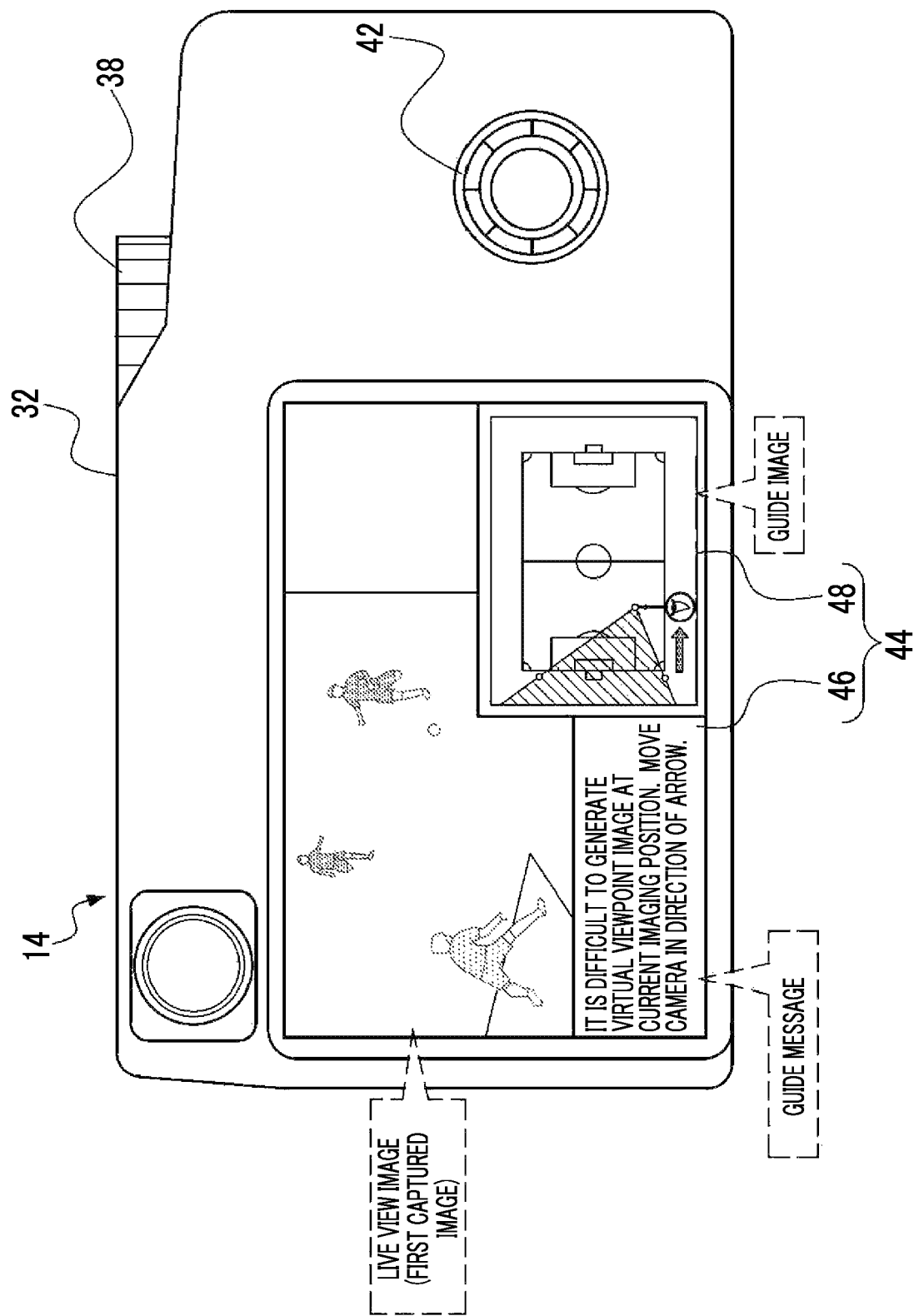
FIG. 34 is a rear view showing an example of the external configuration of the first imaging device in a case where the live view image, the guide image, and the guide message are displayed on the touch panel/display of the first imaging device.

As shown in FIG. 34 as an example, the display 46 of the first imaging device 14 displays the first captured image as the live view image, and displays the guide message and the guide image. In the example shown in FIG. 34, the same image as the guide image shown in FIG. 33 is displayed as the guide image, and a message "The virtual viewpoint image cannot be generated at the current imaging position. Move the first camera in the direction of the arrow" is displayed as the guide message.

Next, an example of the flow of the guide information generation processing performed by the information processing apparatus 12 will be described with reference to FIG. 35. Hereinafter, in a case where it is not necessary to distinguish the guide information generation processing from the display mode setting processing, the virtual viewpoint range specification processing, and the imaging range specification processing in the description, the guide information generation processing will also be referred to as the "information processing apparatus-side processing".

Figure 35:
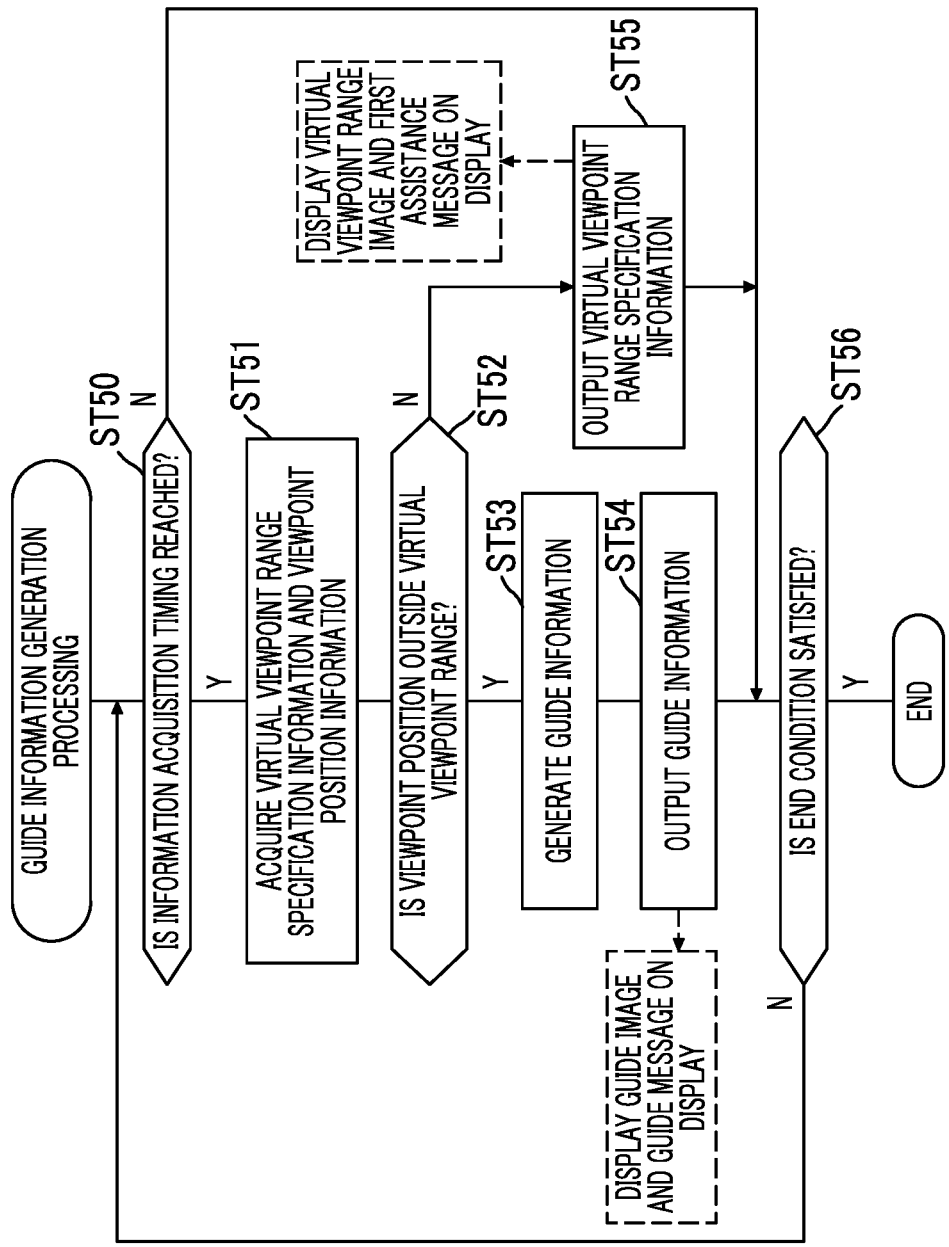
FIG. 35 is a flowchart showing an example of a flow of guide information generation processing according to the third embodiment.

The guide information generation processing shown in FIG. 35 as an example is executed after step ST44 of the virtual viewpoint range specification processing (see FIG. 20) according to the second embodiment in a case where the information processing apparatus 12 and the first imaging device 14 have a guide information generation function. The guide information generation processing is executed by the CPU 76 in accordance with the guide information generation program 91.

In the guide information generation processing shown in FIG. 35, first, in step ST50, the control unit 76A determines whether or not the information acquisition timing is reached. An example of the information acquisition timing includes timing divided by a time interval defined by an output frame rate. In step ST50, in a case where the information acquisition timing is reached, an affirmative determination is made, and the guide information generating processing proceeds to step ST51. In step ST50, in a case where the information acquisition timing is not reached, a negative determination is made, and the guide information generating processing proceeds to step ST56.

In step ST51, the determination unit 76B acquires the virtual viewpoint range specification information from the virtual viewpoint range specification unit 76C, and acquires the viewpoint position information from the viewpoint position detection unit 76G. After that, the guide information generating processing proceeds to step ST52.

In step ST52, the determination unit 76B determines whether or not the viewpoint position designated by the user is outside the virtual viewpoint range on the basis of the virtual viewpoint range specification information and the viewpoint position information acquired in step ST51. In a case where the viewpoint position is outside the virtual viewpoint range, an affirmative determination is made, and the guide information generation processing proceeds to step ST53. In a case where the viewpoint position is within the virtual viewpoint range, a negative determination is made, and the guide information generation processing proceeds to step ST55.

In step ST53, the guide information generation unit 76F generates the guide information. The guide information is information for guiding in which direction the first imaging device 14 or the second imaging device 16 should be moved, in order to obtain the plurality of captured images necessary for generating the virtual viewpoint image of the specific subject 30 viewed from the viewpoint position designated by the user. The guide information generation unit 76F derives the guide information, on the basis of the virtual viewpoint range specification information and the viewpoint position information. After that, the guide information generation processing proceeds to step ST54.

In step ST54, the guide information generation unit 76F outputs the guide information derived in step ST53 to the first imaging device 14. The CPU 60 of the first imaging device 14 generates the guide image and the guide message on the basis of the guide information received from the guide information generation unit 76F. The guide image includes the movement direction information for guiding in which direction the first imaging device 14 or the second imaging device 16 should be moved. The CPU 60 causes the display 46 to display the generated guide image and the generated guide message. After that, the guide information generation processing proceeds to step ST56.

On the other hand, in step ST55, the determination unit 76B outputs the virtual viewpoint range specification information to the first imaging device 14. The CPU 60 of the first imaging device 14 generates the virtual viewpoint range image and the first assistance message on the basis of the virtual viewpoint range specification information received from the determination unit 76B, and causes the display 46 to display the generated virtual viewpoint range image and the generated first assistance message. After that, the guide information generation processing proceeds to step ST56.

In step ST56, the control unit 76A determines whether or not a condition of ending the guide information generation processing (hereinafter, referred to as a "guide information generation processing end condition") is satisfied. An example of the guide information generation processing end condition includes a condition that the mode change instruction is received by the reception device 54 or 74. In step ST56, in a case where the guide information generation processing end condition is not satisfied, a negative determination is made, and the guide information generation processing proceeds to step ST50. In step ST56, in a case where the guide information generation processing end condition is satisfied, an affirmative determination is made, and the guide information generation processing ends.

As described above, according to the third embodiment, the virtual viewpoint range is a range within the default angle (for example, 175 degrees) of the smaller angle θ1 out of the angles θ1 and θ2 formed by the imaging directions of the plurality of imaging devices with respect to the specific subject 30. The information processing apparatus 12 receives the viewpoint position information indicating the virtual viewpoint with respect to the virtual viewpoint image, and outputs the guide information for guiding the position of the first imaging device 14 to a position that falls within the default angle in a case where the viewpoint position is outside the virtual viewpoint range. Therefore, it is possible to guide the first imaging device 14 to a position where the captured images capable of generating the virtual viewpoint image can be obtained, even in case where the viewpoint position is outside the virtual viewpoint range.

Further, according to the third embodiment, the virtual viewpoint range is a range within an angle equal to or less than the default angle (for example, 175 degrees) and equal to or more than the under-angle (for example, 5 degrees) predetermined as the under-angle within the default angle. The guide information is information for guiding the position of the first imaging device 14 to the position that falls within a range of the under-angle or more and the default angle or less. Therefore, it is possible to avoid guiding the first imaging device 14 to a position within the under-angle even in a case where the viewpoint position is outside the virtual viewpoint range.

Further, according to the third embodiment, the guide information is information for guiding the position of the first imaging device 14 to the position that falls within an angle range of the under-angle or more and the default angle or less. Therefore, it is possible to reduce the time and effort required for adjusting the position of the imaging device that is used to obtain the plurality of captured images capable of generating the virtual viewpoint image, even in a case where the viewpoint position is outside the virtual viewpoint range, as compared with a case of guiding the positions of both the first imaging device 14 and the second imaging device 16 in order to obtain the plurality of captured images capable of generating the virtual viewpoint image.

Further, according to the third embodiment, the information processing apparatus 12 outputs the guide information to the first imaging device 14 that is the same output destination as the output destination of the virtual viewpoint range specification information. Therefore, it is possible to make the user visually perceive the position of the imaging device that is used to obtain the plurality of captured images capable of generating the virtual viewpoint image, together with the virtual viewpoint range, even in a case where the viewpoint position is outside the virtual viewpoint range, as compared with a case where the guide information is not output to the same output destination as the output destination of the virtual viewpoint range specification information.

In the above third embodiment, the guide information generation unit 76F generates the guide information for moving the position of the first imaging device 14, but the technique of the present disclosure is not limited thereto. The guide information generation unit 76F may generate the guide information for moving the position of the second imaging device 16, or may generate the guide information for moving the positions of both the first imaging device 14 and the second imaging device 16.

Fourth Embodiment

Figure 36:
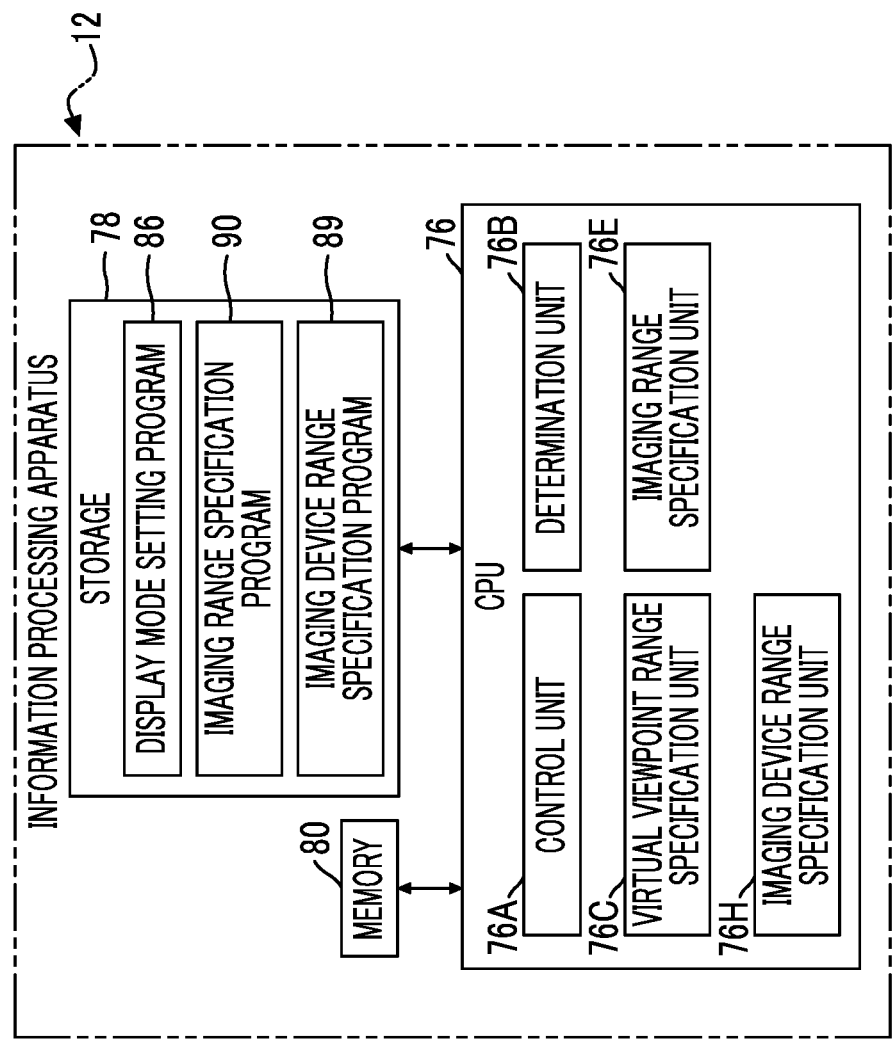
FIG. 36 is a block diagram showing an example of functions of main units of an information processing apparatus according to a fourth embodiment.

As shown in FIG. 36 as an example, the information processing apparatus 12 according to a fourth embodiment is different from the information processing apparatus 12 according to the above first embodiment in that an imaging device range specification program 89 is stored in the storage 78 instead of the virtual viewpoint range specification program 88 and the CPU 76 comprises an imaging device range specification unit 76H instead of the warning information generation unit 76D. Since the other configurations of the information processing apparatus 12 according to the fourth embodiment are the same as those of the information processing apparatus 12 according to the above first embodiment, the same constituent elements as the constituent elements described in the above embodiments are designated by the same reference numerals, and the description thereof will be not be repeated.

The storage 78 of the information processing apparatus 12 stores the display mode setting program 86, the imaging range specification program 90, and the imaging device range specification program 89. Hereinafter, in a case where it is not necessary to distinguish the imaging device range specification program 89 from the display mode setting program 86, the virtual viewpoint range specification program 88, the imaging range specification program 90, and the guide information generation program 91 in the description, the imaging device range specification program 89 will be also referred to as the "information processing apparatus program" without a reference numeral.

Since the display mode setting processing performed by executing the display mode setting program 86 and the imaging range specification processing performed by executing the imaging range specification program 90 are the same as the processing described in the above first embodiment, the description thereof will not be repeated here. The imaging device range specification processing performed by executing the imaging device range specification program 89 will be described below.

The CPU 76 reads out the imaging device range specification program 89 from the storage 78 and executes the read-out imaging device range specification program 89 on the memory 80 to operate as the control unit 76A, the determination unit 76B, the virtual viewpoint range specification unit 76C, and the imaging device range specification unit 76H.

Figure 37:
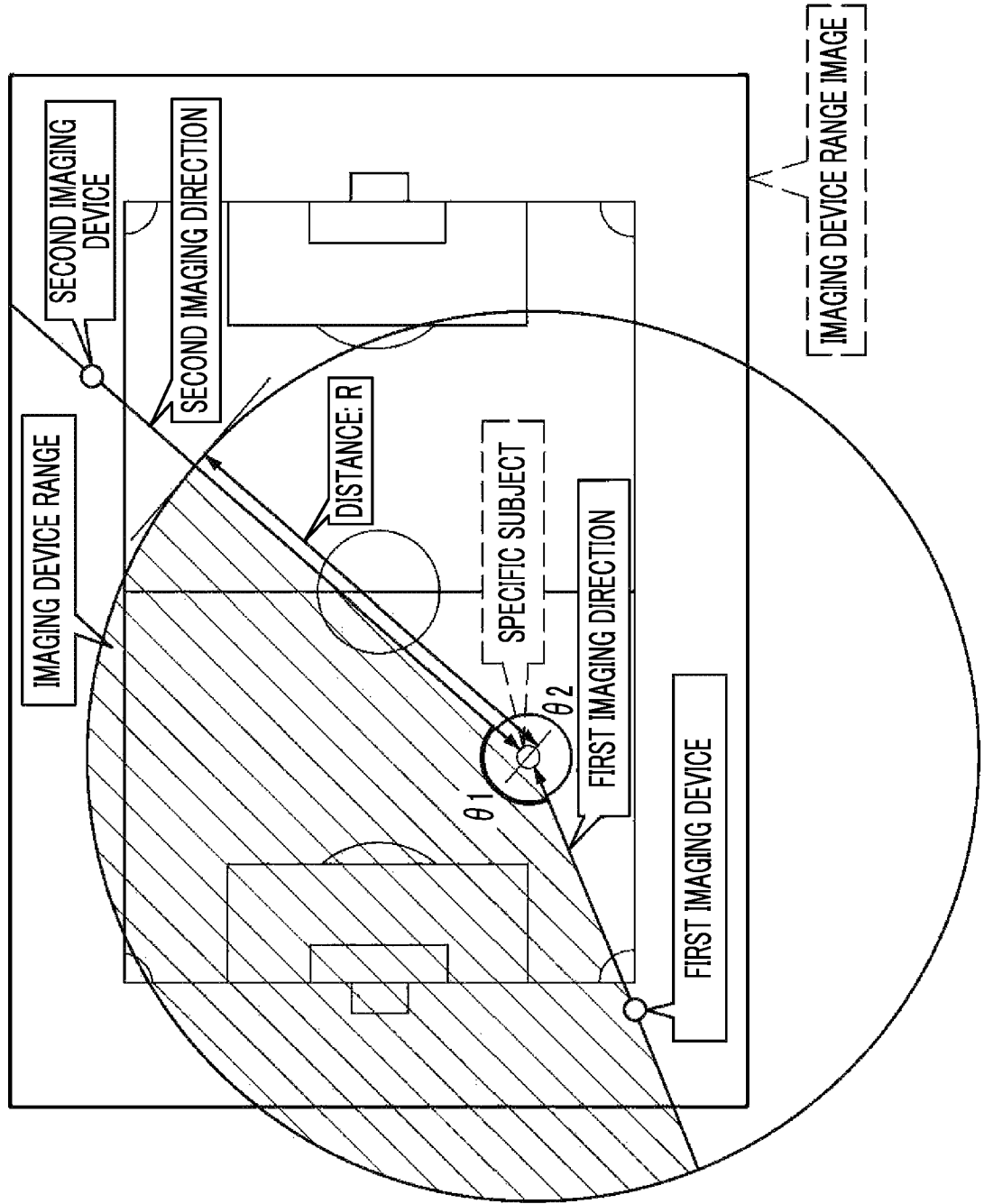
FIG. 37 is a conceptual diagram provided for illustrating an example of a content of imaging device range specification processing according to the fourth embodiment.

As shown in FIG. 37 as an example, in the virtual viewpoint range display mode according to the fourth embodiment, a range of the position of the imaging device where the quality of the plurality of captured images falls within a default range is shown as an imaging device range on the basis of at least one of the zoom capabilities or the subject distances of the plurality of imaging devices, on the imaging device range image. The imaging device range is a range defined by a specific distance R from the specific subject 30, and the distance R is determined on the basis of at least one of the subject distances or the zoom capabilities of the plurality of imaging devices. A circle centered on the specific subject 30 and having a distance R as a radius is displayed on the imaging device range image. A hatched region within a fan shape defined by the angle θ1, inside the circle shown in FIG. 37, is the imaging device range. The angle θ1 is the smaller angle out of the angles θ1 and θ2 formed by the first imaging direction D1 and the second imaging direction D2, as described in the above embodiments.

Figure 38:
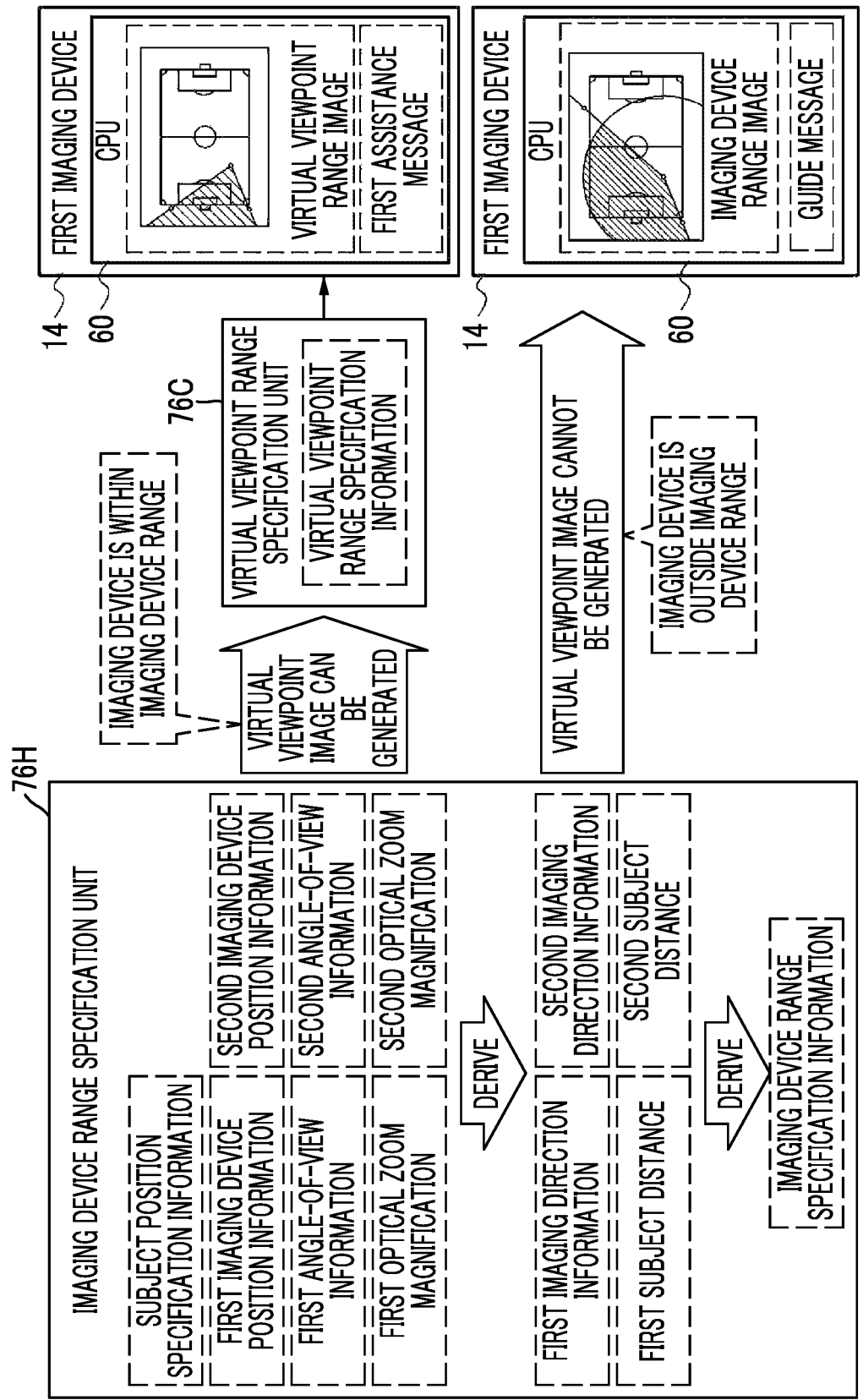
FIG. 38 is a conceptual diagram provided for illustrating an example of the content of the imaging device range specification processing according to the fourth embodiment.

In the virtual viewpoint range display mode according to the fourth embodiment, the imaging device range specification unit 76H acquires the first imaging device position information, the first angle-of-view information, and first optical zoom magnification from the first imaging device 14, as shown in FIG. 38 as an example. The imaging device range specification unit 76H acquires the second imaging device position information, the second angle-of-view information, and second optical zoom magnification from the second imaging device 16. Further, the imaging device range specification unit 76H acquires subject position specification information from the GPS terminal 18. Hereinafter, in a case where it is not necessary to distinguish between the first angle-of-view information and the second angle-of-view information in the description, the first angle-of-view information and the second angle-of-view information will be referred to as "angle-of-view information". Further, hereinafter, in a case where it is not necessary to distinguish between the first optical zoom magnification and the second optical zoom magnification, the first optical zoom magnification and the second optical zoom magnification will be referred to as "optical zoom magnification". Here, the first optical zoom magnification and the second optical zoom magnification are an example of the "zoom capability" according to the technique of the present disclosure.

The imaging device range specification unit 76H derives the first subject distance and the first imaging direction information indicating the first imaging direction D1, on the basis of the first imaging device position information and the subject position specification information. Further, the imaging device range specification unit 76H derives the second subject distance and the second imaging direction information indicating the second imaging direction D2, on the basis of the second imaging device position information and the subject position specification information. Here, the first subject distance and the second subject distance are an example of the "subject distance" according to the technique of the present disclosure. Hereinafter, in a case where it is not necessary to distinguish between the first subject distance and the second subject distance, the first subject distance and the second subject distance will be referred to as a "subject distance".

The imaging device range specification unit 76H generates imaging device range specification information on the basis of the first subject distance, the second subject distance, the first optical zoom magnification, and the second optical zoom magnification. The imaging device range specification information is information capable of specifying the range of the position of the second imaging device 16 where the quality (for example, the size of the image showing the specific subject 30 and/or the resolution of the captured image) of the first captured image and the second captured image acquired by the first imaging device 14 and the second imaging device 16 falls within the default range. The default range may be a fixed value derived in advance by, for example, sensory testing and/or computer simulation, or a variable value that can be changed in accordance with the instruction received by the reception device 54 or 74. The imaging device range specification information may be generated on the basis of at least one of the subject distance or the optical zoom magnification. Here, the imaging device range specification information is an example of the "imaging device range specification information" according to the technique of the present disclosure.

The determination unit 76B determines whether or not the position of the second imaging device 16 is within the imaging device range specified by the imaging device range specification information. The imaging device range refers to the range of the position of the second imaging device 16 where the quality of the first captured image and the second captured image falls within the default range.

In a case where the position of the second imaging device 16 is within the imaging device range, the determination unit 76B determines that the virtual viewpoint image can be generated. In this case, the virtual viewpoint range specification unit 76C generates virtual viewpoint range specification information and outputs the generated virtual viewpoint range specification information to the first imaging device 14, as in the above first embodiment. The CPU 60 of the first imaging device 14 generates the virtual viewpoint range image and the first assistance message on the basis of the virtual viewpoint range specification information received from the virtual viewpoint range specification unit 76C. Since the virtual viewpoint range image and the first assistance message are the same as those described in the above first embodiment, the description thereof will not be repeated.

On the other hand, in a case where the position of the second imaging device 16 is outside the imaging device range, the determination unit 76B determines that the virtual viewpoint image cannot be generated. In this case, the imaging device range specification unit 76H outputs the imaging device range specification information to the first imaging device 14.

The CPU 60 of the first imaging device 14 generates an imaging device range image and a guide message on the basis of the imaging device range specification information received from the imaging device range specification unit 76H. The imaging device range image is an image in which the mark indicating the current position of the first imaging device 14, the mark indicating the current position of the second imaging device 16, and the imaging device range are superimposed on the soccer field plan view image. The guide message is a message for making the user perceive that the virtual viewpoint image cannot be generated from the captured image obtained by being captured at the current position of the second imaging device 16 and for guiding the movement of the second imaging device 16. The CPU 60 causes the display 46 to display the imaging device range image and the guide message.

Figure 39:
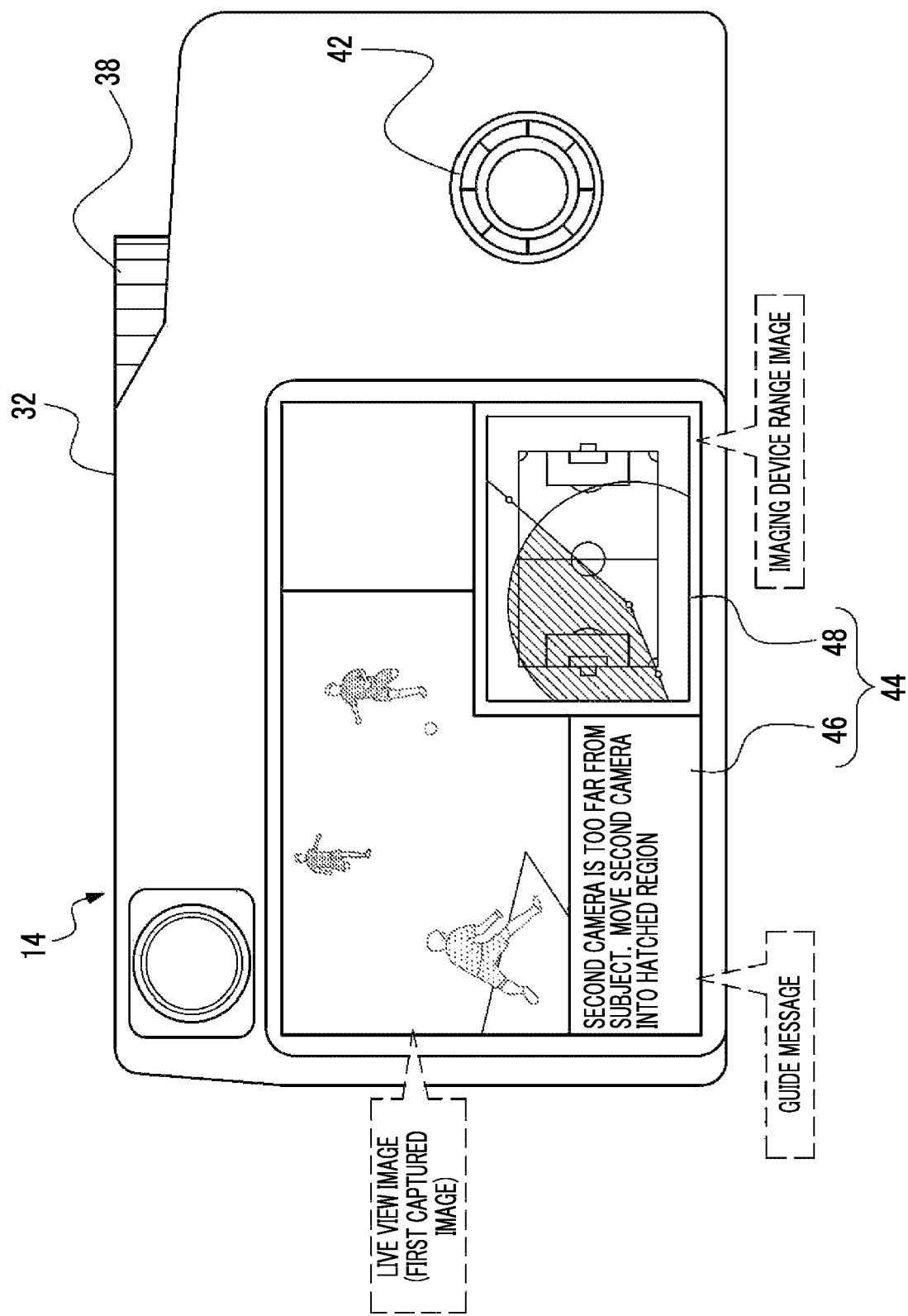
FIG. 39 is a rear view showing an example of the external configuration of the first imaging device in a case where the live view image, an imaging device range image, and the guide message are displayed on the touch panel/display of the first imaging device.

As shown in FIG. 39 as an example, the display 46 of the first imaging device 14 displays the first captured image as the live view image, and displays the guide message and the imaging device range image. In the example shown in FIG. 39, the same image as the imaging device range image shown in FIG. 38 is displayed as the imaging device range image, and a message "The second camera is too far from the subject. Move the second camera into the hatched region" is displayed as the guide message.

Next, an example of the flow of the imaging device range specification processing performed by the information processing apparatus 12 will be described with reference to FIG. 40. Hereinafter, in a case where it is not necessary to distinguish the imaging device range specification processing from the display mode setting processing, the virtual viewpoint range specification processing, the imaging range specification processing, and the guide information generation processing in the description, the imaging device range specification processing will be also referred to as the "information processing apparatus-side processing".

Figure 40:
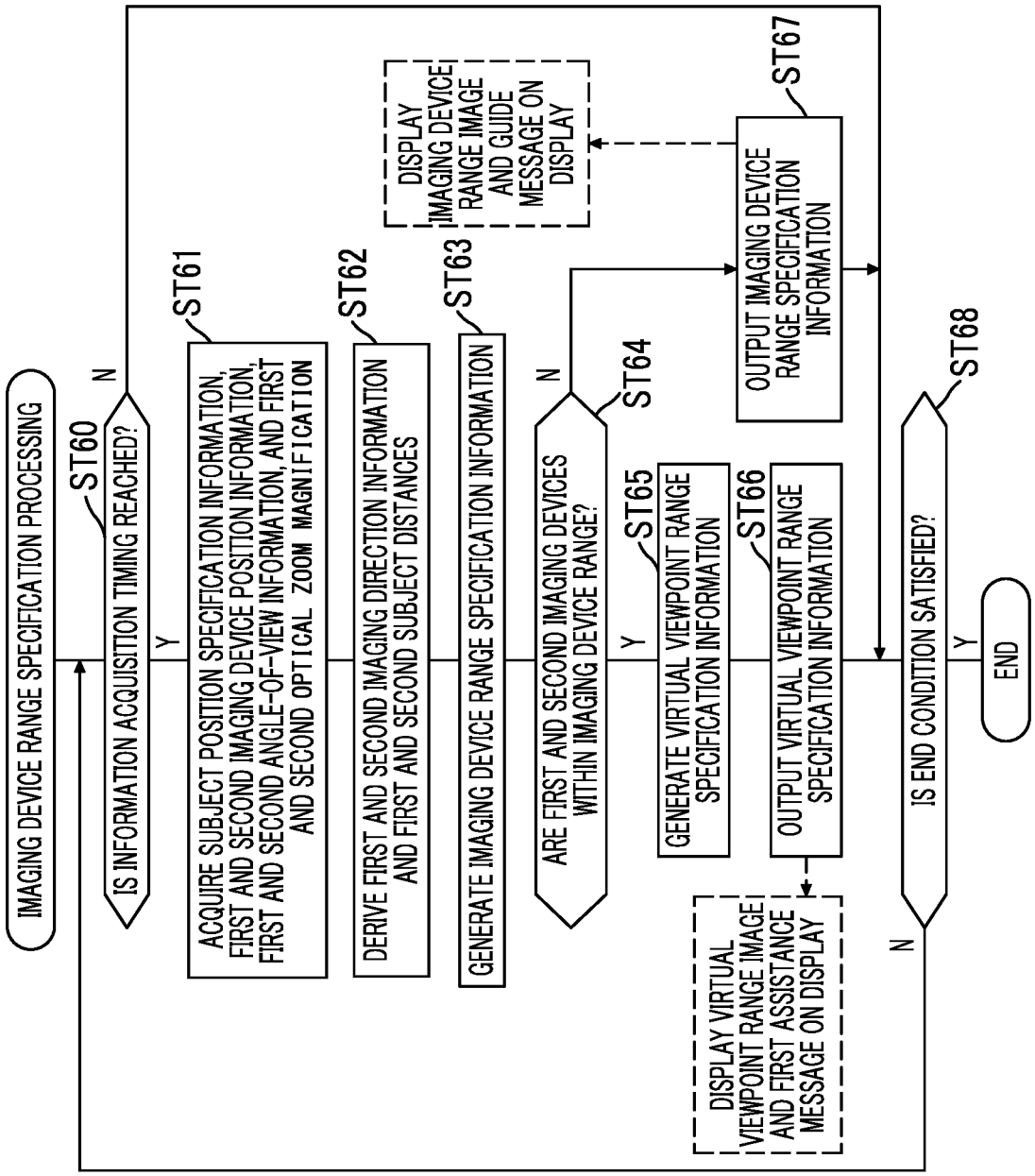
FIG. 40 is a flowchart showing an example of a flow of the imaging device range specification processing according to the fourth embodiment and FIG. 41 is a block diagram showing an example of an aspect in which an information processing apparatus program is installed on a computer of the information processing apparatus from a storage medium storing the information processing apparatus program.

The imaging device range specification processing shown in FIG. 40 as an example is executed by the CPU 76 in accordance with the imaging device range specification program 89 in a case where an instruction to execute the virtual viewpoint range specification processing is received by the reception device 54 or 74, that is, in a case where the virtual viewpoint range display mode is set in step ST13 of the display mode setting processing (see FIG. 19).

In the imaging device range specification processing shown in FIG. 40, first, in step ST60, the control unit 76A determines whether or not the information acquisition timing is reached. An example of the information acquisition timing includes timing divided by a time interval defined by an output frame rate. In step ST60, in a case where the information acquisition timing is reached, an affirmative determination is made, and the imaging device range specification processing proceeds to step ST61. In step ST60, in a case where the information acquisition timing is not reached, a negative determination is made, and the imaging device range specification processing proceeds to step ST68.

In step ST61, the imaging device range specification unit 76H acquires the first imaging device position information, the first angle-of-view information, and the first optical zoom magnification from the first imaging device 14. In addition, the imaging device range specification unit 76H acquires the second imaging device position information, the second angle-of-view information, and the second optical zoom magnification from the second imaging device 16. Further, the imaging device range specification unit 76H acquires the subject position specification information from the GPS terminal 18. After that, the imaging device range specification processing proceeds to step ST62.

In step ST62, the imaging device range specification unit 76H derives the first subject distance and the first imaging direction information indicating the first imaging direction D1, on the basis of the first imaging device position information and the subject position specification information. Further, the imaging device range specification unit 76H derives the second subject distance and the second imaging direction information indicating the second imaging direction D2, on the basis of the second imaging device position information and the subject position specification information. After that, the imaging device range specification processing proceeds to step ST63.

In step ST63, the imaging device range specification unit 76H generates the imaging device range specification information on the basis of the first subject distance, the second subject distance, the first optical zoom magnification, and the second optical zoom magnification. The imaging device range specification information is information capable of specifying the range of the position of the second imaging device 16 where the quality of the first captured image and the second captured image acquired by the first imaging device 14 and the second imaging device 16 falls within the default range. After that, the imaging device range specification processing proceeds to step ST64.

In step ST64, the determination unit 76B determines whether or not the position of the second imaging device 16 is within the imaging device range specified by the imaging device range specification information. In a case where the position of the second imaging device 16 is within the imaging device range, an affirmative determination is made, and the imaging device range specification processing proceeds to step ST65. In a case where the position of the second imaging device 16 is outside the imaging device range, a negative determination is made, and the imaging device range specification processing proceeds to step ST67.

In step ST65, the virtual viewpoint range specification unit 76C generates the virtual viewpoint range specification information capable of specifying the virtual viewpoint range. After that, the imaging device range specification processing proceeds to step ST66.

In step ST66, the virtual viewpoint range specification unit 76C outputs the virtual viewpoint range specification information generated in step ST65 to the first imaging device 14. The CPU 60 of the first imaging device 14 generates the virtual viewpoint image and the first assistance message on the basis of the virtual viewpoint range specification information received from the virtual viewpoint range specification unit 76C. The CPU 60 causes the display 46 to display the generated virtual viewpoint image and the generated first assistance message. After that, the imaging device range specification processing proceeds to step ST68.

On the other hand, in step ST67, the imaging device range specification unit 76H outputs the imaging device range specification information to the first imaging device 14. The CPU 60 of the first imaging device 14 generates the imaging device range image and the guide message on the basis of the imaging device range specification information received from the imaging device range specification unit 76H, and causes the display 46 to display the generated imaging device range image and the generated guide message. After that, the imaging device range specification processing proceeds to step ST68.

In step ST68, the control unit 76A determines whether or not a condition of ending the imaging device range specification processing (hereinafter, referred to as an "imaging device range specification processing end condition") is satisfied. An example of the imaging device range specification processing end condition includes a condition that the mode change instruction is received by the reception device 54 or 74. In step ST68, in a case where the imaging device range specification processing end condition is not satisfied, a negative determination is made, and the imaging device range specification processing proceeds to step ST60. In step ST68, in a case where the imaging device range specification processing end condition is satisfied, an affirmative determination is made, and the imaging device range specification processing ends.

As described above, according to the fourth embodiment, the information processing apparatus 12 derives the imaging device range specification information capable of specifying the range of the position of the second imaging device 16 where the quality of the plurality of captured images falls within the default range on the basis of at least one of the subject distances or the zoom capabilities of the plurality of imaging devices with respect to the specific subject 30, and outputs the derived imaging device range specification information. Therefore, it is possible to make the user grasp the range of the position of the second imaging device 16 that is used to obtain the captured image capable of generating the virtual viewpoint image of default quality or higher, as compared with a case where the imaging device range specification information is not output.

Further, according to the fourth embodiment, the imaging device range specification unit 76H outputs the imaging device range specification information to the first imaging device 14 that is the same output destination as the output destination of the virtual viewpoint range specification information. Therefore, it is possible to make the user visually perceive the range of the position of the second imaging device 16 that is used to obtain the plurality of captured images capable of generating the virtual viewpoint image of the default quality or higher, together with the virtual viewpoint range.

In the above fourth embodiment, the imaging device range specification unit 76H generates the guide information for moving the position of the second imaging device 16, but the technique of the present disclosure is not limited thereto. The imaging device range specification unit 76H may generate the guide information for moving the position of the first imaging device 14, or may generate the guide information for moving the positions of both the first imaging device 14 and the second imaging device 16.

In each of the above embodiments, as shown in FIG. 3, the first imaging device 14 and the second imaging device 16 each have a display 46, but the technique of the present disclosure is not limited thereto, and at least one of the first imaging device 14 or the second imaging device 16 need only have the display 46. The information processing apparatus 12 outputs the virtual viewpoint range specification information to the imaging device having the display 46. The imaging device that has received the virtual viewpoint range specification information causes the display 46 to display the first assistance message and the virtual viewpoint range image showing the virtual viewpoint range on the basis of the virtual viewpoint range specification information. In this configuration, a person who uses the imaging device having the display 46, out of the plurality of imaging devices, instructs a person who uses the remaining imaging device on the imaging position. According to this configuration, it is possible to acquire the plurality of captured images necessary for generating the virtual viewpoint image by using an inexpensive imaging device because at least one imaging device need only have the display 46, as compared with a case where all the imaging devices have the displays 46.

Further, in each of the above embodiments, the information processing apparatus 12 outputs the virtual viewpoint range specification information, the imaging range information, the guide information, and the imaging device range specification information to the first imaging device 14, but the technique of the present disclosure is not limited thereto. The information processing apparatus 12 may output the virtual viewpoint range specification information, the imaging range information, the guide information, and/or the imaging device range specification information to the second imaging device 16 or both the first imaging device 14 and the second imaging device 16. Further, the information processing apparatus 12 may output the virtual viewpoint range specification information, the imaging range information, the guide information, and/or the imaging device range specification information to a default device (for example, a smart device, a wearable terminal, a personal computer, and/or a server), together with the imaging device or instead of the imaging device.

Further, in each of the above embodiments, the information processing apparatus 12 has been described as an example, but the imaging device (for example, the first imaging device 14) may be equipped with the function of the information processing apparatus 12. In this case, the information processing apparatus 12 is unnecessary. Further, the imaging device (for example, the first imaging device 14) may be made to have a part of the above-mentioned plurality of functions (for example, the functions shown in FIGS. 6, 23, 31, and 36) included in the information processing apparatus 12.

Further, in each of the above embodiments, the GPS terminal 18 is attached to the clothes of the specific subject 30, and the subject position specification information is acquired by activating the GPS function, but the technique of the present disclosure is not limited thereto. For example, the first person 26 may set any position as the subject position specification information on the virtual viewpoint range image displayed on the touch panel 48 shown in FIG. 12 by using an instruction object such as a finger or a stylus pen. In this case, for example, the first person 26 may set a position where the first person 26 does not want to miss the imaging timing, such as in front of the goal, to the subject position specification information in advance. The first imaging device 14 and/or the second imaging device 16 performs imaging at a position determined on the basis of the subject position specification information, so that it is possible to acquire the virtual viewpoint image at the moment when the specific subject 30 comes in front of the goal without missing the moment.

Further, in the above embodiments, the virtual viewpoint range image is an image in which the virtual viewpoint range is displayed on the soccer field plan view image, but the technique of the present disclosure is not limited thereto. For example, the virtual viewpoint range image may be an image in which the virtual viewpoint range is displayed on an image of the soccer field 22 viewed from diagonally above in conformance with the height of the viewpoint of the first person 26. In this case, it is also possible to superimpose the virtual viewpoint range image on the live view image and display the superimposed image on the display 46. The same applies to the imaging range image and the imaging device range image.

Further, in the above embodiments, the virtual viewpoint range image is an image in which the virtual viewpoint range is displayed on the image of the soccer field 22, but the technique of the present disclosure is not limited thereto. Only the positions of the first imaging device 14, the second imaging device 16, and the specific subject 30, and virtual viewpoint range may be displayed as the virtual viewpoint range image without displaying the image of the soccer field 22, regardless of whether the virtual viewpoint range image is a plan view image or an image viewed from diagonally above. The same applies to the imaging range image and the imaging device range image.

As a method of acquiring the soccer field plan view image, for example, a drone with GPS may be used to image the soccer field 22 from directly above or diagonally above. Further, the soccer field plan view image is not limited to the captured image, and a sample data image showing the shape of the field for each match or each venue may be stored in advance in the information processing apparatus 12, and the user may select an appropriate sample data image from among the sample data images. In this case, since it is necessary to associate the sample data image with terminal position information, the first person 26 may designate the position of the first imaging device 14 and the first imaging direction D1 on the sample data image. In a case where the size of the field and the GPS positions of the three terminal devices are known and the imaging direction and one of the positions are associated with the sample data image, the other two positions can be displayed on the sample data image. Further, the second person 28, instead of the first person 26, may designate the position of the second imaging device 16 and the second imaging direction D2 on the sample data image, or all the three terminal devices may designate their own positions.

Further, in each of the above embodiments, a description is given using, as an example, an aspect in which the display 46 displays various messages such as the first assistance message, the second assistance message, the warning message, and the guide message, but the technique of the present disclosure is not limited thereto. For example, the speaker 56 may output the contents of various messages by voice.

Further, in each of the above embodiments, the first imaging device 14 and the second imaging device 16 have been described as an example, but the technique of the present disclosure is not limited thereto, and three or more imaging devices including the first imaging device 14 and the second imaging device 16 may be applied. In this case, the CPU 60 or 76 need only derive the virtual viewpoint range specification information capable of specifying the virtual viewpoint range in which the virtual viewpoint image can be generated on the basis of the plurality of captured images obtained by being captured by the three or more imaging devices, on the basis of the imaging device position information and the imaging direction information regarding each imaging device.

Further, the computers 50 and 70 have been described as an example in the above description, but the technique of the present disclosure is not limited thereto. For example, a device including an ASIC, an FPGA, and/or a PLD may be applied instead of the computers 50 and/or 70. Alternatively, a combination of a hardware configuration and a software configuration may be used instead of the computers 50 and/or 70.

Figure 41:
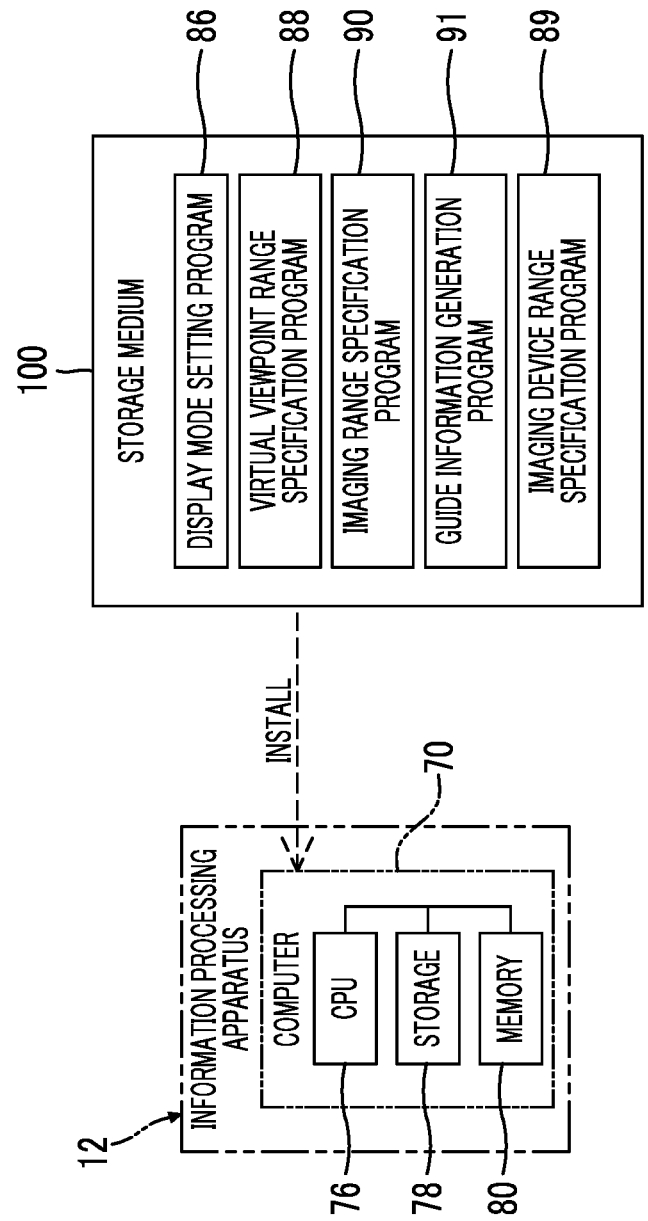

Further, the storage 78 stores the information processing apparatus program in each of the above embodiments, but the technique of the present disclosure is not limited thereto, and any portable storage medium 100, such as an SSD or a USB memory, may store the information processing apparatus program as shown in FIG. 41 as an example. In this case, the information processing apparatus program stored in the storage medium 100 is installed on the computer 70, and the CPU 76 executes information processing apparatus-side processing in accordance with the information processing apparatus program. Alternatively, the information processing apparatus program may be installed on the computer 50, and the CPU 60 may execute the information processing apparatus-side processing in accordance with the information processing apparatus program.

Alternatively, the information processing apparatus program may be stored in a storage unit of, for example, another computer or a server device connected to the computer 70 or 50 through a communication network (not shown), and the information processing apparatus program may be downloaded on the information processing apparatus 12 or the first imaging device 14 in response to a request from the information processing apparatus 12. In this case, the information processing apparatus-side processing based on the downloaded information processing apparatus program is executed by the CPU 76 of the computer 70 or the CPU 60 of the first imaging device 14.

Further, the CPU 76 has been described as an example in each of the above embodiments, but the technique of the present disclosure is not limited thereto, and a GPU may be adopted. Further, a plurality of CPUs may be adopted instead of the CPU 76. That is, the information processing apparatus-side processing may be executed by one processor or a plurality of physically separated processors. Further, instead of the CPU 60, a GPU may be adopted or a plurality of CPUs may be adopted, and various kinds of processing may be executed by one processor or a plurality of physically separated processors.

As a hardware resource for executing the information processing apparatus-side processing, the following various processors can be used. Examples of the processor include, as described above, a CPU, which is a general-purpose processor that functions as the hardware resource for executing the information processing apparatus-side processing in accordance with software, that is, the program. Examples of another processor include a dedicated electric circuit, which is a processor having a dedicated circuit configuration designed to execute specific processing, such as an FPGA, a PLD, or an ASIC. A memory is incorporated in or connected to every processor, and every processor uses the memory to execute the information processing apparatus-side processing.

The hardware resource for executing the information processing apparatus-side processing may be constituted of one of these various processors, or a combination of two or more processors of the same type or different types (for example, a combination of a plurality of FPGAs, or a combination of a CPU and an FPGA). Alternatively, the hardware resource for executing the information processing apparatus-side processing may be one processor.

A first example in which the hardware resource for executing the information processing apparatus-side processing is constituted of one processor is an aspect in which one or more CPUs and software are combined to constitute one processor and the processor functions as the hardware resource for executing the information processing apparatus-side processing. The aspect is typified by a computer such as a client and a server. A second example is an aspect in which a processor that realizes all the functions of a system including a plurality of hardware resources for executing the information processing apparatus-side processing with one IC chip is used. The aspect is typified by an SoC or the like. As described above, the information processing apparatus-side processing is realized by using one or more of the above-described various processors as a hardware resource.

Furthermore, more specifically, electric circuitry in which circuit elements such as semiconductor elements are combined can be used as the hardware structure of these various processors.

Further, the above-mentioned information processing apparatus-side processing is merely an example. Accordingly, it goes without saying that unnecessary steps may be deleted, new steps may be added, or the processing order may be rearranged without departing from the gist.

The contents described and shown above are detailed descriptions for parts related to the technique of the present disclosure, and are merely an example of the technique of the present disclosure. For example, the description of the configurations, functions, operations, and effects is the description of an example of the configurations, functions, operations, and effects of parts related to the technique of the present disclosure. Therefore, it goes without saying that unnecessary elements may be deleted, new elements may be added, or the replacements may be made for the contents described and shown above without departing from the gist of the technique of the present disclosure. In addition, in order to avoid complications and facilitate understanding of the parts related to the technique of the present disclosure, in the contents described and shown above, descriptions of common general knowledge and the like that do not require special descriptions for enabling the implementation of the technique of the present disclosure are omitted.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An information processing apparatus comprising:
a processor; and
a memory that is connected to or incorporated in the processor,
wherein the processor is configured to:
acquire imaging device position information regarding positions of a plurality of imaging devices and imaging direction information regarding an imaging direction of each of the plurality of imaging devices,
derive virtual viewpoint range specification information capable of specifying a virtual viewpoint range in which a virtual viewpoint image is capable of being generated on the basis of a plurality of captured images obtained by being captured by the plurality of imaging devices, on the basis of the imaging device position information and the imaging direction information, output information regarding the virtual viewpoint range specification information, acquire subject position specification information for specifying a position of a first specific subject, and acquire the imaging direction information on the basis of the subject position specification information and the imaging device position information, wherein the virtual viewpoint range is a range within a smaller first angle out of angles formed by the imaging directions of the plurality of imaging devices with respect to a second specific subject, and the virtual viewpoint range is a range within an angle that is within the first angle and that exceeds a first under-angle predetermined as an under-angle within the first angle.

2. The information processing apparatus according to claim 1,
wherein the processor is configured to derive the virtual viewpoint range specification information each time at least one of the imaging device position information or the imaging direction information is changed or acquired.

3. The information processing apparatus according to claim 1,
wherein the processor is configured to output the information regarding the virtual viewpoint range specification information to a first display or at least one imaging device out of the plurality of imaging devices.

4. The information processing apparatus according to claim 3,
wherein the at least one imaging device has a second display, and
the at least one imaging device causes the second display to display a virtual viewpoint range image showing the virtual viewpoint range, on the basis of the information regarding the virtual viewpoint range specification information.

5. The information processing apparatus according to claim 1,
wherein the first under-angle is an angle that defines an imaging position range that is not suitable for generating the virtual viewpoint image on the basis of the plurality of captured images.

6. The information processing apparatus according to claim 1,
wherein the processor is further configured to output first guide information for guiding a position of at least one imaging device out of the plurality of imaging devices to a position that exceeds the first under-angle and that falls within the first angle in a case where the angle formed by the imaging directions of the plurality of imaging devices with respect to the second specific subject is the first under-angle or less.

7. The information processing apparatus according to claim 6,
wherein the first guide information is information for guiding a position of one imaging device out of the plurality of imaging devices to the position that exceeds the first under-angle and that falls within the first angle.

8. The information processing apparatus according to claim 6,
wherein the processor is configured to output the first guide information to the same output destination as an output destination of the information regarding the virtual viewpoint range specification information.

9. The information processing apparatus according to claim 6,
wherein the virtual viewpoint range is a range within a smaller second angle out of angles formed by the imaging directions of the plurality of imaging devices with respect to a third specific subject, and
the processor is configured to:
receive viewpoint position information indicating a viewpoint position with respect to the virtual viewpoint image, and
further output second guide information for guiding a position of at least one imaging device out of the plurality of imaging devices to a position that falls within the second angle in a case where the viewpoint position indicated by the viewpoint position information is outside the virtual viewpoint range.

10. The information processing apparatus according to claim 9,
wherein the virtual viewpoint range is a range within an angle that is within the second angle and that exceeds a second under-angle predetermined as an under-angle within the second angle, and
the second guide information is information for guiding the position of the at least one imaging device out of the plurality of imaging devices to a position that exceeds the second under-angle and that falls within the second angle.

11. The information processing apparatus according to claim 10,
wherein the second guide information is information for guiding a position of one imaging device out of the plurality of imaging devices to the position that exceeds the second under-angle and that falls within the second angle.

12. The information processing apparatus according to claim 9,
wherein the processor is configured to output the second guide information to the same output destination as an output destination of the information regarding the virtual viewpoint range specification information.

13. The information processing apparatus according to claim 1,
wherein the processor is configured to further output the imaging device position information.

14. The information processing apparatus according to claim 13,
wherein the processor is configured to output the imaging device position information to the same output destination as an output destination of the information regarding the virtual viewpoint range specification information.

15. The information processing apparatus according to claim 1,
wherein the processor is configured to:
further acquire angle-of-view information regarding an angle of view of each of the plurality of imaging devices,
further derive imaging range information regarding an imaging range in which the virtual viewpoint image is capable of being generated on the basis of the plurality of captured images, the imaging range being overlapped by the plurality of imaging devices, on the basis of the imaging device position information, the imaging direction information, and the angle-of-view information, and further output the imaging range information.

16. The information processing apparatus according to claim 15, wherein the processor is configured to output the imaging range information to the same output destination as an output destination of the information regarding the virtual viewpoint range specification information.

17. The information processing apparatus according to claim 9, wherein the processor is configured to:
derive imaging device range specification information capable of specifying a range of a position of at least one imaging device out of the plurality of imaging devices where quality of the plurality of captured images falls within a default range, on the basis of at least one of a subject distance of each of the plurality of imaging devices with respect to a fourth specific subject or a zoom capability of each of the plurality of imaging devices, and further output the imaging device range specification information.

18. The information processing apparatus according to claim 17, wherein the processor is configured to output the imaging device range specification information to the same output destination as an output destination of the information regarding the virtual viewpoint range specification information.

19. An information processing apparatus comprising:

a processor; and a memory that is connected to or incorporated in the processor, wherein the processor is configured to:
acquire imaging device position information regarding positions of a plurality of imaging devices, imaging direction information regarding an imaging direction of each of the plurality of imaging devices, and angle-of-view information regarding an angle of view of each of the plurality of imaging devices, derive imaging range information regarding an imaging range in which a virtual viewpoint image is capable of being generated on the basis of a plurality of captured images obtained by being captured by the plurality of imaging devices, the imaging range being overlapped by the plurality of imaging devices, on the basis of the imaging device position information, the imaging direction information, and the angle-of-view information, output the imaging range information and the imaging device position information, wherein the imaging range corresponds to a virtual viewpoint range in which the virtual viewpoint image is capable of being generated on the basis of a plurality of captured images obtained by being captured by the plurality of imaging devices, acquire subject position specification information for specifying a position of a first specific subject, and acquires the imaging direction information on the basis of the subject position specification information and the imaging device position information, wherein the virtual viewpoint range is a range within a smaller first angle out of angles formed by the imaging directions of the plurality of imaging devices with respect to a second specific subject, and the virtual viewpoint range is a range within an angle that is within the first angle and that exceeds a first under-angle predetermined as an under-angle within the first angle.

20. The information processing apparatus according to claim 19, wherein the processor is configured to output the imaging range information and the imaging device position information to at least one imaging device out of the plurality of imaging devices.

21. An information processing method comprising:

acquiring imaging device position information regarding positions of a plurality of imaging devices and imaging direction information regarding an imaging direction of each of the plurality of imaging devices;

deriving virtual viewpoint range specification information capable of specifying a virtual viewpoint range in which a virtual viewpoint image is capable of being generated on the basis of a plurality of captured images obtained by being captured by the plurality of imaging devices, on the basis of the imaging device position information and the imaging direction information;

outputting information regarding the virtual viewpoint range specification information;

acquiring subject position specification information for specifying a position of a first specific subject, and acquiring the imaging direction information on the basis of the subject position specification information and the imaging device position information, wherein the virtual viewpoint range is a range within a smaller first angle out of angles formed by the imaging directions of the plurality of imaging devices with respect to a second specific subject, and the virtual viewpoint range is a range within an angle that is within the first angle and that exceeds a first under-angle predetermined as an under-angle within the first angle.

22. An information processing method comprising:

acquiring imaging device position information regarding positions of a plurality of imaging devices, imaging direction information regarding an imaging direction of each of the plurality of imaging devices, and angle-of-view information regarding an angle of view of each of the plurality of imaging devices;

deriving imaging range information regarding an imaging range in which a virtual viewpoint image is capable of being generated on the basis of a plurality of captured images obtained by being captured by the plurality of imaging devices, the imaging range being overlapped by the plurality of imaging devices, on the basis of the imaging device position information, the imaging direction information, and the angle-of-view information;

outputting the imaging range information and the imaging device position information, wherein the imaging range corresponds to a virtual viewpoint range in which the virtual viewpoint image is capable of being generated on the basis of a plurality of captured images obtained by being captured by the plurality of imaging devices;

acquiring subject position specification information for specifying a position of a first specific subject, and acquiring the imaging direction information on the basis of the subject position specification information and the imaging device position information, wherein the virtual viewpoint range is a range within a smaller first angle out of angles formed by the imaging directions of the plurality of imaging devices with respect to a second specific subject, and the virtual viewpoint range is a range within an angle that is within the first angle and that exceeds a first under-angle predetermined as an under-angle within the first angle.

23. A non-transitory computer-readable storage medium storing a program executable by a computer to perform a process comprising:

acquiring imaging device position information regarding positions of a plurality of imaging devices and imaging direction information regarding an imaging direction of each of the plurality of imaging devices;

deriving virtual viewpoint range specification information capable of specifying a virtual viewpoint range in which a virtual viewpoint image is capable of being generated on the basis of a plurality of captured images obtained by being captured by the plurality of imaging devices, on the basis of the imaging device position information and the imaging direction information;

outputting information regarding the virtual viewpoint range specification information;

acquiring subject position specification information for specifying a position of a first specific subject, and acquiring the imaging direction information on the basis of the subject position specification information and the imaging device position information, wherein the virtual viewpoint range is a range within a smaller first angle out of angles formed by the imaging directions of the plurality of imaging devices with respect to a second specific subject, and the virtual viewpoint range is a range within an angle that is within the first angle and that exceeds a first under-angle predetermined as an under-angle within the first angle.

24. A non-transitory computer-readable storage medium storing a program executable by a computer to perform a process comprising:

acquiring imaging device position information regarding positions of a plurality of imaging devices, imaging direction information regarding an imaging direction of each of the plurality of imaging devices, and angle-of-view information regarding an angle of view of each of the plurality of imaging devices;

deriving imaging range information regarding an imaging range in which a virtual viewpoint image is capable of being generated on the basis of a plurality of captured images obtained by being captured by the plurality of imaging devices, the imaging range being overlapped by the plurality of imaging devices, on the basis of the imaging device position information, the imaging direction information, and the angle-of-view information;

outputting the imaging range information and the imaging device position information, wherein the imaging range corresponds to a virtual viewpoint range in which the virtual viewpoint image is capable of being generated on the basis of a plurality of captured images obtained by being captured by the plurality of imaging devices;

acquiring subject position specification information for specifying a position of a first specific subject, and acquiring the imaging direction information on the basis of the subject position specification information and the imaging device position information, wherein the virtual viewpoint range is a range within a smaller first angle out of angles formed by the imaging directions of the plurality of imaging devices with respect to a second specific subject, and the virtual viewpoint range is a range within an angle that is within the first angle and that exceeds a first under-angle predetermined as an under-angle within the first angle.

* * * * *